(12) United States Patent
Kawamura et al.

(10) Patent No.: US 9,347,001 B2
(45) Date of Patent: May 24, 2016

(54) LIQUID CRYSTAL COMPOSITION AND LIQUID CRYSTAL DISPLAY DEVICE USING SAME

(71) Applicant: DIC Corporation, Tokyo (JP)

(72) Inventors: Joji Kawamura, Kita-adachi-gun (JP); Makoto Negishi, Kita-adachi-gun (JP); Yoshinori Iwashita, Kita-adachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

(21) Appl. No.: 14/427,817

(22) PCT Filed: Mar. 6, 2013

(86) PCT No.: PCT/JP2013/056114
§ 371 (c)(1),
(2) Date: Mar. 12, 2015

(87) PCT Pub. No.: WO2014/136216
PCT Pub. Date: Sep. 12, 2014

(65) Prior Publication Data
US 2015/0225648 A1 Aug. 13, 2015

(51) Int. Cl.
| | |
|---|---|
| *C09K 19/30* | (2006.01) |
| *C09K 19/12* | (2006.01) |
| *G02F 1/133* | (2006.01) |
| *C09K 19/20* | (2006.01) |
| *C09K 19/02* | (2006.01) |
| *C09K 19/44* | (2006.01) |
| *G02F 1/13* | (2006.01) |
| *C09K 19/04* | (2006.01) |
| *G02F 1/1339* | (2006.01) |
| *C09K 19/34* | (2006.01) |

(52) U.S. Cl.
CPC ............. *C09K 19/20* (2013.01); *C09K 19/0216* (2013.01); *C09K 19/3066* (2013.01); *C09K 19/44* (2013.01); *G02F 1/13* (2013.01); *G02F 1/133* (2013.01); *C09K 2019/0466* (2013.01); *C09K 2019/123* (2013.01); *C09K 2019/124* (2013.01); *C09K 2019/301* (2013.01); *C09K 2019/3004* (2013.01); *C09K 2019/3015* (2013.01); *C09K 2019/3016* (2013.01); *C09K 2019/3019* (2013.01); *C09K 2019/3021* (2013.01); *C09K 2019/3025* (2013.01); *C09K 2019/3422* (2013.01); *G02F 1/13394* (2013.01)

(58) Field of Classification Search
CPC ........ C09K 19/12; C09K 19/20; C09K 19/30; C09K 19/42; C09K 2019/0466; C09K 2019/301; C09K 2019/3025; C09K 2019/3066; C09K 2019/123; G02F 1/133; G02F 1/13394
See application file for complete search history.

(56) References Cited

U.S. PATENT DOCUMENTS

| | | | |
|---|---|---|---|
| 2006/0278850 A1* | 12/2006 | Czanta | ............... C09K 19/3003 252/299.61 |
| 2007/0001149 A1 | 1/2007 | Manabe et al. | |
| 2007/0176146 A1 | 8/2007 | Hirschmann et al. | |
| 2007/0228327 A1 | 10/2007 | Hirschmann et al. | |
| 2008/0029736 A1 | 2/2008 | Saito | |
| 2008/0029737 A1 | 2/2008 | Saito | |
| 2008/0128653 A1 | 6/2008 | Manabe et al. | |
| 2008/0199635 A1 | 8/2008 | Hirschmann et al. | |
| 2009/0065739 A1 | 3/2009 | Haseba et al. | |
| 2009/0091703 A1 | 4/2009 | Matsumura et al. | |
| 2009/0147210 A1 | 6/2009 | Saito | |
| 2009/0194739 A1 | 8/2009 | Wittek et al. | |
| 2009/0256114 A1 | 10/2009 | Yamashita et al. | |
| 2009/0321685 A1 | 12/2009 | Tomi | |
| 2010/0302498 A1 | 12/2010 | Saito | |
| 2011/0001090 A1 | 1/2011 | Wittek et al. | |
| 2011/0051023 A1 | 3/2011 | Fujita et al. | |
| 2012/0138852 A1 | 6/2012 | Yanai et al. | |
| 2012/0313043 A1 | 12/2012 | Maeda et al. | |
| 2013/0207038 A1 | 8/2013 | Haensel et al. | |
| 2013/0335652 A1 | 12/2013 | Lee et al. | |

FOREIGN PATENT DOCUMENTS

| | | |
|---|---|---|
| JP | 2007-526931 A | 9/2007 |
| JP | 2008-502754 A | 1/2008 |
| JP | 2008-037918 A | 2/2008 |
| JP | 2008-038018 A | 2/2008 |
| JP | 2008-189927 A | 8/2008 |
| JP | 2009-067780 A | 4/2009 |
| JP | 2009-084560 A | 4/2009 |
| JP | 2009-155642 A | 7/2009 |
| JP | 2009-185285 A | 8/2009 |
| JP | 2009-270102 A | 11/2009 |
| JP | 2010-275390 A | 12/2010 |

(Continued)

OTHER PUBLICATIONS

International Search Report dated Apr. 23, 2013, issued in corresponding application No. PCT/JP2013/056114.

*Primary Examiner* — Shean C Wu

(74) *Attorney, Agent, or Firm* — Westerman, Hattori, Daniels & Adrian, LLP

(57) ABSTRACT

There is provided a liquid crystal composition containing a compound represented by Formula (i) and a compound represented by General Formula (ii) (where $R^{ii1}$ and $R^{ii2}$ each independently represent an alkyl group having 1 to 5 carbon atoms, an alkoxyl group having 1 to 5 carbon atoms, or an alkenyl group having 4 or 5 carbon atoms; and $X^{ii1}$ and $X^{ii2}$ each independently represent a hydrogen atom or a fluorine atom). There is also provided a liquid crystal display device in which such a liquid crystal composition is used.

8 Claims, 1 Drawing Sheet

(56) References Cited

FOREIGN PATENT DOCUMENTS

| | | |
|---|---|---|
| JP | 2011-052120 A | 3/2011 |
| JP | 2011-516628 A | 5/2011 |
| JP | 2011-525553 A | 9/2011 |
| JP | 2012-001730 A | 1/2012 |
| JP | 2012-117062 A | 6/2012 |
| JP | 2012-121964 A | 6/2012 |
| JP | 2013-001725 A | 1/2013 |
| JP | 2013-166936 A | 8/2013 |
| WO | 2009/028367 A1 | 3/2009 |
| WO | 2009/028368 A1 | 3/2009 |
| WO | 2010/090076 A1 | 8/2010 |
| WO | 2010/131614 A1 | 11/2010 |
| WO | 2010/137538 A1 | 12/2010 |
| WO | 2011/030708 A1 | 3/2011 |
| WO | 2011/062049 A1 | 5/2011 |
| WO | 2011/065299 A1 | 6/2011 |
| WO | 2012/141052 A1 | 10/2012 |

* cited by examiner

LIQUID CRYSTAL COMPOSITION AND LIQUID CRYSTAL DISPLAY DEVICE USING SAME

TECHNICAL FIELD

The present invention relates to a nematic liquid crystal composition which is useful as a material for a liquid crystal display and which has a positive dielectric anisotropy (Δ∈), and the present invention also relates to a liquid crystal display device using such a nematic liquid crystal composition.

BACKGROUND ART

Liquid crystal display devices have been applied to, for example, watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and vertical alignment and IPS (in-plane switching) types involving use of a TFT (thin film transistor). Liquid crystal compositions used in such liquid crystal display devices need to satisfy the following requirements: being stable to external stimuli such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds in order to adjust, for example, the dielectric anisotropy (Δ∈) and refractive index anisotropy (Δn) to be optimum to individual display devices.

A liquid crystal composition having a negative Δ∈ is used in vertical alignment (VA)-type displays, and a liquid crystal composition having a positive Δ∈ is used in horizontal alignment-type displays such as a TN type, an STN type, and an IPS (in-plane switching) type. Another type of driving has been reported, in which the molecules of a liquid crystal composition having a positive Δ∈ are vertically aligned in a state in which voltage is not applied, and then a horizontal electric field is applied for performing display. A demand for a liquid crystal composition having a positive Δ∈ has therefore further increased. In all types of driving, however, there have been demands for driving at low voltage, a quick response, and a broad range of operating temperature. In other words, a liquid crystal composition having a positive Δ∈ with a large absolute value, a low viscosity (η), and a high nematic phase-isotropic liquid phase transition temperature (Tni) has been demanded. In order to control Δn×d that is a product of Δn and a cell gap (d) to be a predetermined value, the Δn of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity (γ1).

Liquid crystal compositions which enable a quick response have been disclosed; for example, such liquid crystal compositions contain a combination of liquid crystal compounds having a positive Δ∈ and represented by Formulae (A-1) and (A-2) and a liquid crystal compound having a neutral Δ∈ and represented by Formula (B). In these liquid crystal compositions, the liquid crystal compound having a positive Δ∈ has a —CF$_2$O— moiety, and the liquid crystal compound having a neutral Δ∈ has an alkenyl group; it is widely known in the field of liquid crystal compositions (see Patent Literatures 1 to 4).

[Chem. 1]

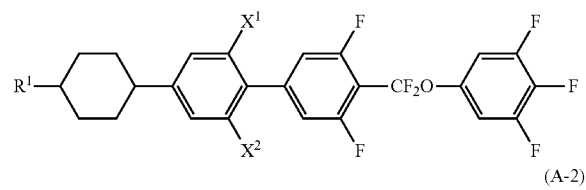

(A-1)

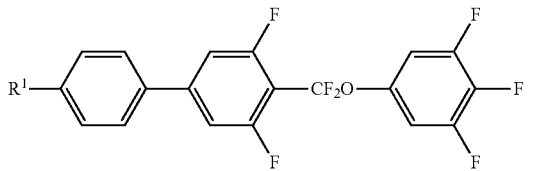

(A-2)

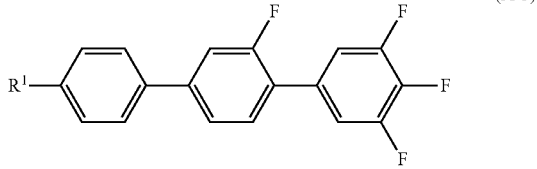

(A-3)

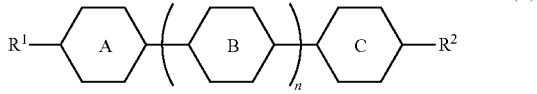

(B)

As liquid crystal display devices have come to be used in a broad range of applications, usage and manufacturing thereof have been greatly changed. In order to adapt to such changes, optimization of characteristics other than known basic physical properties has been needed. In particular, a VA type and an IPS type have become popular as liquid crystal display devices utilizing a liquid crystal composition, and these types of display devices having a very large size (e.g., 50 inches or lager) have also been practically used. An increase in the size of substrates has changed a technique for putting a liquid crystal composition between the substrates, and a one-drop-fill (ODF) technique has become mainstream in place of a typically employed vacuum injection technique. Dropping of a liquid crystal composition onto a substrate, however, generates droplet stains with the result that display quality is degraded, which has been problematic.

Furthermore, in a process for manufacturing a liquid crystal display device by an ODF technique, a liquid crystal material needs to be dropped in an amount optimum for the size of the liquid crystal display device. In the case where the amount of a liquid crystal material to be dropped largely varies from the optimum level, a predetermined balance between a refractive index and a driving electric field in a liquid crystal display device is disrupted, which causes defective display such as unevenness and defective contrast. In particular, the optimum amount of a liquid crystal material to be dropped is small in small-size liquid crystal display devices well used in smartphones which have become popular in recent years, and thus it is difficult even to control a variation from the optimum amount to be in a certain range. Hence, in order to maintain a high yield of liquid crystal display devices, for instance, a liquid crystal composition needs to be less affected by a rapid pressure change and impact generated on dropping of the liquid crystal composition in a dropping apparatus and to be able to be stably and continuously dropped for a long time.

In terms of these circumstances, a liquid crystal composition which is used in active-matrix liquid crystal display devices driven by, for example, TFT devices needs to be developed for satisfying requirements for liquid crystal display devices, such as enabling quick response and having a high specific resistance, a high voltage holding ratio, and improved stability to external elements such as light and heat, also in view of a manufacturing process of liquid crystal display devices.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

It is an object of the present invention to provide a liquid crystal composition having a positive $\Delta\epsilon$, the liquid crystal composition also having a liquid crystal phase in a wide temperature range, a low viscosity, a good solubility at low temperature, a high specific resistance, a high voltage holding ratio, and stability to heat and light. It is another object of the present invention to enable high-yield production of a liquid crystal display device in which use of this liquid crystal composition gives excellent display quality with a reduction in defective display brought about by screen burn-in and droplet stains. It is another object of the present invention to provide a liquid crystal display device using such a liquid crystal composition.

Solution to Problem

The present invention includes the following aspects.

(1) A liquid crystal composition having a positive dielectric anisotropy and containing a compound represented by Formula (i) and a compound represented by General Formula (ii).

[Chem. 2]

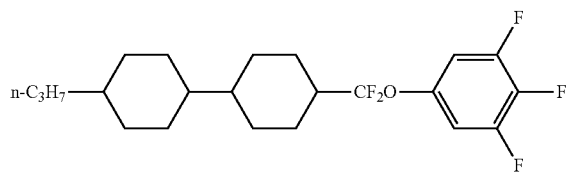
(i)

-continued

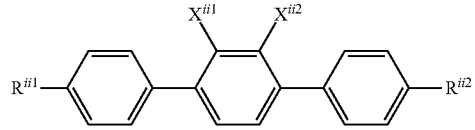
(ii)

In General Formula (ii), $R^{ii1}$ and $R^{ii2}$ each independently represent an alkyl group having 1 to 5 carbon atoms, an alkoxyl group having 1 to 5 carbon atoms, or an alkenyl group having 4 or 5 carbon atoms; and $X^{ii1}$ and $X^{ii2}$ each independently represent a hydrogen atom or a fluorine atom.

(2) The composition according to the aspect (1), wherein the amount of the compound represented by Formula (i) and the amount of the compound represented by General Formula (ii) are from 1 mass % to 30 mass % and from 1 mass % to 40 mass %, respectively, relative to the total amount of the composition.

(3) The composition according to the aspect (1) or (2), further containing at least one compound represented by General Formula (L).

[Chem. 3]

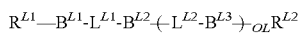
(L)

In the formula, $R^{L1}$ and $R^{L2}$ each independently represent an alkyl group having 1 to 8 carbon atoms, and one —CH$_2$— group or at least two —CH$_2$— groups not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of (a) a 1,4-cyclohexylene group (of which one —CH$_2$— group or at least two —CH$_2$— groups not adjoining each other are optionally substituted with —O—) and (b) a 1,4-phenylene group (of which one —CH= group or at least two —CH= groups not adjoining each other are optionally substituted with —N=), and the groups (a) and (b) are each independently optionally substituted with a cyano group, a fluorine atom, or a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—;

in the case where OL is 2 or 3 and where $L^{L2}$ is multiple, the multiple $L^{L2}$'s are the same as or different from each other; in the case where OL is 2 or 3 and where $B^{L3}$ is multiple, the multiple $B^{L3}$'s are the same as or different from each other; and the compound represented by General Formula (L) excludes the compound represented by General Formula (ii).

(4) The composition according to any one of the aspects (1) to (3), further containing at least one compound represented by General Formula (M).

[Chem. 4]

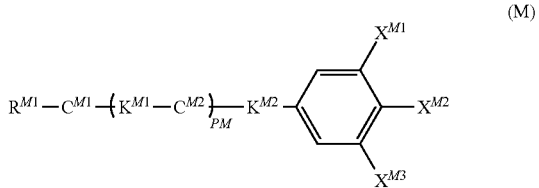

(M)

In the formula, $R^{M1}$ represents an alkyl group having 1 to 8 carbon atoms, and one —$CH_2$— group or at least two —$CH_2$— groups not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— group or at least two —$CH_2$— groups not adjoining each other are optionally substituted with —O— or —S—) and (e) a 1,4-phenylene group (of which one —CH= group or at least two —CH= groups not adjoining each other are optionally substituted with —N=), and the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the multiple $K^{M1}$'s are the same as or different from each other; in the case where PM is 2, 3, or 4 and where $C^{M2}$ is multiple, the multiple $C^{M2}$'s are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by Formula (i).

(5) A liquid crystal display device in which the liquid crystal composition according to any one of the aspects (1) to (4) is used.

(6) The liquid crystal display device according to the aspect (5), wherein the liquid crystal display device is operated in an IPS mode.

(7) The liquid crystal display device according to the aspect (5), wherein the liquid crystal display device is operated in an OCB mode.

(8) The liquid crystal display device according to the aspect (5), wherein the liquid crystal display device is operated in an ECB mode.

(9) The liquid crystal display device according to the aspect (5), wherein the liquid crystal display device is operated in a VA mode.

(10) The liquid crystal display device according to the aspect (5), wherein the liquid crystal display device is operated in a VA-IPS mode.

(11) The liquid crystal display device according to the aspect (5), wherein the liquid crystal display device is operated in an FFS mode.

(12) A liquid crystal display in which the liquid crystal display device according to any one of the aspects (5) to (11) is used.

Advantageous Effects of Invention

The composition having a positive dielectric anisotropy according to the present invention has a significantly improved solubility at low temperature as compared with known compositions while the low viscosity, high specific resistance, and high voltage holding ratio thereof are maintained; in addition, the composition can be stably and continuously dropped for a long time in a process for manufacturing liquid crystal display devices by an ODF technique. Hence, the composition of the present invention enables high-yield production of liquid crystal display devices having an excellent display quality with a reduction in defective display resulting from the production process thereof and is therefore highly practical (adaptable) for products involving use of liquid crystal; and liquid crystal display devices using this composition, such as an IPS (in-plane switching) type and an FFS (fringe-field switching) type, can quickly respond.

DESCRIPTION OF EMBODIMENTS

Figure 1:
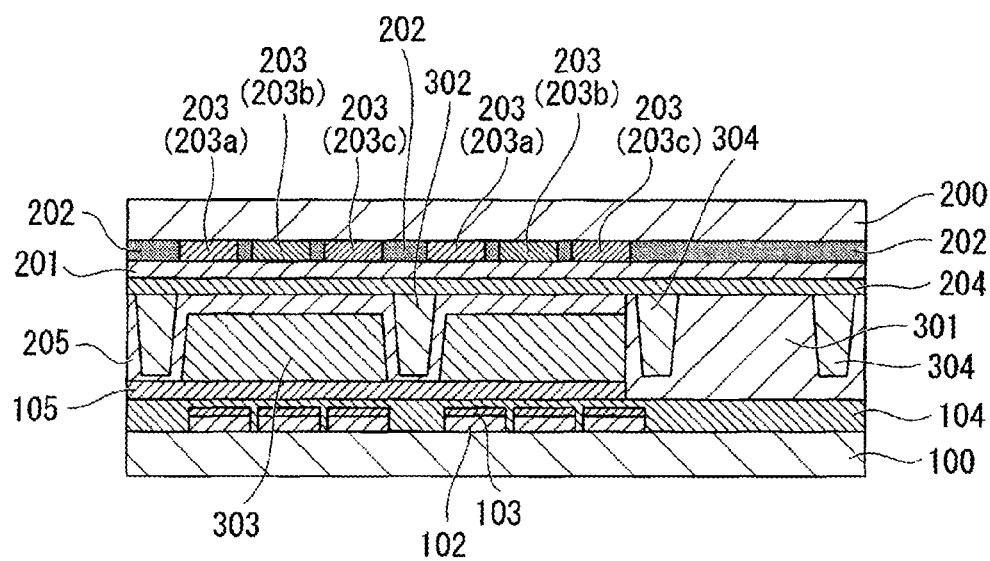
FIG. 1 is a cross-sectional view illustrating a liquid crystal display device according to the present invention; a substrate including members 100 to 105 is referred to as "backplane", and a substrate including members 200 to 205 is referred to as "frontplane".

The liquid crystal composition of the present invention is a compound having a positive dielectric anisotropy and containing a compound represented by Formula (i) and a compound represented by General Formula (ii). The liquid crystal composition will now be described, and the term "%" refers to "mass %" unless otherwise specified. The preferred amount of each compound is an example of the preferred amount of the compound to be contained in the liquid crystal composition (where the case in which the lower limit of the amount is 0 mass % is excluded).

[Chem. 5]

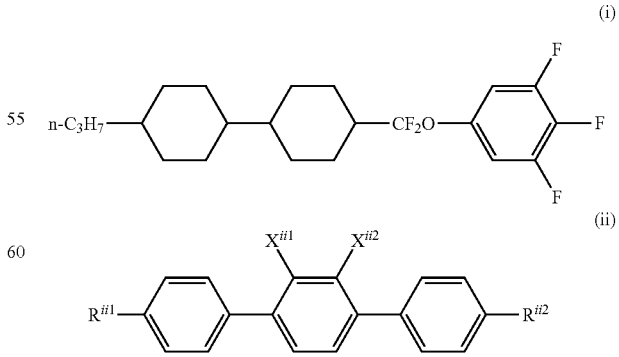

In General Formula (ii), $R^{ii1}$ and $R^{ii2}$ each independently represent an alkyl group having 1 to 5 carbon atoms, an alkoxyl group having 1 to 5 carbon atoms, or an alkenyl group having 4 or 5 carbon atoms; and $X^{ii1}$ and $X^{ii2}$ each independently represent a hydrogen atom or a fluorine atom.

The amount of the compound represented by Formula (i) in the liquid crystal composition is not particularly limited; however, the amount is preferably not less than 1 mass %, also preferably not less than 2 mass %, also preferably not less than 3 mass %, also preferably not less than 4 mass %, and also preferably not less than 8 mass % relative to the total mass of the liquid crystal composition. The amount of the compound represented by Formula (i) in the liquid crystal composition is also preferably not more than 30 mass %, also preferably not more than 25 mass %, also preferably not more than 20 mass %, also preferably not more than 17 mass %, also preferably not more than 15 mass %, also preferably not more than 14 mass %, also preferably not more than 12 mass %, also preferably not more than 8 mass %, also preferably not more than 6 mass %, and also preferably not more than 5 mass % relative to the total mass of the liquid crystal composition in view of solubility at low temperature, nematic phase-isotropic liquid phase transition temperature, electric reliability, and another property. In particular, the amount of the compound represented by Formula (i) in the liquid crystal composition is preferably in the range of 1 to 30 mass %, also preferably 1 to 25 mass %, also preferably 1 to 20 mass %, also preferably 1 to 15 mass %, also preferably 2 to 14 mass %, also preferably 2 to 12 mass %, also preferably 2 to 8 mass %, also preferably 2 to 6 mass %, also preferably 2 to 5 mass %, also preferably 3 to 14 mass %, also preferably 4 to 14 mass %, also preferably 8 to 14 mass %, also preferably 2 to 12 mass %, also preferably 3 to 12 mass %, also preferably 4 to 12 mass %, also preferably 8 to 12 mass %, also preferably 2 to 8 mass %, also preferably 3 to 8 mass %, and also preferably 4 to 8 mass % relative to the total mass of the liquid crystal composition of the present invention.

The amount of the compound represented by General Formula (ii) in the liquid crystal composition is preferably not less than 1 mass %, also preferably not less than 3 mass %, also preferably not less than 5 mass %, also preferably not less than 8 mass %, also preferably not less than 13 mass %, also preferably not less than 20 mass %, and also preferably not less than 21 mass % relative to the total mass of the liquid crystal composition of the present invention in view of response speed, electric reliability, and optical reliability. The amount of the compound represented by General Formula (ii) in the liquid crystal composition is also preferably not more than 40 mass %, also preferably not more than 35 mass %, also preferably not more than 30 mass %, also preferably not more than 26 mass %, also preferably not more than 18 mass %, also preferably not more than 12 mass %, and also preferably not more than 10 mass % relative to the total mass of the liquid crystal composition of the present invention. In particular, the amount of the compound represented by General Formula (ii) in the liquid crystal composition is preferably in the range of 1 to 40 mass %, also preferably 1 to 35 mass %, also preferably 1 to 30 mass %, also preferably 1 to 26 mass %, also preferably 1 to 18 mass %, also preferably 1 to 12 mass %, also preferably 1 to 10 mass %, also preferably 5 to 30 mass %, also preferably 8 to 30 mass %, also preferably 13 to 30 mass %, also preferably 20 to 30 mass %, also preferably 21 to 30 mass %, also preferably 5 to 26 mass %, also preferably 8 to 26 mass %, also preferably 13 to 26 mass %, also preferably 20 to 26 mass %, also preferably 21 to 26 mass %, also preferably 5 to 18 mass %, also preferably 5 to 12 mass %, also preferably 5 to 10 mass %, also preferably 8 to 18 mass %, also preferably 13 to 18 mass %, and also preferably 8 to 12 mass % relative to the total mass of the liquid crystal composition of the present invention.

In the liquid crystal composition of the present invention, the amounts of the compound represented by Formula (i) and compound represented by General Formula (ii) relative to the total mass of the liquid crystal composition are as follows in terms of solubility at low temperature, nematic phase-isotropic liquid phase transition temperature, response speed, electric reliability, and optical reliability: it is preferred that the amount of the compound represented by Formula (i) be from 1 mass % to 30 mass % and that the amount of the compound represented by General Formula (ii) be from 1 mass % to 40 mass %, it is also preferred that the amount of the compound represented by Formula (i) be from 1 mass % to 20 mass % and that the amount of the compound represented by General Formula (ii) be from 1 mass % to 30 mass %, and it is also preferred that the amount of the compound represented by Formula (i) be from 2 mass % to 14 mass % and that the amount of the compound represented by General Formula (ii) be from 5 mass % to 26 mass %.

The total amount of the compound represented by Formula (i) and the compound represented by General Formula (ii) is preferably not less than 2 mass %, also preferably not less than 5 mass %, also preferably not less than 10 mass %, also preferably not less than 12 mass %, also preferably not less than 22 mass %, also preferably not less than 25 mass %, and also preferably not less than 26 mass % relative to the total mass of the liquid crystal composition. The total amount of the compound represented by Formula (i) and the compound represented by General Formula (ii) is also preferably not more than 50 mass %, also preferably not more than 45 mass %, also preferably not more than 40 mass %, also preferably not more than 35 mass %, also preferably not more than 32 mass %, also preferably not more than 29 mass %, also preferably not more than 28 mass %, also preferably not more than 25 mass %, also preferably not more than 18 mass %, and also preferably not more than 17 mass % relative to the total mass of the liquid crystal composition. In particular, the total amount of the compound represented by Formula (i) and the compound represented by General Formula (ii) is preferably in the range of 2 to 50 mass %, also preferably 5 to 50 mass %, also preferably 10 to 50 mass %, also preferably 12 to 50 mass %, also preferably 22 to 50 mass %, also preferably 25 to 50 mass %, also preferably 26 to 50 mass %, also preferably 5 to 45 mass %, also preferably 5 to 35 mass %, also preferably 5 to 32 mass %, also preferably 5 to 29 mass %, also preferably 5 to 28 mass %, also preferably 5 to 25 mass %, also preferably 5 to 18 mass %, also preferably 5 to 17 mass %, also preferably 10 to 32 mass %, also preferably 10 to 29 mass %, also preferably 10 to 28 mass %, also preferably 10 to 25 mass %, also preferably 10 to 18 mass %, also preferably 10 to 17 mass %, also preferably 12 to 32 mass %, also preferably 22 to 32 mass %, also preferably 25 to 32 mass %, also preferably 25 to 32 mass %, also preferably 12 to 17 mass %, also preferably 22 to 29 mass %, and also preferably 25 to 28 mass % relative to the total mass of the liquid crystal composition.

In the liquid crystal composition of the present invention, the compound represented by General Formula (ii) is at least one. In the case where at least two compounds represented by General Formula (ii) are used, a proper combination thereof is determined on the basis of predetermined properties such as solubility at low temperature, transition temperature, electric reliability, and birefringence.

The compound represented by General Formula (ii) is preferably at least one compound selected from the group consisting of compounds represented by General Formula (ii-1).

[Chem. 6]

(ii-1)

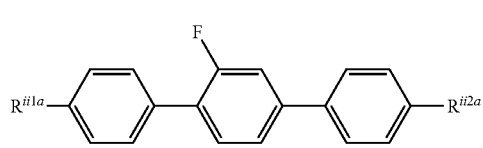

In General Formula (ii-1), $R^{ii1a}$ and $R^{ii2a}$ each independently represent an alkyl group having 1 to 5 carbon atoms.

The amount of the compound represented by General Formula (ii-1) needs to be appropriately adjusted on the basis of the intended properties such as solubility at low temperature, transition temperature, electric reliability, birefringence, process adaptability, droplet stains, screen burn-in, and dielectric anisotropy.

The amount of the compound represented by General Formula (ii-1) is, for instance, in the range of 1 to 30 mass % in an embodiment, 3 to 30 mass % in another embodiment of the present invention, 4 to 30 mass % in another embodiment of the present invention, 4 to 26 mass % in another embodiment of the present invention, 4 to 14 mass % in another embodiment of the present invention, 4 to 11 mass % in another embodiment of the present invention, 4 to 10 mass % in another embodiment of the present invention, 5 to 26 mass % in another embodiment of the present invention, 6 to 26 mass % in another embodiment of the present invention, 11 to 26 mass % in another embodiment of the present invention, 20 to 26 mass % in another embodiment of the present invention, 21 to 26 mass % in another embodiment of the present invention, 4 to 11 mass % in another embodiment of the present invention, 5 to 11 mass % in another embodiment of the present invention, and 6 to 14 mass % in another embodiment of the present invention relative to the total mass of the liquid crystal composition of the present invention.

The compound represented by General Formula (ii-1) is, for instance, preferably at least one compound selected from the group consisting of compounds represented by Formulae (ii.1.1) to (ii.1.9).

[Chem. 7]

(ii.1.1)

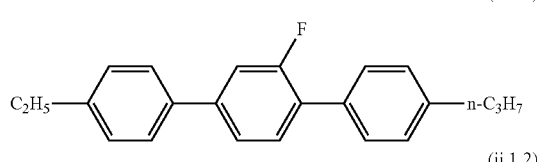

(ii.1.2)

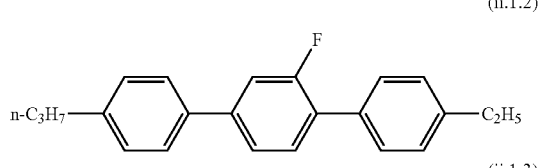

(ii.1.3)

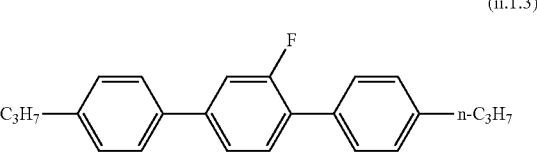

(ii.1.4)

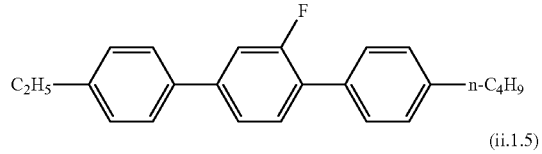

(ii.1.5)

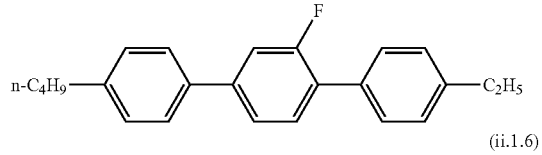

(ii.1.6)

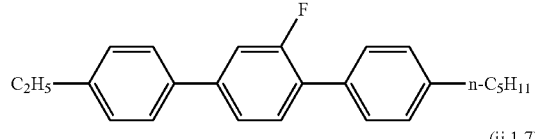

(ii.1.7)

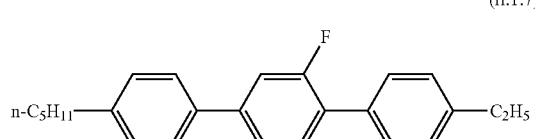

(ii.1.8)

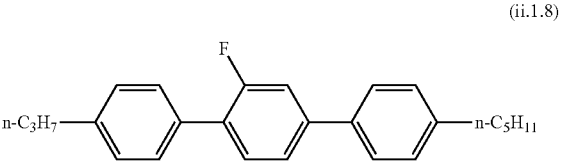

(ii.1.9)

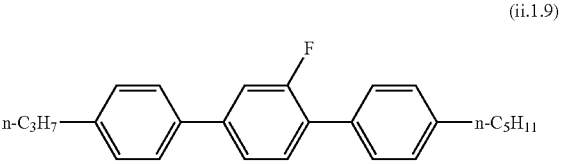

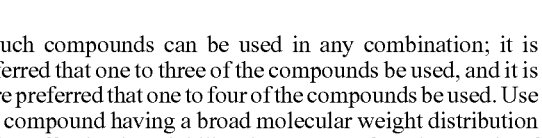

Such compounds can be used in any combination; it is preferred that one to three of the compounds be used, and it is more preferred that one to four of the compounds be used. Use of a compound having a broad molecular weight distribution is also effective in solubility; hence, a preferred example of use of these compounds is as follows: one compound is selected from the compounds represented by Formulae (ii.1.1) and (ii.1.2), one compound is selected from the compounds represented by Formulae (ii.1.4) and (ii.1.5), one compound is selected from the compounds represented by Formulae (ii.1.6) and (ii.1.7), one compound is selected from the compounds represented by Formulae (ii.1.8) and (ii.1.9), and a proper combination of the selected compounds is determined. In particular, the compounds represented by Formulae (ii.1.1), (ii.1.3), (ii.1.4), (ii.1.6), and (ii.1.9) are preferably employed.

In the case where only one compound is selected, the compound represented by Formula (ii.1.4) is preferably employed. In the case where two compounds are selected, the compounds represented by Formulae (ii.1.1) and (ii.1.6) are preferably employed. In the case where three compounds are selected, the compounds represented by Formulae (ii.1.1), (ii.1.4), and (ii.1.6) are preferably employed.

Alternatively or additionally, the compound represented by General Formula (ii) is, for example, preferably at least one compound selected from the group consisting of compounds represented by General Formula (ii-2).

[Chem. 8]

(ii-2)

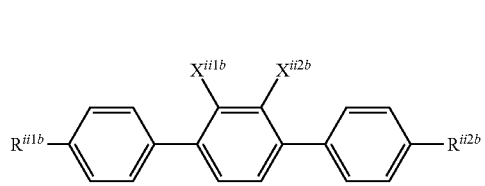

In General Formula (ii-2), $R^{ii1b}$ and $R^{ii2b}$ each independently represent an alkyl group having 1 to 5 carbon atoms or an alkenyl group having 2 to 5 carbon atoms, at least one of them represents an alkenyl group having 2 to 5 carbon atoms, and $X^{ii1b}$ and $X^{ii2b}$ each independently represent a hydrogen atom or a fluorine atom.

Such compounds can be used in any combination; a proper combination of the compounds is determined on the basis of the intended properties such as solubility at low temperature, transition temperature, electric reliability, and birefringence.

The amount of the compound represented by General Formula (ii-2) needs to be appropriately adjusted on the basis of the intended properties such as solubility at low temperature, transition temperature, electric reliability, birefringence, process adaptability, droplet stains, screen burn-in, and dielectric anisotropy. The amount of the compound represented by General Formula (ii-2) is, for example, preferably in the range of 1 to 20 mass %, also preferably 1 to 15 mass %, and also preferably 1 to 13 mass % relative to the total mass of the liquid crystal composition of the present invention. In particular, for example, a preferred amount is as follows: from 1 to 12 mass %, from 1 to 11 mass %, from 1 to 8 mass %, from 1 to 5 mass %, from 4 to 12 mass %, from 5 to 12 mass %, from 8 to 12 mass %, from 11 to 12 mass %, from 4 to 8 mass %, or from 8 to 12 mass %.

The compound represented by General Formula (ii-2) is, for example, preferably at least one compound selected from the group consisting of compounds represented by Formulae (ii.2.1) to (ii.2.8); among these, the compound represented by Formula (ii.2.2) is preferred.

[Chem. 9]

(ii.2.1)

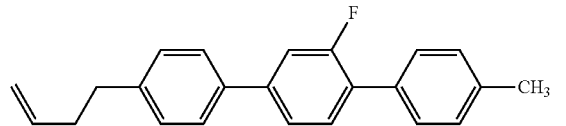

(ii.2.2)

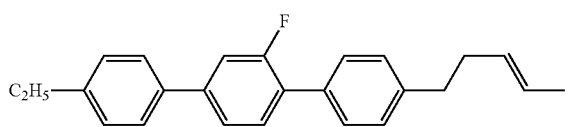

(ii.2.3)

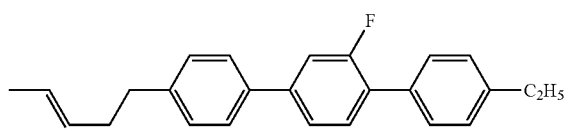

(ii.2.4)

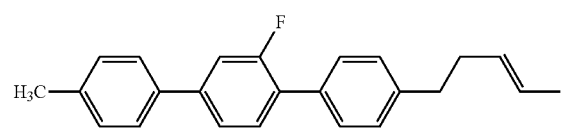

(ii.2.5)

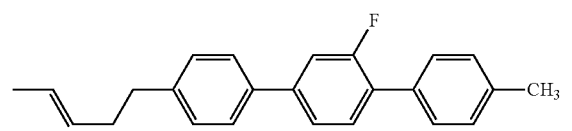

(ii.2.6)

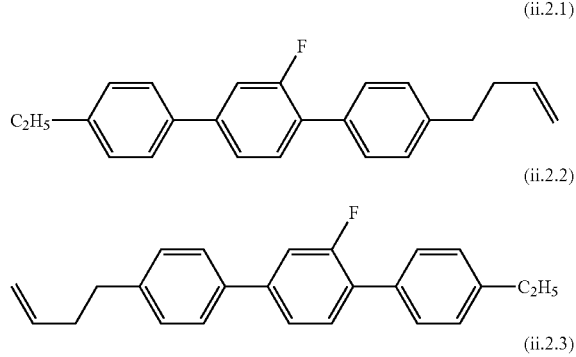

Using a compound having a broad molecular weight distribution as a component of the liquid crystal composition is also effective in solubility; hence, in terms of an improvement in the solubility of the liquid crystal composition, a preferred example of use of these compounds is as follows: one compound is selected from the compounds represented by Formulae (ii.2.1) and (ii.2.2), one compound is selected from the compounds represented by Formulae (ii.2.3) and (ii.2.4), one compound is selected from the compounds represented by Formulae (ii.2.5) and (ii.2.6), one compound is selected from the compounds represented by Formulae (ii.2.7) and (ii.2.8), and a proper combination of these selected compounds is determined.

In the liquid crystal composition of the present invention, the amount of the compound represented by Formula (ii.2.4) is preferably in the range of 3 mass % to 25 mass %, also preferably 5 mass % to 20 mass %, also preferably 5 mass % to 15 mass %, also preferably 7 mass % to 15 mass %, and also preferably 10 mass % to 12 mass % relative to the total mass of the liquid crystal composition of the present invention in view of solubility at low temperature, transition temperature, electric reliability, and another property.

The liquid crystal composition of the present invention can further contain at least one compound represented by General Formula (L).

[Chem. 10]

  (L)

In General Formula (L), $R^{L1}$ and $R^{L2}$ each independently represent an alkyl group having 1 to 8 carbon atoms, and one —$CH_2$— group or at least two —$CH_2$— groups not adjoining each other in the alkyl group are each independently optionally substituted with —CH═CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of
(a) a 1,4-cyclohexylene group (of which one —CH$_2$— group or at least two —CH$_2$— groups not adjoining each other are optionally substituted with —O—) and
(b) a 1,4-phenylene group (of which one —CH═ group or at least two —CH═ groups not adjoining each other are optionally substituted with —N═), and
at least one hydrogen atom of each of the groups (a) and (b) is independently optionally substituted with a cyano group, a fluorine atom, or a chlorine atom;

$L^{L1}$ and $L^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH═N—N═CH—, —CH═CH—, —CF═CF—, or —C≡C—;

in the case where OL is 2 or 3 and where $L^{L2}$ is multiple, the multiple $L^{L2}$'s may be the same as or different from each other;

in the case where OL is 2 or 3 and where $B^{L3}$ is multiple, the multiple $B^{L3}$'s may be the same as or different from each other; and the compound represented by General Formula (L) excludes the compound represented by General Formula (ii).

Such compounds can be used in any combination; a proper combination of the compounds is determined on the basis of predetermined properties such as solubility at low temperature, transition temperature, electric reliability, and birefringence (refractive index anisotropy). In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven of the compounds are used. In another embodiment of the present invention, eight of the compounds are used. In another embodiment of the present invention, nine of the compounds are used. In another embodiment of the present invention, ten or more of the compounds are used.

In the liquid crystal composition of the present invention, the amount of the compound represented by General Formula (L) needs to be appropriately adjusted on the basis of the intended properties such as solubility at low temperature, transition temperature, electric reliability, birefringence, process adaptability, droplet stains, screen burn-in, and dielectric anisotropy.

The amount of the compound represented by General Formula (L) is, for instance, in the range of 20 to 95 mass % in an embodiment of the present invention, 30 to 95 mass % in another embodiment of the present invention, 40 to 95 mass % in another embodiment of the present invention, 43 to 95 mass % in another embodiment of the present invention, 44 to 95 mass % in another embodiment of the present invention, 57 to 95 mass % in another embodiment of the present invention, 67 to 95 mass % in another embodiment of the present invention, 89 to 95 mass % in another embodiment of the present invention, 40 to 92 mass % in another embodiment of the present invention, 40 to 90 mass % in another embodiment of the present invention, 40 to 57 mass % in another embodiment of the present invention, 40 to 49 mass % in another embodiment of the present invention, 40 to 46 mass % in another embodiment of the present invention, 43 to 92 mass % in another embodiment of the present invention, 44 to 92 mass % in another embodiment of the present invention, 57 to 92 mass % in another embodiment of the present invention, 67 to 92 mass % in another embodiment of the present invention, 89 to 92 mass % in another embodiment of the present invention, 43 to 90 mass % in another embodiment of the present invention, 43 to 57 mass % in another embodiment of the present invention, 43 to 49 mass % in another embodiment of the present invention, 43 to 46 mass % in another embodiment of the present invention, 44 to 46 mass % in another embodiment of the present invention, 49 to 57 mass % in another embodiment of the present invention, 57 to 67 mass % in another embodiment of the present invention, 57 to 90 mass % in another embodiment of the present invention, and 67 to 90 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a high temperature stability, it is preferred that the above-mentioned lower limit be high and that the upper limit be high. In order to increase dielectric anisotropy for keeping driving voltage at a low level, it is preferred that the above-mentioned lower limit be low and that the upper limit be low.

In the case where the ring structures bonded to $R^{L1}$ and $R^{L2}$ are phenyl groups (aromatics), $R^{L1}$ and $R^{L2}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{L1}$ and $R^{L2}$ are saturated rings such as cyclohexane, pyran, and dioxane, $R^{L1}$ and $R^{L2}$ are each preferably a linear alkyl group having 1 to 5 carbon atoms, a linear alkoxy group having 1 to 4 (or more) carbon atoms, or a linear alkenyl group having 2 to 5 carbon atoms.

In the case where the liquid crystal composition needs to be chemically stable, it is preferred that the molecules of the compound represented by General Formula (L) be free from a chlorine atom.

The compound represented by General Formula (L) is, for example, preferably a compound selected from the group consisting of compounds represented by General Formula (I).

[Chem. 11]

$$R^{11}\text{-}A^{11}\text{-}A^{12}\text{-}R^{12} \qquad (I)$$

In General Formula (I), $R^{11}$ and $R^{12}$ each independently represent an alkyl group having 1 to 5 carbon atoms, an alkoxy group having 1 to 5 carbon atoms, or an alkenyl group having 2 to 5 carbon atoms; and $A^{11}$ and $A^{12}$ each independently represent a 1,4-cyclohexylene group, a 1,4-phenylene group, a 2-fluoro-1,4-phenylene group, or a 3-fluoro-1,4-phenylene group.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (I) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (I) is, for instance, 10 to 60 mass % in an embodiment of the present invention, 10 to 55 mass % in another embodiment of the present invention, 10 to 50 mass % in another embodiment of the present invention, 10 to 48 mass % in another embodiment of the present invention, 10 to 40 mass % in another embodiment of the present invention, 10 to 39 mass % in another embodiment of the present invention, 10 to 37 mass % in another embodiment of the present invention, 15 to 55 mass % in another embodiment of the present invention, 16 to 55 mass % in another embodiment of the present invention, 37 to 55 mass % in another embodiment of the present invention, 43 to 55 mass % in another embodiment of the present invention, 15 to 48 mass % in another embodiment of the present invention, 15 to 40 mass % in another embodiment of the present invention, 15 to 39 mass % in another embodiment of the present invention, 15 to 37 mass % in another embodiment of the present invention, 15 to 17 mass % in another embodiment of the present invention, 16 to 40 mass % in another embodiment of the present invention, 16 to 39 mass % in another embodiment of the present invention, 16 to 37 mass % in another embodiment of the present invention, and 43 to 48 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a good temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

In the case where the ring structures bonded to $R^{11}$ and $R^{12}$ are phenyl groups (aromatics), $R^{11}$ and $R^{12}$ are each preferably a linear alkyl group having 1 to 5 carbon atoms, a linear alkoxy group having 1 to 4 carbon atoms, or an alkenyl group having 4 or 5 carbon atoms; in the case where the ring structures bonded to $R^{11}$ and $R^{12}$ are saturated rings such as cyclohexane, pyran, and dioxane, $R^{11}$ and $R^{12}$ are each preferably a linear alkyl group having 1 to 5 carbon atoms, a linear alkoxy group having 1 to 4 carbon atoms, or a linear alkenyl group having 2 to 5 carbon atoms.

The compound represented by General Formula (I) is preferably at least one compound selected from the group consisting of compounds represented by General Formula (I-1).

[Chem. 12]

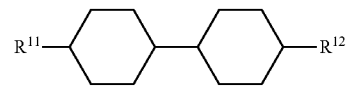

(I-1)

In General Formula (I-1), $R^{11}$ and $R^{12}$ each independently represent an alkyl group having 1 to 5 carbon atoms, an alkoxy group having 1 to 5 carbon atoms, or an alkenyl group having 2 to 5 carbon atoms.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five or more of the compounds are used.

In the case where the liquid crystal composition of the present invention contains the compound represented by General Formula (I-1), the amount thereof needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (I-1) is, for example, 10 to 60 mass % in an embodiment of the present invention, 10 to 55 mass % in another embodiment of the present invention, 10 to 50 mass % in another embodiment of the present invention, 10 to 48 mass % in another embodiment of the present invention, 10 to 40 mass % in another embodiment of the present invention, 10 to 39 mass % in another embodiment of the present invention, 10 to 37 mass % in another embodiment of the present invention, 15 to 55 mass % in another embodiment of the present invention, 16 to 55 mass % in another embodiment of the present invention, 37 to 55 mass % in another embodiment of the present invention, 43 to 55 mass % in another embodiment of the present invention, 15 to 48 mass % in another embodiment of the present invention, 15 to 40 mass % in another embodiment of the present invention, 15 to 39 mass % in another embodiment of the present invention, 15 to 37 mass % in another embodiment of the present invention, 15 to 17 mass % in another embodiment of the present invention, 16 to 40 mass % in another embodiment of the present invention, 16 to 39 mass % in another embodiment of the present invention, 16 to 37 mass % in another embodiment of the present invention, and 43 to 48 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be high and that the upper limit be high. In the case where the liquid crystal composition of the present invention needs to have a Tni kept at a high level to have a good temperature stability, it is preferred that the above-mentioned lower limit be moderate and that the upper limit be moderate. In order to increase dielectric anisotropy for keeping driving voltage at a low level, it is preferred that the above-mentioned lower limit be low and that the upper limit be low.

Alternatively or additionally, the compound represented by General Formula (I-1) is preferably at least one compound selected from the group consisting of compounds represented by General Formula (I-1-1).

[Chem. 13]

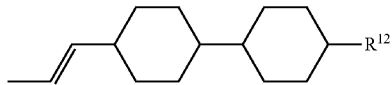

(I-1-1)

In General Formula (I-1-1), $R^{12}$ represents an alkyl group having 1 to 5 carbon atoms, an alkenyl group having 2 to 5 carbon atoms, or an alkoxy group having 1 to 5 carbon atoms.

In the liquid crystal composition of the present invention, the amount of the compound represented by General Formula (I-1-1) needs to be appropriately adjusted on the basis of the intended properties such as solubility at low temperature, transition temperature, electric reliability, birefringence, process adaptability, droplet stains, screen burn-in, and dielectric anisotropy.

The amount of the compound represented by General Formula (I-1-1) is, for example, from 1 to 35 mass % in an embodiment of the present invention, 1 to 30 mass % in another embodiment of the present invention, 1 to 26 mass % in another embodiment of the present invention, 1 to 17 mass % in another embodiment of the present invention, 1 to 16 mass % in another embodiment of the present invention, 1 to 12 mass % in another embodiment of the present invention, 1 to 10 mass % in another embodiment of the present invention, 1 to 30 mass % in another embodiment of the present invention, 2 to 30 mass % in another embodiment of the present invention, 6 to 30 mass % in another embodiment of the present invention, 7 to 30 mass % in another embodiment of the present invention, 8 to 30 mass % in another embodiment of the present invention, 10 to 30 mass % in another embodiment of the present invention, 2 to 26 mass % in another embodiment of the present invention, 2 to 17 mass % in another embodiment of the present invention, 2 to 12 mass % in another embodiment of the present invention, 2 to 10 mass % in another embodiment of the present invention, 6 to 26 mass % in another embodiment of the present invention, 6 to 16 mass % in another embodiment of the present invention, 7 to 26 mass % in another embodiment of the present invention, 7 to 16 mass % in another embodiment of the present invention, and 8 to 12 mass % in another embodiment of the present invention relative to the total mass of the liquid crystal composition of the present invention.

The compound represented by General Formula (I-1-1) is preferably a compound selected from the group consisting of compounds represented by Formulae (1.1) to (1.3); among these, the compound represented by Formula (1.2) or (1.3) is preferred, and the compound represented by Formula (1.3) is especially preferred.

[Chem. 14]

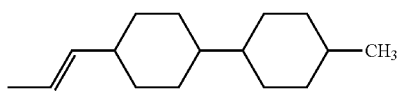

(1.1)

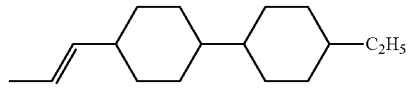

(1.2)

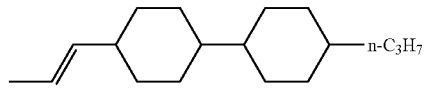

(1.3)

In the case where the compound represented by Formula (1.2) or (1.3) is used alone, the amount of the compound represented by Formula (1.2) is preferably large because it is effective in improving a response speed, and the amount of the compound represented by Formula (1.3) is preferably within the following ranges because it contributes to production of a liquid crystal composition which enables a quick response and which has high electric reliability and optical reliability.

The amount of the compound represented by Formula (1.3) is, for instance, from 1 to 25 mass % in an embodiment of the present invention, 1 to 20 mass % in another embodiment of the present invention, 1 to 16 mass % in another embodiment of the present invention, 1 to 12 mass % in another embodiment of the present invention, 1 to 10 mass % in another embodiment of the present invention, 1 to 5 mass % in another embodiment of the present invention, 2 to 16 mass % in another embodiment of the present invention, 2 to 12 mass % in another embodiment of the present invention, 2 to 10 mass % in another embodiment of the present invention, 2 to 5 mass % in another embodiment of the present invention, 6 to 16 mass % in another embodiment of the present invention, 7 to 16 mass % in another embodiment of the present invention, 7 to 10 mass % in another embodiment of the present invention, 7 to 8 mass % in another embodiment of the present invention, and 8 to 12 mass % in another embodiment of the present invention relative to the total mass of the liquid crystal composition of the present invention.

Alternatively or additionally, the compound represented by General Formula (I-1) is preferably at least one compound selected from the group consisting of compounds represented by General Formula (I-1-2).

[Chem. 15]

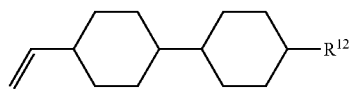

(I-1-2)

In General Formula (I-1-2), $R^{12}$ represents an alkyl group having 1 to 5 carbon atoms, an alkoxy group having 1 to 5 carbon atoms, or an alkenyl group having 2 to 5 carbon atoms.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-1-2) needs to be appropriately adjusted on the basis of the intended properties such as solubility at low temperature, transition temperature, electric reliability, birefringence, process adaptability, droplet stains, screen burn-in, and dielectric anisotropy.

The amount of the compound represented by General Formula (I-1-2) is, for instance, from 1 to 50 mass % in an embodiment of the present invention, 1 to 45 mass % in another embodiment of the present invention, 1 to 41 mass % in another embodiment of the present invention, 1 to 39 mass % in another embodiment of the present invention, 1 to 26 mass % in another embodiment of the present invention, 1 to 17 mass % in another embodiment of the present invention, 1 to 7 mass % in another embodiment of the present invention, 3 to 41 mass % in another embodiment of the present invention, 3 to 39 mass % in another embodiment of the present invention, 3 to 26 mass % in another embodiment of the present invention, 3 to 17 mass % in another embodiment of the present invention, 3 to 7 mass % in another embodiment of the present invention, 12 to 41 mass % in another embodiment of the present invention, 14 to 41 mass % in another embodiment of the present invention, 27 to 41 mass % in another embodiment of the present invention, 12 to 39 mass % in another embodiment of the present invention, 12 to 26 mass % in another embodiment of the present invention, and 12 to 17 mass % in another embodiment of the present invention relative to the total mass of the liquid crystal composition of the present invention.

The compound represented by General Formula (I-1-2) is preferably a compound selected from the group consisting of compounds represented by Formulae (2.1) to (2.4); among these, the compounds represented by Formulae (2.2) to (2.4) are preferred. In particular, the compound represented by Formula (2.2) is preferred because it especially enhances the response speed of the liquid crystal composition of the present invention. If high Tni is needed rather than the response speed, it is preferred that the compound represented by Formula (2.3) or (2.4) be employed. In order to improve solubility at low temperature, it is preferred that the amount of each of the compounds represented by Formulae (2.3) and (2.4) be less than 30 mass %.

[Chem. 16]

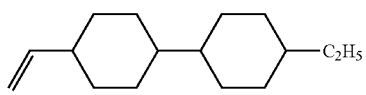
(2.1)

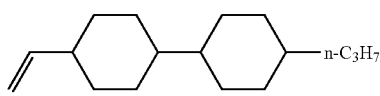
(2.2)

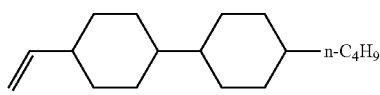
(2.3)

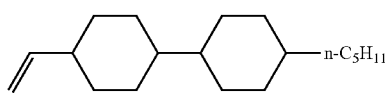
(2.4)

In the liquid crystal composition of the present invention, the amount of the compound represented by Formula (2.2) is preferably in the range of 5 mass % to 50 mass %, also preferably 5 mass % to 45 mass %, and also preferably 10 mass % to 45 mass % relative to the total mass of the liquid crystal composition of the present invention. In particular, a preferred amount is as follows: from 12 mass % to 41 mass %, from 12 mass % to 39 mass %, from 12 mass % to 26 mass %, from 12 mass % to 17 mass %, from 14 mass % to 41 mass %, from 14 mass % to 39 mass %, from 14 mass % to 26 mass %, or from 27 mass % to 41 mass %.

In the liquid crystal composition of the present invention, the amount of the compound represented by Formula (2.3) is preferably in the range of 1 mass % to 25 mass %, also preferably 5 mass % to 20 mass %, also preferably 10 mass % to 15 mass %, and also preferably 6 mass % to 15 mass % relative to the total mass of the liquid crystal composition of the present invention.

In the liquid crystal composition of the present invention, the amount of the compound represented by Formula (2.4) is preferably in the range of 1 mass % to 25 mass %, more preferably 1 mass % to 20 mass %, also preferably 1 mass % to 15 mass %, also preferably 1 mass % to 10 mass %, and also preferably 3 mass % to 7 mass % relative to the total mass of the liquid crystal composition of the present invention.

The liquid crystal composition of the present invention can further contain a compound which is represented by Formula (2.5) and which has a structure similar to that of the compound represented by General Formula (I-1-2).

[Chem. 17]

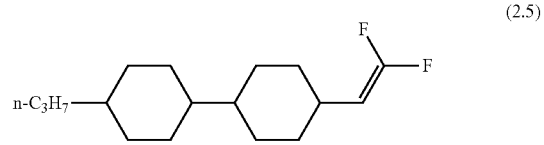
(2.5)

The amount of the compound represented by Formula (2.5) is preferably adjusted on the basis of the intended properties such as solubility at low temperature, transition temperature, electric reliability, and birefringence; the amount is preferably in the range of 0 to 40 mass %, also preferably 1 to 35 mass %, also preferably 1 to 30 mass %, and also preferably 5 to 28 mass % relative to the total mass of the liquid crystal composition of the present invention.

Alternatively or additionally, the compound represented by General Formula (I) is preferably at least one compound selected from the group consisting of compounds represented by General Formula (I-2).

[Chem. 18]

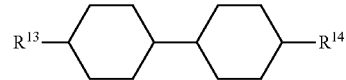
(I-2)

In General Formula (I-2), $R^{13}$ and $R^{14}$ each independently represent an alkyl group having 1 to 5 carbon atoms.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-2) needs to be appropriately adjusted on the basis of the intended properties such as solubility at low temperature, transition temperature, electric reliability, birefringence, process adaptability, droplet stains, screen burn-in, and dielectric anisotropy.

The amount of the compound represented by General Formula (I-2) is, for example, from 1 to 30 mass % in an embodiment of the present invention, 2 to 30 mass % in another embodiment of the present invention, 4 to 30 mass % in another embodiment of the present invention, 6 to 30 mass % in another embodiment of the present invention, 10 to 30 mass % in another embodiment of the present invention, 15 to 30 mass % in another embodiment of the present invention, and 20 to 30 mass % in another embodiment of the present invention relative to the total mass of the liquid crystal composition of the present invention.

Furthermore, the amount of the compound represented by General Formula (I-2) is, for instance, in the range of 1 to 25 mass % in an embodiment of the present invention, 1 to 23 mass % in another embodiment of the present invention, 1 to 18 mass % in another embodiment of the present invention, 1 to 15 mass % in another embodiment of the present invention, 1 to 12 mass % in another embodiment of the present invention, 1 to 10 mass % in another embodiment of the present invention, and 1 to 5 mass % in another embodiment of the present invention relative to the total mass of the liquid crystal composition of the present invention.

The compound represented by General Formula (I-2) is preferably at least one compound selected from the group consisting of compounds represented by Formulae (3.1) to (3.4); among these, the compound represented by Formula (3.1), the compound represented by Formula (3.3), and/or the compound represented by Formula (3.4) are preferred. In particular, the compound represented by Formula (3.2) is preferred because it especially enhances the response speed of the liquid crystal composition of the present invention. In the case where high Tni is needed rather than the response speed, it is preferred that the compound represented by Formula (3.3) and/or (3.4) be employed. In order to improve solubility at low temperature, it is preferred that the amount of each of the compounds represented by Formulae (3.3) and (3.4) be less than 20 mass %.

[Chem. 19]

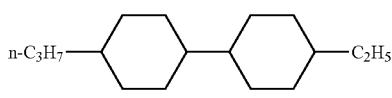
(3.1)

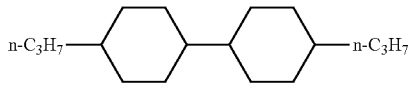
(3.2)

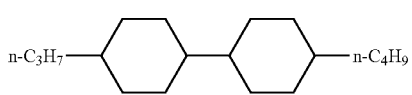
(3.3)

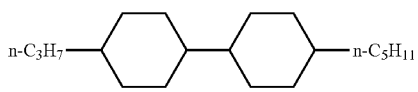
(3.4)

In the liquid crystal composition of the present invention, the preferred amount of the compound represented by Formula (3.3) is in the range of 2 mass % to 40 mass % relative to the total mass of the liquid crystal composition of the present invention. Examples of the more preferred amount thereof are as follows: from 3 mass % to 40 mass %, from 4 mass % to 40 mass %, from 10 mass % to 40 mass %, from 12 mass % to 40 mass %, from 14 mass % to 40 mass %, from 16 mass % to 40 mass %, from 20 mass % to 40 mass %, from 23 mass % to 40 mass %, from 26 mass % to 40 mass %, from 30 mass % to 40 mass %, from 34 mass % to 40 mass %, from 37 mass % to 40 mass %, from 3 mass % to 4 mass %, from 3 mass % to 10 mass %, from 3 mass % to 12 mass %, from 3 mass % to 14 mass %, from 3 mass % to 16 mass %, from 3 mass % to 20 mass %, from 3 mass % to 23 mass %, from 3 mass % to 26 mass %, from 3 mass % to 30 mass %, from 3 mass % to 34 mass %, and from 3 mass % to 37 mass %.

Alternatively or additionally, the compound represented by General Formula (I) is preferably at least one compound selected from the group consisting of compounds represented by General Formula (I-3).

[Chem. 20]

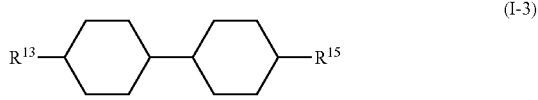
(I-3)

In General Formula (I-3), $R^{13}$ represents an alkyl group having 1 to 5 carbon atoms, and $R^{15}$ represents an alkoxy group having 1 to 4 carbon atoms.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used.

In the liquid crystal composition of the present invention, the amount of the compound represented by General Formula (I-3) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (I-3) is, for example, from 3 to 30 mass % in an embodiment of the present invention, 4 to 30 mass % in another embodiment of the present invention, 15 to 30 mass % in another embodiment of the present invention, 25 to 30 mass % in another embodiment of the present invention, 3 to 25 mass % in another embodiment of the present invention, 3 to 20 mass % in another embodiment of the present invention, 3 to 15 mass % in another embodiment of the present invention, and 3 to 5 mass % in another embodiment of the present invention relative to the total mass of the liquid crystal composition of the present invention.

In terms of solubility at low temperature, the amount is adjusted to be larger to produce a greater effect; in terms of response speed, the amount is adjusted to be smaller to produce a greater effect. In order to improve properties related to droplet stains and screen burn-in, the range of the amount is preferably adjusted to be intermediate.

The compound represented by General Formula (I-3) is preferably at least one compound selected from the group consisting of compounds represented by Formulae (4.1) to (4.3); in particular, the compound represented by Formula (4.3) is preferred.

[Chem. 21]

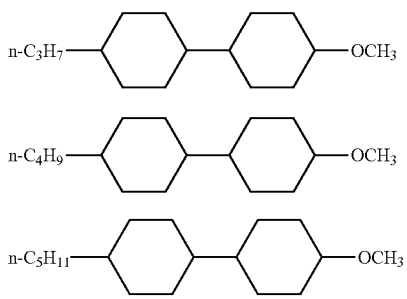

The amount of the compound represented by Formula (4.3) is preferably in the range of 2 mass % to 30 mass %, also preferably 4 mass % to 30 mass %, also preferably 6 mass % to 30 mass %, also preferably 8 mass % to 30 mass %, also preferably 10 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and especially preferably 22 mass % to 23 mass % relative to the total mass of the liquid crystal composition of the present invention.

Alternatively or additionally, the compound represented by General Formula (I) is preferably at least one compound selected from the group consisting of compounds represented by General Formula (I-4).

[Chem. 22]

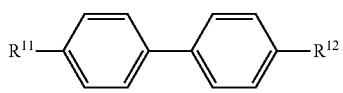

In General Formula (I-4), $R^{11}$ and $R^{12}$ each independently represent an alkyl group having 1 to 5 carbon atoms, an alkenyl group having 4 or 5 carbon atoms, or an alkoxy group having 1 to 4 carbon atoms.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-4) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (I-4) is, for example, 2 to 30 mass % in an embodiment of the present invention, 5 to 30 mass % in another embodiment of the present invention, 6 to 30 mass % in another embodiment of the present invention, 8 to 30 mass % in another embodiment of the present invention, 10 to 30 mass % in another embodiment of the present invention, 12 to 30 mass % in another embodiment of the present invention, 15 to 30 mass % in another embodiment of the present invention, 20 to 30 mass % in another embodiment of the present invention, 25 to 30 mass % in another embodiment of the present invention, 2 to 25 mass % in another embodiment of the present invention, 2 to 20 mass % in another embodiment of the present invention, 2 to 15 mass % in another embodiment of the present invention, and 2 to 10 mass % in another embodiment of the present invention relative to the total mass of the liquid crystal composition of the present invention.

In terms of an enhancement in birefringence, the amount is adjusted to be larger to produce a greater effect; in terms of high Tni, the amount is adjusted to be smaller to produce a greater effect. In order to improve properties related to droplet stains and screen burn-in, the range of the amount is preferably adjusted to be intermediate.

The compound represented by General Formula (I-4) is preferably at least one compound selected from the group consisting of compounds represented by Formulae (5.1) to (5.4); among these, at least one compound selected from the group consisting of the compounds represented by Formulae (5.2) to (5.4) is preferred.

[Chem. 23]

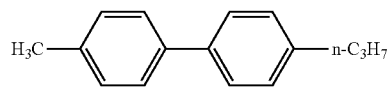

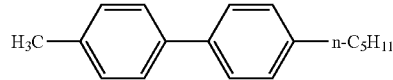

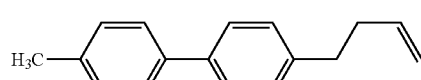

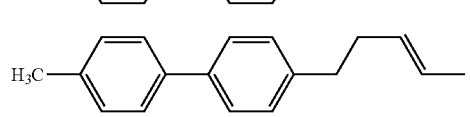

The amount of the compound represented by Formula (5.4) is preferably in the range of 2 mass % to 30 mass % relative to the total mass of the liquid crystal composition of the present invention. In particular, for example, a preferred amount is as follows: from 4 mass % to 30 mass %, from 6 mass % to 30 mass %, from 8 mass % to 30 mass %, from 10 mass % to 30 mass %, from 12 mass % to 30 mass %, from 14 mass % to 30 mass %, from 16 mass % to 30 mass %, from 18 mass % to 30 mass %, from 20 mass % to 30 mass %, from 22 mass % to 30 mass %, from 23 mass % to 30 mass %, from 24 mass % to 30 mass %, from 25 mass % to 30 mass %, from 4 mass % to 6 mass %, from 4 mass % to 8 mass %, from 4 mass % to 10 mass %, from 4 mass % to 12 mass %, from 4 mass % to 14 mass %, from 4 mass % to 16 mass %, from 4 mass % to 18 mass %, from 4 mass % to 20 mass %, from 4 mass % to 22 mass %, from 4 mass % to 23 mass %, from 4 mass % to 24 mass %, and from 4 mass % to 25 mass %.

Alternatively or additionally, the compound represented by General Formula (I) is preferably at least one compound selected from the group consisting of compounds represented by General Formula (I-5).

[Chem. 24]

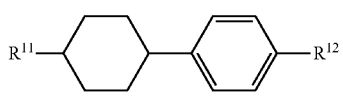

(I-5)

In General Formula (I-5), $R^{11}$ represents an alkyl group having 1 to 5 carbon atoms, an alkenyl group having 2 to 5 carbon atoms, or an alkoxy group having 1 to 4 carbon atoms; and $R^{12}$ represents an alkyl group having 1 to 5 carbon atoms, an alkenyl group having 4 or 5 carbon atoms, or an alkoxy group having 1 to 4 carbon atoms.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used.

In the liquid crystal composition of the present invention, the amount of the compound represented by General Formula (I-5) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (I-5) is, for example, 1 to 30 mass % in an embodiment of the present invention, 5 to 30 mass % in another embodiment of the present invention, 8 to 30 mass % in another embodiment of the present invention, 11 to 30 mass % in another embodiment of the present invention, 13 to 30 mass % in another embodiment of the present invention, 15 to 30 mass % in another embodiment of the present invention, 17 to 30 mass % in another embodiment of the present invention, 20 to 30 mass % in another embodiment of the present invention, 25 to 30 mass % in another embodiment of the present invention, 1 to 25 mass % in another embodiment of the present invention, 1 to 20 mass % in another embodiment of the present invention, 1 to 15 mass % in another embodiment of the present invention, 1 to 10 mass % in another embodiment of the present invention, and 1 to 5 mass % in another embodiment of the present invention relative to the total mass of the liquid crystal composition of the present invention.

In terms of solubility at low temperature, the amount is adjusted to be larger to produce a greater effect; in terms of response speed, the amount is adjusted to be smaller to produce a greater effect. In order to improve properties related to droplet stains and screen burn-in, the range of the amount is preferably adjusted to be intermediate.

The compound represented by General Formula (I-5) is preferably at least one compound selected from the group consisting of compounds represented by Formulae (6.1) to (6.6); among these, the compound represented by Formula (6.3), the compound represented by Formula (6.4), and/or the compound represented by Formula (6.6) are preferred.

[Chem. 25]

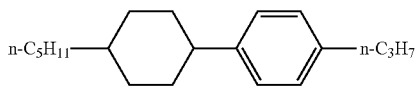

(6.1)

-continued

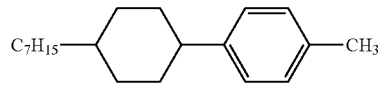

(6.2)

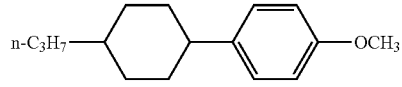

(6.3)

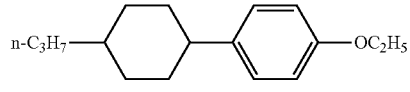

(6.4)

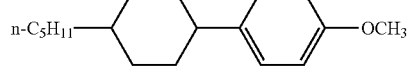

(6.5)

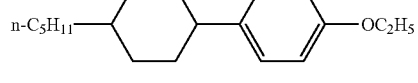

(6.6)

The amount of the compound represented by Formula (6.6) is, for instance, preferably in the range of 2 mass % to 30 mass %, also preferably 4 mass % to 30 mass %, also preferably 5 mass % to 30 mass %, also preferably 6 mass % to 30 mass %, also preferably 9 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and also preferably 22 mass % to 23 mass % relative to the total mass of the liquid crystal composition of the present invention.

The compound represented by General Formula (1-5), which can be further contained in the liquid crystal composition of the present invention, can also be a compound represented by Formula (6.7) and/or a compound represented by Formula (6.8).

[Chem. 26]

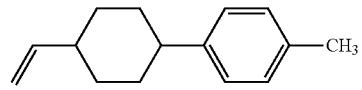

(6.7)

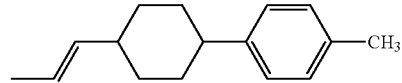

(6.8)

The amount of the compound represented by Formula (6.7) is preferably adjusted on the basis of the intended properties such as solubility at low temperature, transition temperature, electric reliability, and birefringence; the amount of this compound is preferably in the range of 2 mass % to 30 mass %, also preferably 3 mass % to 27 mass %, also preferably 5 mass % to 25 mass %, and also preferably 7 mass % to 23 mass % relative to the total mass of the liquid crystal composition of the present invention.

Alternatively or additionally, the compound represented by General Formula (I) is preferably at least one compound selected from the group consisting of compounds represented by General Formula (I-6).

[Chem. 27]

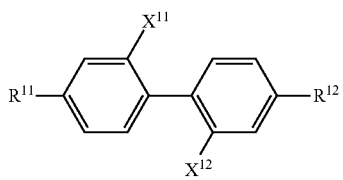

(I-6)

In Formula (I-6), $R^{11}$ and $R^{12}$ each independently represent an alkyl group having 1 to 5 carbon atoms, an alkenyl group having 4 or 5 carbon atoms, or an alkoxy group having 1 to 4 carbon atoms; $X^{11}$ and $X^{12}$ each independently represent a fluorine atom or a hydrogen atom; and any one of $X^{11}$ and $X^{12}$ is a fluorine atom.

The amount of the compound represented by General Formula (I-6) is preferably in the range of 2 mass % to 30 mass %, also preferably 4 mass % to 30 mass %, also preferably 5 mass % to 30 mass %, also preferably 6 mass % to 30 mass %, also preferably 9 mass % to 30 mass %, also preferably 12 mass % to 30 mass %, also preferably 14 mass % to 30 mass %, also preferably 16 mass % to 30 mass %, also preferably 18 mass % to 25 mass %, also preferably 20 mass % to 24 mass %, and also preferably 22 mass % to 23 mass % relative to the total mass of the liquid crystal composition of the present invention.

The compound represented by General Formula (I-6) is preferably a compound represented by Formula (7.1).

[Chem. 28]

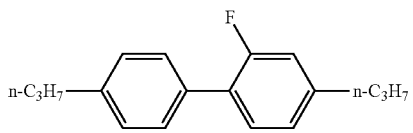

(7.1)

Alternatively or additionally, the compound represented by General Formula (I) is preferably a compound selected from the group consisting of compounds represented by General Formula (I-7).

[Chem. 29]

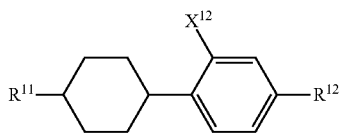

(I-7)

In General Formula (I-7), $R^{11}$ and $R^{12}$ each independently represent an alkyl group having 1 to 5 carbon atoms, an alkenyl group having 2 to 5 carbon atoms, or an alkoxy group having 1 to 4 carbon atoms; and $X^{12}$ represents a fluorine atom or a chlorine atom.

The amount of the compound represented by General Formula (I-7) is preferably in the range of 1 mass % to 20 mass %, also preferably 1 mass % to 15 mass %, also preferably 1 mass % to 10 mass %, and also preferably 1 mass % to 5 mass % relative to the total mass of the liquid crystal composition of the present invention.

The compound represented by General Formula (I-7) is preferably a compound represented by Formula (8.1).

[Chem. 30]

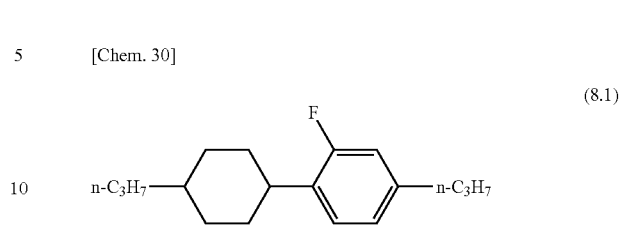

(8.1)

Alternatively or additionally, the compound represented by General Formula (I) is preferably at least one compound selected from the group consisting of compounds represented by General Formula (I-8).

[Chem. 31]

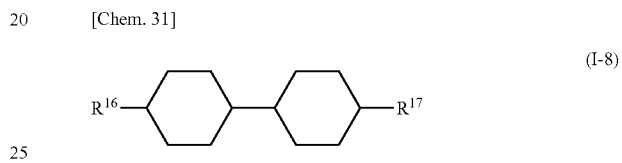

(I-8)

In General Formula (I-8), $R^{16}$ and $R^{17}$ each independently represent an alkenyl group having 2 to 5 carbon atoms.

Such compounds can be used in any combination; in view of the intended properties such as solubility at low temperature, transition temperature, electric reliability, and birefringence, it is preferred that one to three of the compounds be used.

The amount of the compound represented by General Formula (1-8) is preferably from 1 to 30 mass %, also preferably 1 to 25 mass %, also preferably 1 to 20 mass %, also preferably 1 to 18 mass %, and also preferably 3 to 18 mass % relative to the total mass of the liquid crystal composition of the present invention in view of the intended properties such as solubility at low temperature, transition temperature, electric reliability, birefringence, process adaptability, droplet stains, screen burn-in, and dielectric anisotropy.

The compound represented by General Formula (1-8) is preferably at least one compound selected from the group consisting of compounds represented by Formulae (9.1) to (9.10); among these, the compound represented by Formula (9.2), the compound represented by Formula (9.4), and/or the compound represented by Formula (9.7) are preferred.

[Chem. 32]

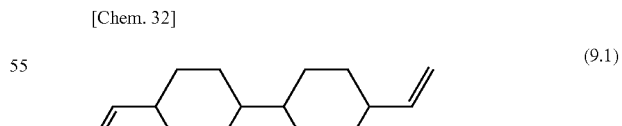

(9.1)

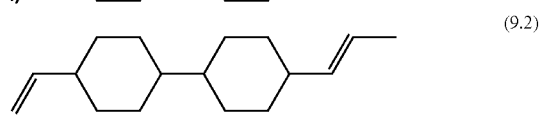

(9.2)

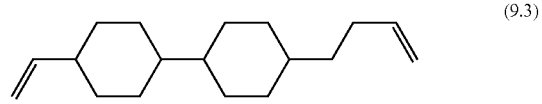

(9.3)

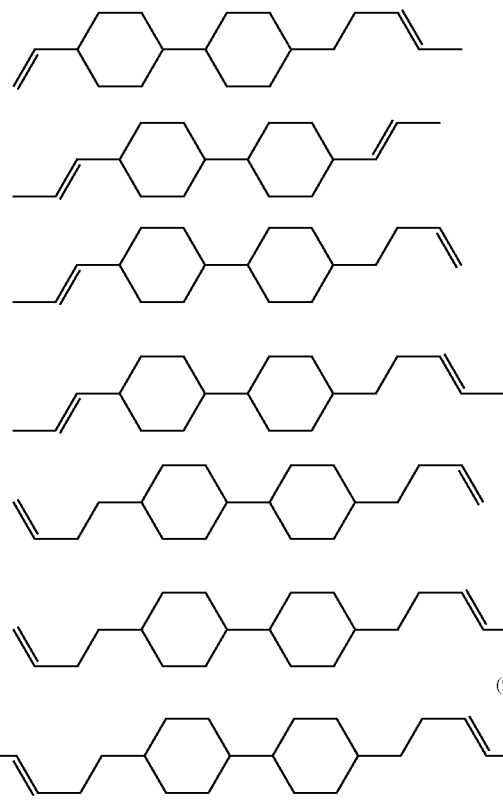

(9.4)
(9.5)
(9.6)
(9.7)
(9.8)
(9.9)
(9.10)

Alternatively or additionally, the compound represented by General Formula (L) is, for example, preferably at least one compound selected from compounds represented by General Formula (II).

[Chem. 33]

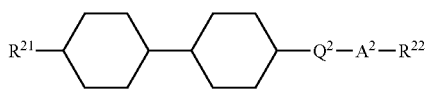

(II)

In General Formula (II), $R^{21}$ and $R^{22}$ each independently represent an alkenyl group having 2 to 5 carbon atoms, an alkyl group having 1 to 5 carbon atoms, or an alkoxy group having 1 to 4 carbon atoms; $A^2$ represents a 1,4-cyclohexylene group or a 1,4-phenylene group; and $Q^2$ represents a single bond, —COO—, —CH$_2$—CH$_2$—, or CF$_2$O—.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

In the liquid crystal composition of the present invention, the amount of the compound represented by General Formula (II) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (II) is, for instance, from 3 to 35 mass % in an embodiment of the present invention, 3 to 30 mass % in another embodiment of the present invention, 3 to 25 mass % in another embodiment of the present invention, 3 to 21 mass % in another embodiment of the present invention, 3 to 20 mass % in another embodiment of the present invention, 3 to 18 mass % in another embodiment of the present invention, 3 to 15 mass % in another embodiment of the present invention, 3 to 12 mass % in another embodiment of the present invention, 4 to 21 mass % in another embodiment of the present invention, 11 to 21 mass % in another embodiment of the present invention, 13 to 21 mass % in another embodiment of the present invention, 15 to 21 mass % in another embodiment of the present invention, 16 to 21 mass % in another embodiment of the present invention, 4 to 12 mass % in another embodiment of the present invention, 11 to 20 mass % in another embodiment of the present invention, 13 to 15 mass % in another embodiment of the present invention, and 15 to 18 mass % in another embodiment of the present invention relative to the total mass of the liquid crystal composition of the present invention.

The compound represented by General Formula (II) is, for instance, preferably at least one compound selected from the group consisting of compounds represented by General Formula (II-1).

[Chem. 34]

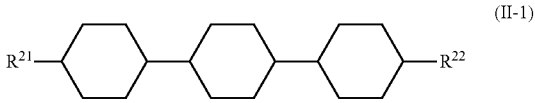

(II-1)

In General Formula (II-1), $R^{21}$ and $R^{22}$ each independently represent an alkenyl group having 2 to 5 carbon atoms, an alkyl group having 1 to 5 carbon atoms, or an alkoxy group having 1 to 4 carbon atoms.

The amount of the compound represented by General Formula (II-1) is preferably adjusted on the basis of the intended properties such as solubility at low temperature, transition temperature, electric reliability, and birefringence; the amount is preferably in the range of 4 mass % to 24 mass %, more preferably 8 mass % to 18 mass %, and further preferably 12 mass % to 14 mass %.

The compound represented by General Formula (II-1) is, for example, preferably a compound represented by Formula (10.1) and/or a compound represented by Formula (10.2).

[Chem. 35]

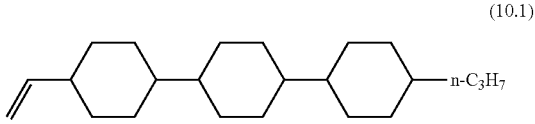

(10.1)

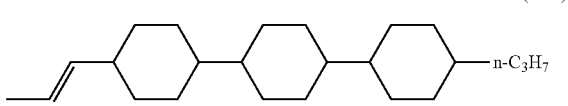

(10.2)

Alternatively or additionally, the compound represented by General Formula (II) is, for instance, preferably at least one compound selected from the group consisting of compounds represented by General Formula (II-2).

[Chem. 36]

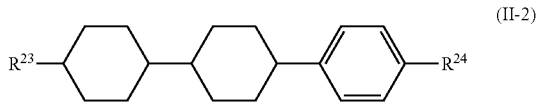

(II-2)

In General Formula (II-2), $R^{23}$ represents an alkenyl group having 2 to 5 carbon atoms, and $R^{24}$ represents an alkyl group having 1 to 5 carbon atoms or an alkoxy group having 1 to 4 carbon atoms.

Such compounds can be used in any combination; a combination of the compounds is determined on the basis of the intended properties such as solubility at low temperature, transition temperature, electric reliability, and birefringence. In an embodiment of the present invention, for example, one of such compounds is used. In another embodiment of the present invention, two or more of the compounds are used.

In the liquid crystal composition of the present invention, the amount of the compound represented by General Formula (II-2) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (II-2) is, for instance, in the range of 3 to 35 mass % in an embodiment of the present invention, 3 to 30 mass % in another embodiment of the present invention, 3 to 25 mass % in another embodiment of the present invention, 3 to 20 mass % in another embodiment of the present invention, 3 to 18 mass % in another embodiment of the present invention, 3 to 15 mass % in another embodiment of the present invention, 3 to 12 mass % in another embodiment of the present invention, 3 to 11 mass % in another embodiment of the present invention, 4 to 20 mass % in another embodiment of the present invention, 6 to 20 mass % in another embodiment of the present invention, 11 to 20 mass % in another embodiment of the present invention, 13 to 20 mass % in another embodiment of the present invention, 15 to 20 mass % in another embodiment of the present invention, 4 to 12 mass % in another embodiment of the present invention, 6 to 11 mass % in another embodiment of the present invention, 13 to 15 mass % in another embodiment of the present invention, and 15 to 18 mass % in another embodiment of the present invention relative to the total mass of the liquid crystal composition of the present invention.

The compound represented by General Formula (II-2) is, for example, preferably at least one compound selected from the group consisting of compounds represented by Formulae (11.1) to (11.3).

[Chem. 37]

(11.1)

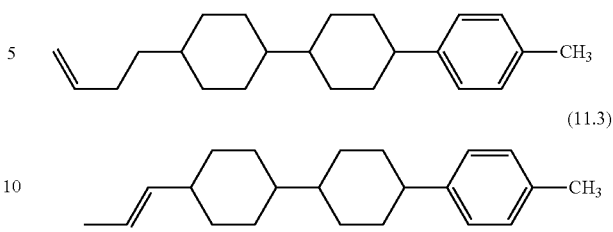

(11.2)

(11.3)

On the basis of the intended properties such as solubility at low temperature, transition temperature, electric reliability, and birefringence, the compound represented by Formula (11.1) may be used; the compound represented by Formula (11.2) may be used; both of the compound represented by Formula (11.1) and the compound represented by Formula (11.2) may be used; or all of the compounds represented by Formulae (11.1) to (11.3) may be used.

The amount of the compound represented by Formula (11.1) is preferably in the range of 1 to 30 mass %, also preferably 2 to 25 mass %, also preferably 2 to 20 mass %, and also preferably 2 to 15 mass % relative to the total mass of the liquid crystal composition of the present invention. In particular, for example, a preferred amount is as follows: from 4 to 15 mass %, from 4 to 13 mass %, from 4 to 12 mass %, from 4 to 11 mass %, from 5 to 15 mass %, from 6 to 15 mass %, from 7 to 15 mass %, from 8 to 15 mass %, from 6 to 11 mass %, and from 7 to 13 mass %.

The amount of the compound represented by Formula (11.2) is preferably in the range of 1 to 30 mass %, also preferably 1 to 25 mass %, also preferably 1 to 20 mass %, and also preferably 1 to 15 mass % relative to the total mass of the liquid crystal composition of the present invention. In particular, the amount is, for example, preferably from 1 to 10 mass %, more preferably 2 to 10 mass %, further preferably 4 to 10 mass %, further preferably 5 to 10 mass %, further preferably 1 to 9 mass %, and further preferably 4 to 8 mass % in an embodiment.

In the case where both the compound represented by Formula (11.1) and the compound represented by Formula (11.2) are used, the total mass thereof is preferably in the range of 1 mass % to 35 mass %, also preferably 1 mass % to 30 mass %, also preferably 1 mass % to 25 mass %, also preferably 1 mass % to 20 mass %, also preferably 1 mass % to 18 mass %, also preferably 1 mass % to 15 mass %, also preferably 1 mass % to 12 mass %, also preferably 1 mass % to 11 mass %, also preferably 4 mass % to 20 mass %, also preferably 6 mass % to 20 mass %, also preferably 11 mass % to 20 mass %, also preferably 13 mass % to 20 mass %, also preferably 15 mass % to 20 mass %, also preferably 4 mass % to 12 mass %, also preferably 6 mass % to 11 mass %, also preferably 13 mass % to 15 mass %, and also preferably 15 mass % to 18 mass % relative to the total mass of the liquid crystal composition of the present invention.

Alternatively or additionally, the compound represented by General Formula (II) is, for example, preferably at least one compound selected from the group consisting of compounds represented by General Formula (II-3).

[Chem. 38]

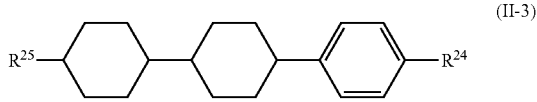

(II-3)

In General Formula (II-3), $R^{25}$ represents an alkyl group having 1 to 5 carbon atoms, and $R^{24}$ represents an alkyl group having 1 to 5 carbon atoms or an alkoxy group having 1 to 4 carbon atoms.

Such compounds can be used in any combination; in view of the intended properties such as solubility at low temperature, transition temperature, electric reliability, and birefringence, it is preferred that one to three of the compounds be used.

The amount of the compound represented by General Formula (II-3) needs to be appropriately adjusted on the basis of predetermined properties such as solubility at low temperature, transition temperature, electric reliability, birefringence, process adaptability, droplet stains, screen burn-in, and dielectric anisotropy.

The preferred amount of the compound represented by General Formula (II-3) is, for instance, in the range of 2 to 45 mass % relative to the total mass of the liquid crystal composition of the present invention. In particular, examples of the preferred amount are as follows: from 5 to 45 mass %, from 8 to 45 mass %, from 11 to 45 mass %, from 14 to 45 mass %, from 17 to 45 mass %, from 20 to 45 mass %, from 23 to 45 mass %, from 26 to 45 mass %, from 29 to 45 mass %, from 2 to 45 mass %, from 2 to 40 mass %, from 2 to 35 mass %, from 2 to 30 mass %, from 2 to 25 mass %, from 2 to 20 mass %, from 2 to 15 mass %, and from 2 to 10 mass %.

The compound represented by General Formula (II-3) is, for example, preferably at least one compound selected from the group consisting of compounds represented by Formulae (12.1) to (12.3).

[Chem. 39]

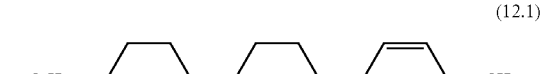

(12.1)

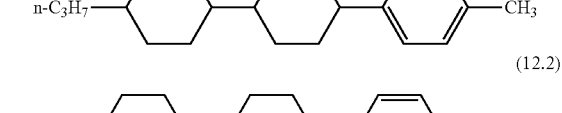

(12.2)

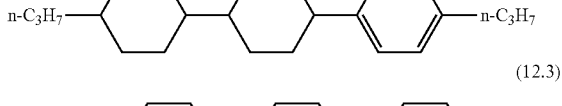

(12.3)

On the basis of the intended properties such as solubility at low temperature, transition temperature, electric reliability, and birefringence, the compound represented by Formula (12.1) may be used, the compound represented by Formula (12.2) may be used, and both of the compound represented by Formula (12.1) and the compound represented by Formula (12.2) may be used.

The amount of the compound represented by Formula (12.1) is preferably in the range of 3 mass % to 40 mass %, also preferably 5 mass % to 40 mass %, also preferably 7 mass % to 40 mass %, also preferably 9 mass % to 40 mass %, also preferably 11 mass % to 40 mass %, also preferably 12 mass % to 40 mass %, also preferably 13 mass % to 40 mass %, also preferably 18 mass % to 30 mass %, and also preferably 21 mass % to 25 mass % relative to the total mass of the liquid crystal composition of the present invention.

The amount of the compound represented by Formula (12.2) is preferably in the range of 3 mass % to 40 mass %, also preferably 5 mass % to 40 mass %, also preferably 8 mass % to 40 mass %, also preferably 10 mass % to 40 mass %, also preferably 12 mass % to 40 mass %, also preferably 15 mass % to 40 mass %, also preferably 17 mass % to 30 mass %, and also preferably 19 mass % to 25 mass % relative to the total mass of the liquid crystal composition of the present invention.

In the case where the compounds represented by Formulae (12.1) and (12.2) are used in combination, the total mass of these compounds is preferably in the range of 15 mass % to 45 mass %, also preferably 19 mass % to 45 mass %, also preferably 24 mass % to 40 mass %, and also preferably 30 mass % to 35 mass % relative to the total mass of the liquid crystal composition of the present invention.

The amount of the compound represented by Formula (12.3) is preferably in the range of 0.05 mass % to 2 mass %, also preferably 0.1 mass % to 1 mass %, and also preferably 0.2 mass % to 0.5 mass % relative to the total mass of the liquid crystal composition of the present invention. The compound represented by Formula (12.3) may be an optically active compound.

The compound represented by General Formula (II-3) is, for example, preferably at least one compound selected from the group consisting of compounds represented by General Formula (II-3-1).

[Chem. 40]

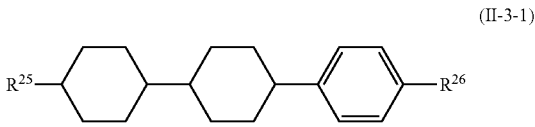

(II-3-1)

In General Formula (II-3-1), $R^{25}$ represents an alkyl group having 1 to 5 carbon atoms, and $R^{26}$ represents an alkoxy group having 1 to 4 carbon atoms.

Such compounds can be used in any combination; in view of the intended properties such as solubility at low temperature, transition temperature, electric reliability, and birefringence, it is preferred that one to three of the compounds be used.

The amount of the compound represented by General Formula (II-3-1) is preferably adjusted on the basis of predetermined properties such as solubility at low temperature, transition temperature, electric reliability, and birefringence; the amount is preferably in the range of 1 mass % to 24 mass %, also preferably 4 mass % to 18 mass %, and also preferably 6 mass % to 14 mass %.

The compound represented by General Formula (II-3-1) is, for instance, preferably at least one compound selected from the group consisting of compounds represented by Formulae (13.1) to (13.4), and especially preferably the compound represented by Formula (13.3).

[Chem. 41]

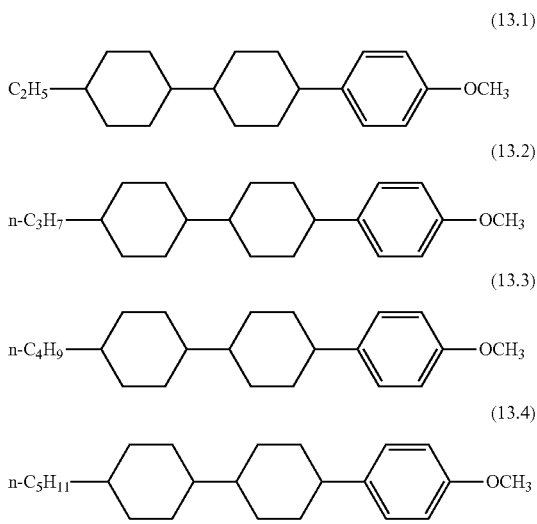

Alternatively or additionally, the compound represented by General Formula (II) is, for example, preferably at least one compound selected from the group consisting of compounds represented by General Formula (II-4).

[Chem. 42]

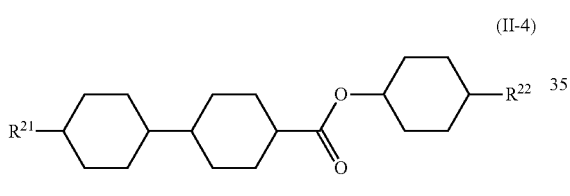

In General Formula (II-4), $R^{21}$ and $R^{22}$ each independently represent an alkenyl group having 2 to 5 carbon atoms, an alkyl group having 1 to 5 carbon atoms, or an alkoxy group having 1 to 4 carbon atoms.

Such compounds may be used alone or in combination, and it is preferred that a proper combination thereof be determined on the basis of the intended properties. The compounds can be used in any combination; in view of the intended properties such as solubility at low temperature, transition temperature, electric reliability, and birefringence, it is preferred that one or two of the compounds be used, and it is more preferred that one to three of the compounds be used.

The amount of the compound represented by General Formula (II-4) is preferably in the range of 1 mass % to 15 mass %, also preferably 2 mass % to 15 mass %, also preferably 3 mass % to 15 mass %, also preferably 4 mass % to 12 mass %, and also preferably 5 mass % to 7 mass % relative to the total mass of the liquid crystal composition of the present invention.

The compound represented by General Formula (II-4) is, for instance, preferably at least one compound selected from the group consisting of compounds represented by Formulae (14.1) to (14.5), and especially preferably the compound represented by Formula (14.2) and/or the compound represented by Formula (14.5).

[Chem. 43]

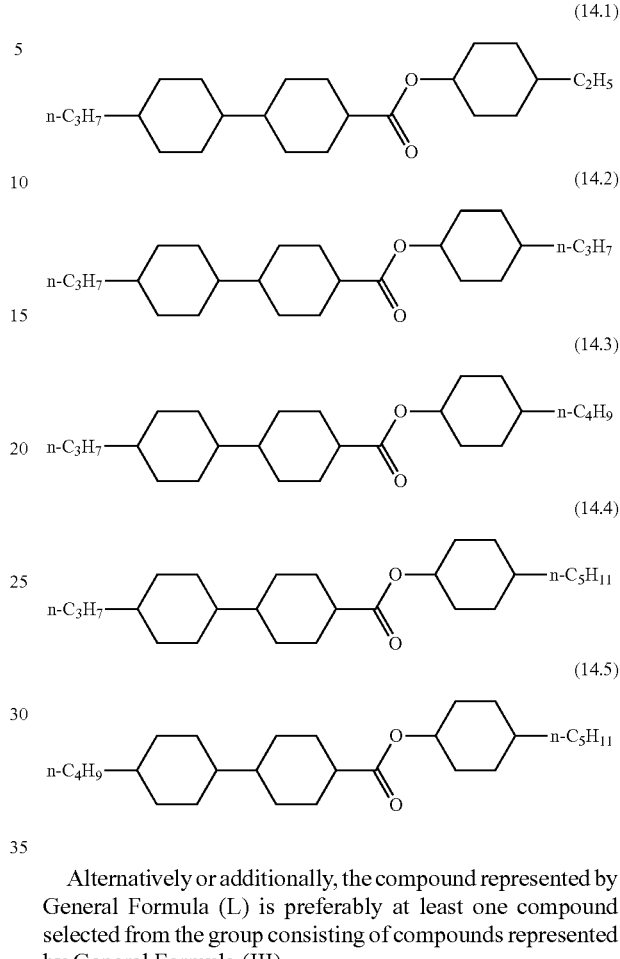

Alternatively or additionally, the compound represented by General Formula (L) is preferably at least one compound selected from the group consisting of compounds represented by General Formula (III).

[Chem. 44]

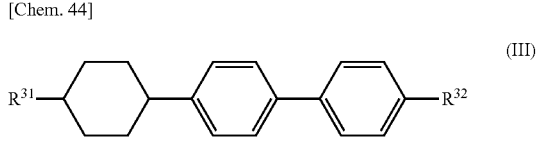

In General Formula (III), $R^{31}$ and $R^{32}$ each independently represent an alkenyl group having 2 to 5 carbon atoms, an alkyl group having 1 to 5 carbon atoms, or an alkoxy group having 1 to 4 carbon atoms.

In view of the intended properties such as solubility and birefringence, the amount of the compound represented by General Formula (III) is preferably in the range of 1 mass % to 25 mass %, also preferably 2 mass % to 20 mass %, also preferably 2 mass % to 15 mass %, also preferably 2 mass % to 10 mass %, and also preferably 2 mass % to 5 mass % relative to the total mass of the liquid crystal composition of the present invention.

The compound represented by General Formula (III) is, for instance, preferably a compound represented by Formula (15.1) and/or a compound represented by Formula (15.2), and especially preferably the compound represented by Formula (15.1).

[Chem. 45]

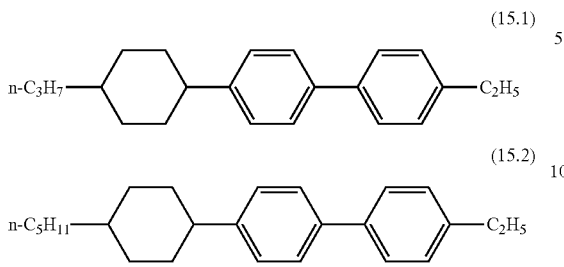

(15.1)

(15.2)

The compound represented by General Formula (III) is preferably at least one compound selected from the group consisting of compounds represented by General Formula (III-1).

[Chem. 46]

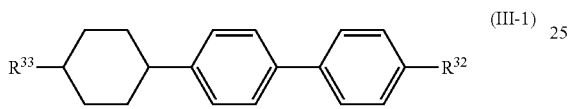

(III-1)

In General Formula (III-1), $R^{33}$ represents an alkenyl group having 2 to 5 carbon atoms, and $R^{32}$ represents an alkyl group having 1 to 5 carbon atoms or an alkoxy group having 1 to 4 carbon atoms.

The amount of the compound represented by General Formula (III-1) is preferably adjusted on the basis of the intended properties such as solubility at low temperature, transition temperature, electric reliability, and birefringence; the amount is preferably in the range of 4 mass % to 23 mass %, also preferably 6 mass % to 18 mass %, and also preferably 10 mass % to 13 mass % relative to the total mass of the liquid crystal composition of the present invention.

The compound represented by General Formula (III-1) is, for example, preferably a compound represented by Formula (16.1) and/or a compound represented by Formula (16.2).

[Chem. 47]

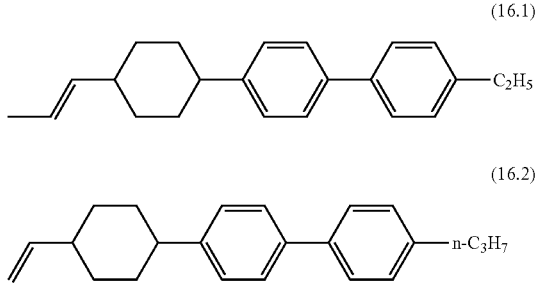

(16.1)

(16.2)

Alternatively or additionally, the compound represented by General Formula (III) is preferably at least one compound selected from the group consisting of compounds represented by General Formula (III-2).

[Chem. 48]

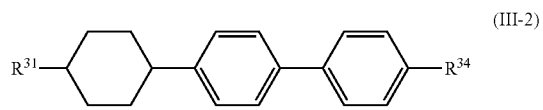

(III-2)

In General Formula (III-2), $R^{31}$ represents an alkyl group having 1 to 5 carbon atoms, and $R^{34}$ represents an alkoxy group having 1 to 4 carbon atoms.

The amount of the compound represented by General Formula (III-2) is preferably adjusted on the basis of the intended properties such as solubility at low temperature, transition temperature, electric reliability, and birefringence; the amount is preferably in the range of 4 mass % to 23 mass %, also preferably 6 mass % to 18 mass %, and also preferably 10 mass % to 13 mass % relative to the total mass of the liquid crystal composition of the present invention.

The compound represented by General Formula (III-2) is, for instance, preferably at least one compound selected from the group consisting of compounds represented by Formulae (17.1) to (17.3), and especially preferably the compound represented by Formula (17.3).

[Chem. 49]

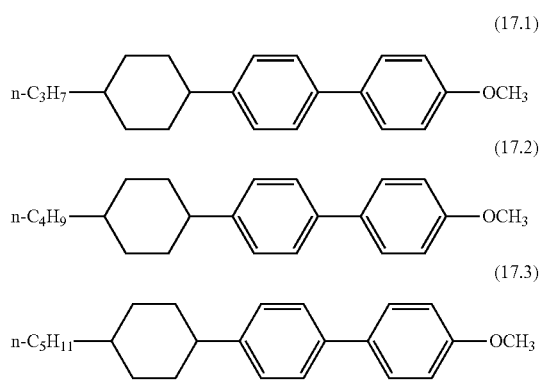

(17.1)

(17.2)

(17.3)

The compound represented by General Formula (L) is preferably at least one compound selected from the group consisting of compounds represented by General Formula (V).

[Chem. 50]

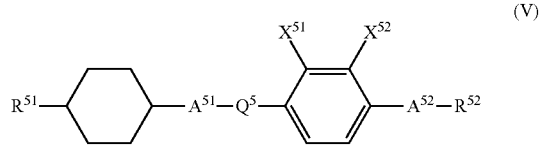

(V)

In General Formula (V), $R^{51}$ and $R^{52}$ each independently represent an alkyl group having 1 to 5 carbon atoms, an alkenyl group having 2 to 5 carbon atoms, or an alkoxy group having 1 to 4 carbon atoms; $A^{51}$ and $A^{52}$ each independently represent a 1,4-cyclohexylene group or a 1,4-phenylene group; $Q^5$ represents a single bond or —COO—; and $X^{51}$ and $X^{52}$ each independently represent a fluorine atom or a hydrogen atom.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used.

The amount of the compound represented by General Formula (V) is, for example, 1 to 25 mass % in an embodiment, 1 to 20 mass % in another embodiment of the present invention, 1 to 15 mass % in another embodiment of the present invention, 1 to 10 mass % in another embodiment of the present invention, 1 to 8 mass % in another embodiment of the present invention, 1 to 7 mass % in another embodiment of the present invention, 1 to 4 mass % in another embodiment of the present invention, 1 to 2 mass % in another embodiment of the present invention, 2 to 8 mass % in another embodiment of the present invention, 4 to 8 mass % in another embodiment of the present invention, and 7 to 8 mass % in another embodiment of the present invention relative to the total mass of the liquid crystal composition of the present invention.

The compound represented by General Formula (V) is preferably any of compounds represented by General Formula (V-1).

[Chem. 51]

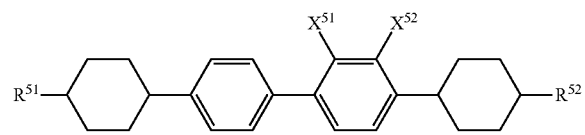

(V-1)

In General Formula (V-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.

The compound represented by General Formula (V-1) is preferably any of compounds represented by General Formula (V-1-1).

[Chem. 52]

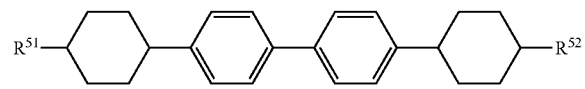

(V-1-1)

In General Formula (V-1-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-1) is preferably in the range of 1 mass % to 15 mass %, more preferably 2 mass % to 10 mass %, further preferably 3 mass % to 10 mass %, further preferably 3 mass % to 7 mass %, and further preferably 3 mass % to 5 mass % relative to the total mass of the liquid crystal composition of the present invention.

The compound represented by General Formula (V-1-1) is preferably at least one compound selected from the group consisting of compounds represented by Formulae (20.1) to (20.4); among these, the compound represented by Formula (20.2) is preferred.

[Chem. 53]

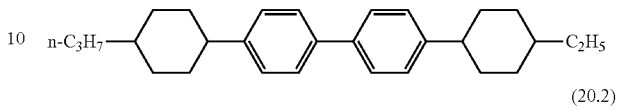

(20.1)

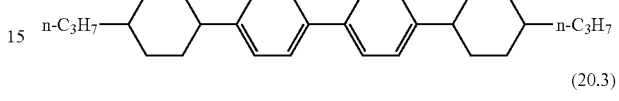

(20.2)

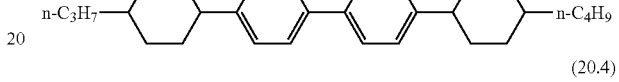

(20.3)

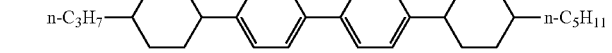

(20.4)

Alternatively or additionally, the compound represented by General Formula (V-1) is preferably any of compounds represented by General Formula (V-1-2).

[Chem. 54]

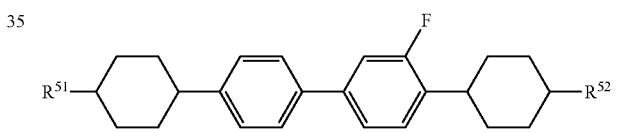

(V-1-2)

In General Formula (V-1-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-2) is preferably in the range of 1 mass % to 15 mass %, also preferably 1 mass % to 10 mass %, also preferably 1 mass % to 7 mass %, and also preferably 1 mass % to 5 mass % relative to the total mass of the liquid crystal composition of the present invention.

The compound represented by General Formula (V-1-2) is preferably at least one compound selected from the group consisting of compounds represented by Formulae (21.1) to (21.3); among these, the compound represented by Formula (21.1) is preferred.

[Chem. 55]

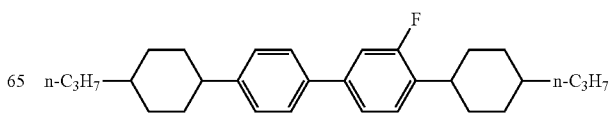

(21.1)

-continued (21.2)

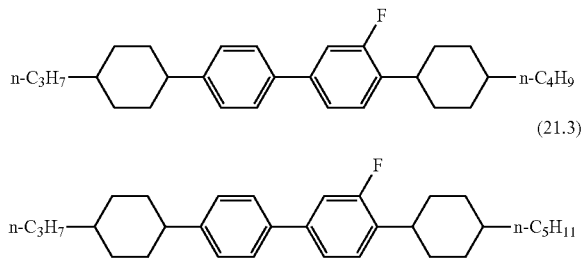

(21.3)

Alternatively or additionally, the compound represented by General Formula (V-1) is preferably any of compounds represented by General Formula (V-1-3).

[Chem. 56]

(V-1-3)

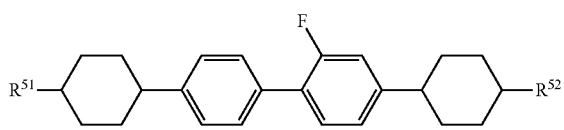

In General Formula (V-1-3), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-1-3) is preferably in the range of 1 mass % to 15 mass %, also preferably 2 mass % to 15 mass %, also preferably 3 mass % to 10 mass %, and also preferably 4 mass % to 8 mass % relative to the total mass of the liquid crystal composition of the present invention.

The compound represented by General Formula (V-1-3) is preferably at least one compound selected from the group consisting of compounds represented by Formulae (22.1) to (22.3), and more preferably the compound represented by Formula (22.1).

[Chem. 57]

(22.1)

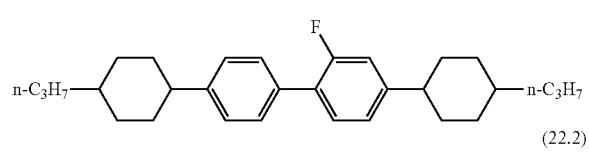

(22.2)

(22.3)

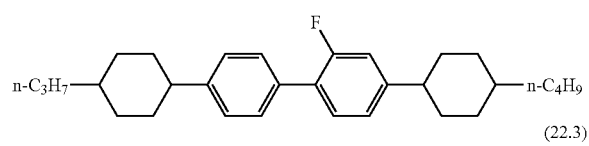

Alternatively or additionally, the compound represented by General Formula (V) is preferably any of compounds represented by General Formula (V-2).

[Chem. 58]

(V-2)

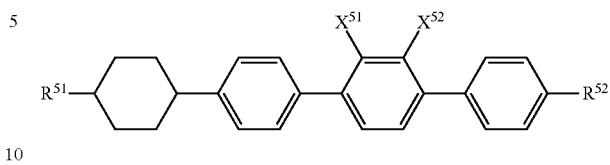

In General Formula (V-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms; and $X^{51}$ and $X^{52}$ each independently represent a fluorine atom or a hydrogen atom.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two or more of the compounds are used.

The amount of the compound represented by General Formula (V-2) is, for instance, in the range of 1 to 30 mass % in an embodiment, 1 to 25 mass % in another embodiment of the present invention, 1 to 20 mass % in another embodiment of the present invention, 1 to 15 mass % in another embodiment of the present invention, 1 to 10 mass % in another embodiment of the present invention, 1 to 5 mass % in another embodiment of the present invention, and 2 to 4 mass % in another embodiment of the present invention relative to the total mass of the liquid crystal composition of the present invention.

In an embodiment in which the liquid crystal composition of the present invention needs to have a high Tni, the amount of the compound represented by Formula (V-2) is preferably adjusted to be larger; in an embodiment in which the liquid crystal composition needs to have a low viscosity, the amount thereof is preferably adjusted to be smaller.

The compound represented by General Formula (V-2) is preferably any of compounds represented by General Formula (V-2-1).

[Chem. 59]

(V-2-1)

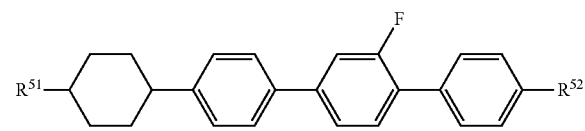

In General Formula (V-2-1), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-2-1) is preferably in the range of 1 mass % to 15 mass %, also preferably 1 mass % to 10 mass %, also preferably 2 mass % to 10 mass %, and also preferably 2 mass % to 5 mass % relative to the total mass of the liquid crystal composition of the present invention.

The compound represented by General Formula (V-2-1) is preferably at least one compound selected from the group consisting of compounds represented by Formulae (23.1) to (23.4); among these, the compound represented by Formula (23.1) and/or the compound represented by Formula (23.2) are preferred.

[Chem. 60]

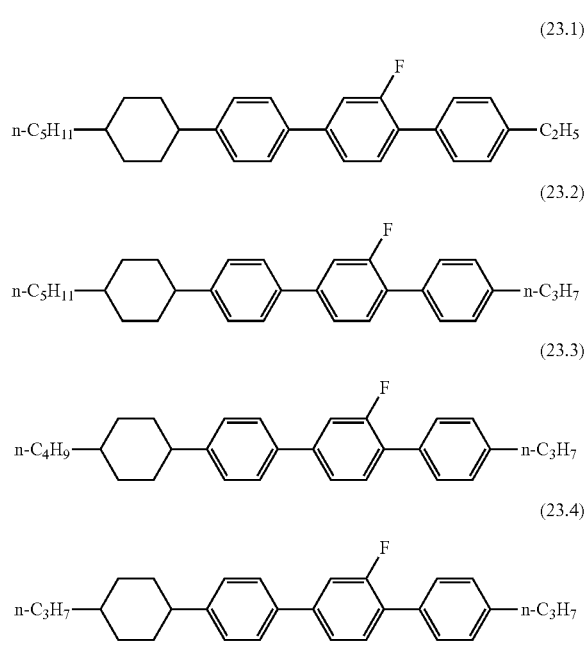

Alternatively or additionally, the compound represented by General Formula (V-2) is preferably any of compounds represented by General Formula (V-2-2).

[Chem. 61]

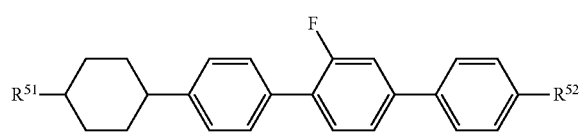

In General Formula (V-2-2), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-2-2) is preferably in the range of 2 mass % to 16 mass %, also preferably 3 mass % to 13 mass %, and also preferably 4 mass % to 10 mass % relative to the total mass of the liquid crystal composition of the present invention.

The compound represented by General Formula (V-2-2) is preferably at least one compound selected from the group consisting of compounds represented by Formulae (24.1) to (24.4); among these, the compound represented by Formula (24.1) and/or the compound represented by Formula (24.2) are preferred.

[Chem. 62]

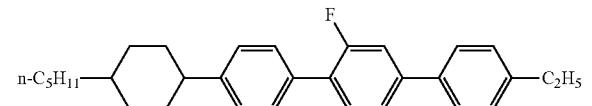

Alternatively or additionally, the compound represented by General Formula (V) is preferably any of compounds represented by General Formula (V-3).

[Chem. 63]

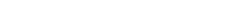
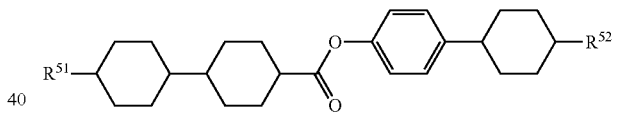

In General Formula (V-3), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (V-3) is preferably in the range of 2 mass % to 16 mass %, also preferably 4 mass % to 16 mass %, also preferably 7 mass % to 13 mass %, and also preferably 8 mass % to 11 mass % relative to the total mass of the liquid crystal composition of the present invention.

The compound represented by General Formula (V-3) is preferably at least one compound selected from the group consisting of compounds represented by Formulae (25.1) to (25.3).

[Chem. 64]

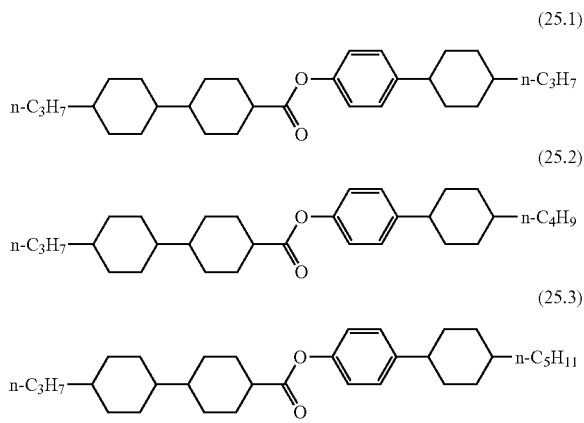

(25.1)
(25.2)
(25.3)

Alternatively or additionally, the compound represented by General Formula (V), which is used in the liquid crystal composition of the present invention, is preferably any of compounds represented by General Formula (V-4).

[Chem. 65]

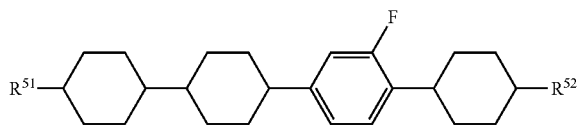

(V-4)

In General Formula (V-4), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V-4) is preferably in the range of 1 mass % to 15 mass %, also preferably 2 mass % to 15 mass %, also preferably 3 mass % to 10 mass %, and also preferably 4 mass % to 8 mass % relative to the total mass of the liquid crystal composition of the present invention.

The compound represented by General Formula (V-4) is preferably at least one compound selected from the group consisting of compounds represented by Formulae (25.11) to (25.13), and more preferably the compound represented by Formula (25.13).

[Chem. 66]

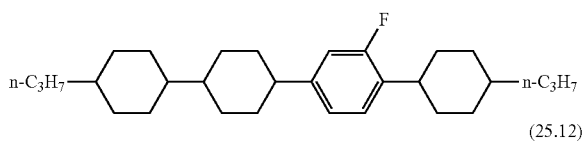

(25.11)
(25.12)

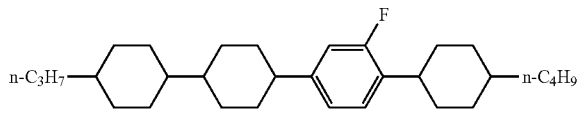

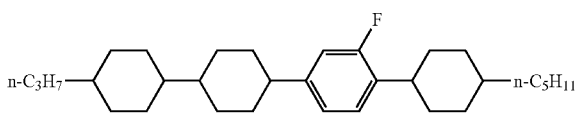

(25.13)

Alternatively or additionally, the compound represented by General Formula (L), which is used in the liquid crystal composition of the present invention, is preferably any of compounds represented by General Formula (V'-5).

[Chem. 67]

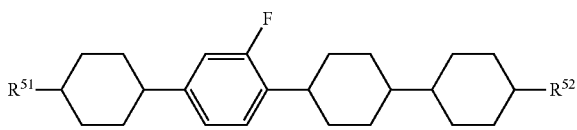

(V'-5)

In General Formula (V'-5), $R^{51}$ and $R^{52}$ each independently represent an alkyl group having 1 to 5 carbon atoms, an alkenyl group having 2 to 5 carbon atoms, or an alkoxy group having 1 to 4 carbon atoms.

The amount of the compound represented by General Formula (V'-5) is preferably in the range of 1 mass % to 15 mass %, also preferably 2 mass % to 15 mass %, also preferably 2 mass % to 10 mass %, and also preferably 5 mass % to 10 mass % relative to the total mass of the liquid crystal composition of the present invention.

The compound represented by General Formula (V'-5) is preferably at least one compound selected from the group consisting of compounds represented by Formulae (25.21) to (25.24); among these, the compound represented by Formula (25.21) and/or the compound represented by Formula (25.23) are preferred.

[Chem. 68]

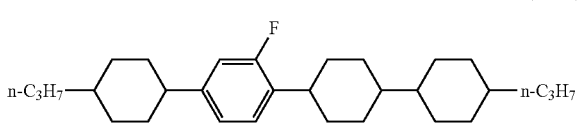

(25.21)

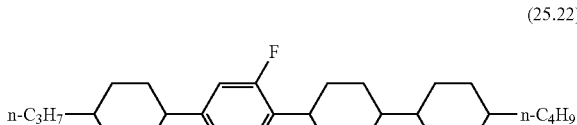

(25.22)

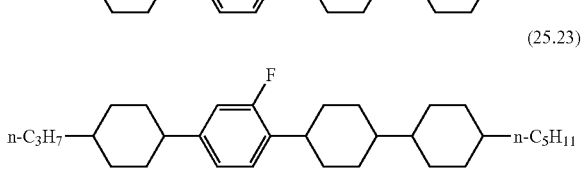

(25.23)

(25.24)

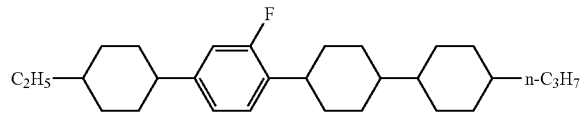

The liquid crystal composition of the present invention can further contain at least one of compounds represented by General Formula (VI).

[Chem. 69]

(VI)

In General Formula (VI), $R^{61}$ and $R^{62}$ each independently represent a linear alkyl group having 1 to 10 carbon atoms, a linear alkoxy group having 1 to 10 carbon atoms, or a linear alkenyl group having 2 to 10 carbon atoms.

Such compounds can be used in any combination; on the basis of the intended properties such as solubility at low temperature, transition temperature, electric reliability, and birefringence, it is preferred that one to three of such compounds be used, it is more preferred that one to four of the compounds be used, and it is especially preferred that one to five or more of the compounds be used.

The amount of the compound represented by General Formula (VI) is preferably in the range of 0 to 35 mass %, also preferably 0 to 25 mass %, and also preferably 0 to 15 mass % relative to the total mass of the liquid crystal composition of the present invention.

In particular, preferred examples of usable compounds represented by General Formula (VI) include the following compounds.

[Chem. 70]

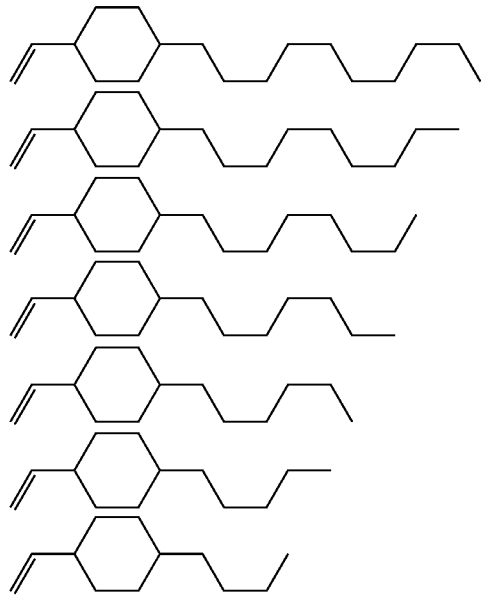

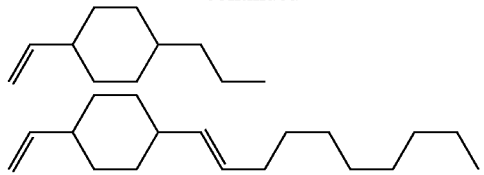
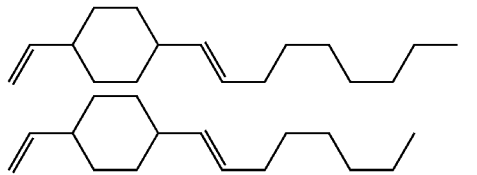
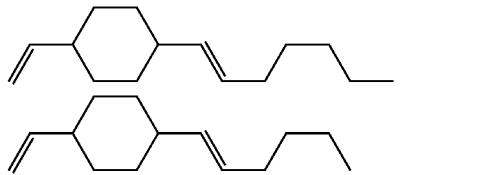
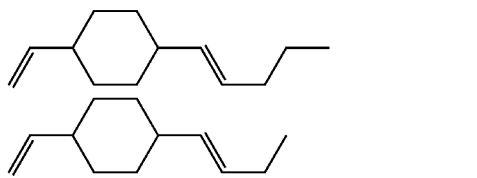
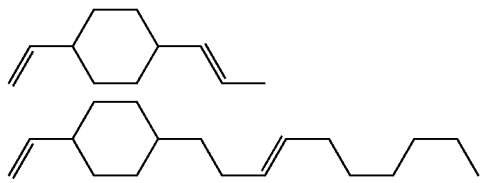
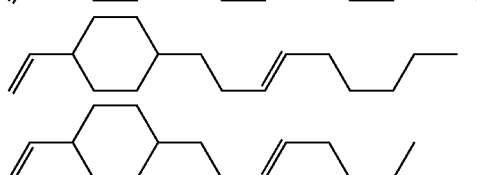
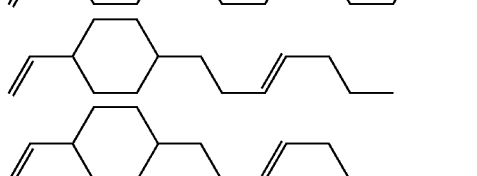
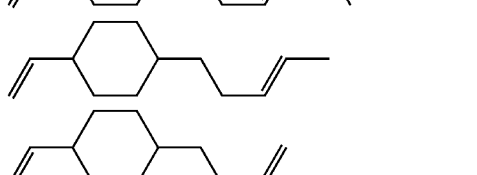
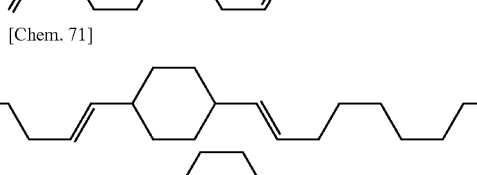

[Chem. 71]

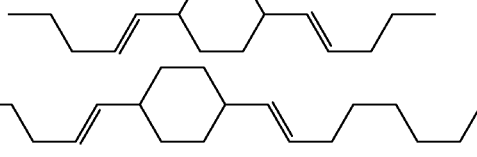

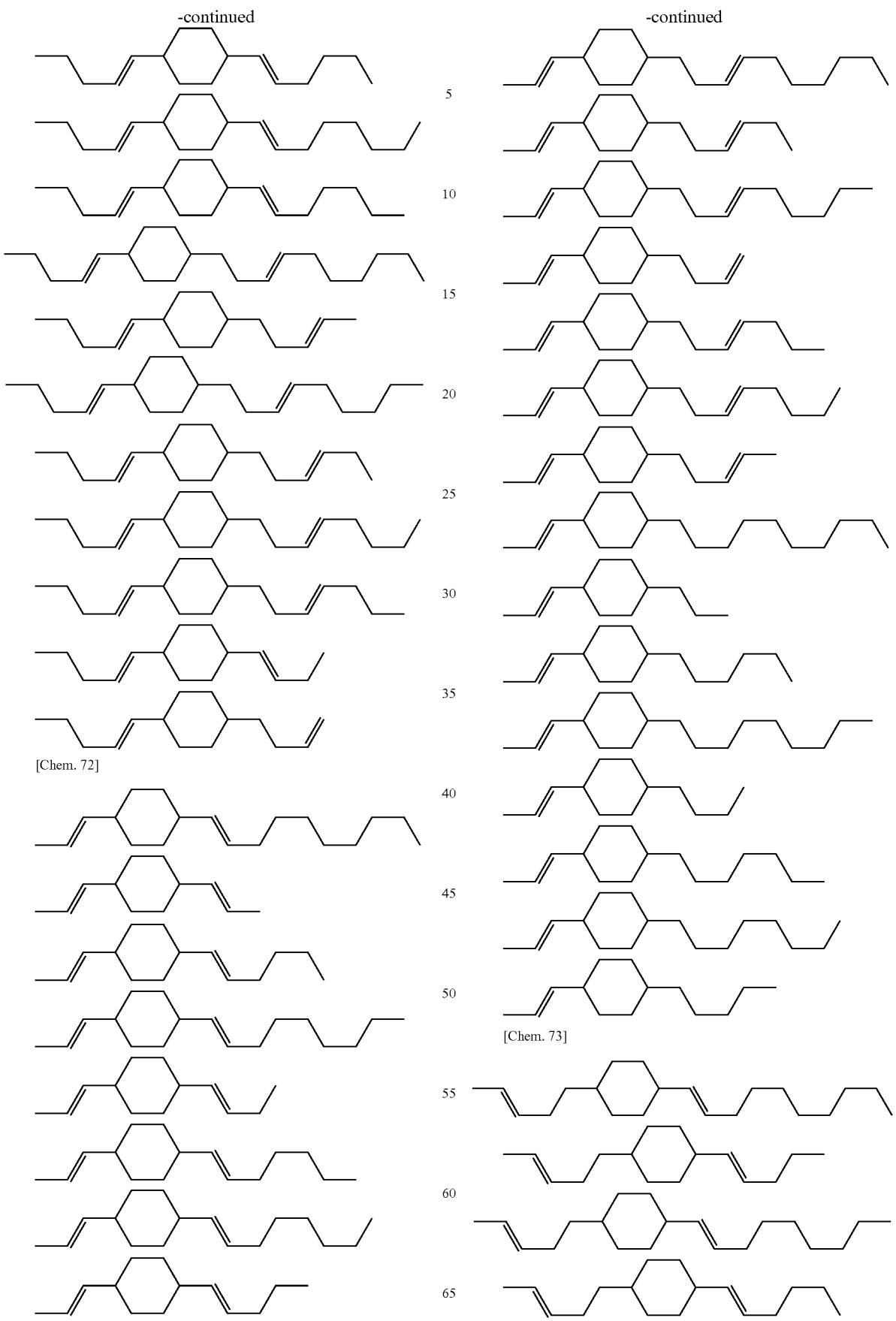
[Chem. 72]
[Chem. 73]

-continued

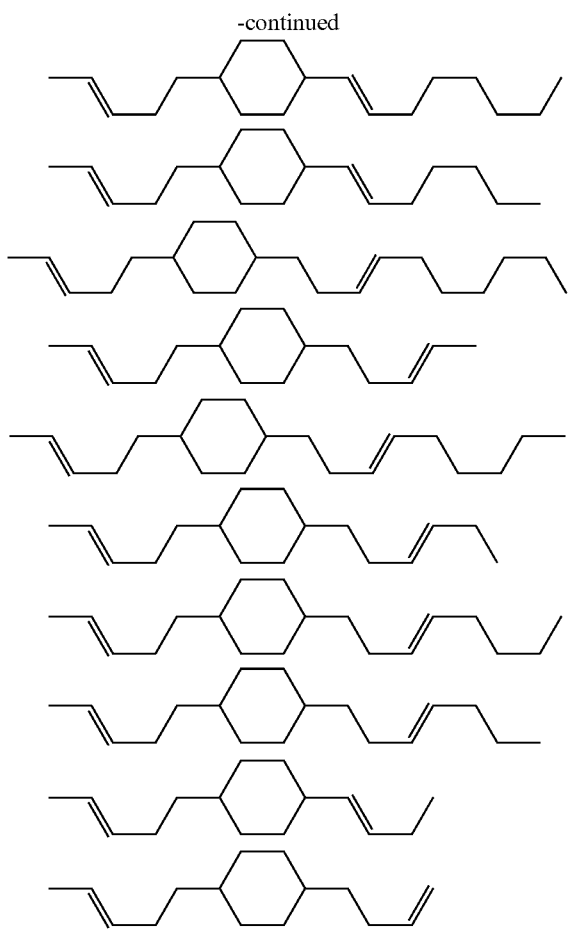

The liquid crystal composition of the present invention can further contain at least one of compounds represented by General Formula (VII).

[Chem. 74]

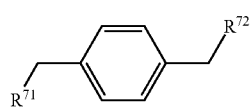

(VII)

In General Formula (VII), $R^{71}$ and $R^{72}$ each independently represent a linear alkyl group having 1 to 10 carbon atoms, a linear alkoxy group having 1 to 10 carbon atoms, or a linear alkenyl group having 4 to 10 carbon atoms.

Such compounds can be used in any combination; on the basis of the intended properties such as solubility at low temperature, transition temperature, electric reliability, and birefringence, it is preferred that one to three of such compounds be properly selected and used, it is more preferred that one to four of the compounds be used, and it is especially preferred that one to five or more of the compounds be used.

The amount of the compound represented by General Formula (VII) is preferably in the range of 0 to 35 mass %, more preferably 0 to 25 mass %, and further preferably 0 to 15 mass % relative to the total mass of the liquid crystal composition of the present invention.

In particular, preferred examples of usable compounds represented by General Formula (VII) include the following compounds.

[Chem. 75]

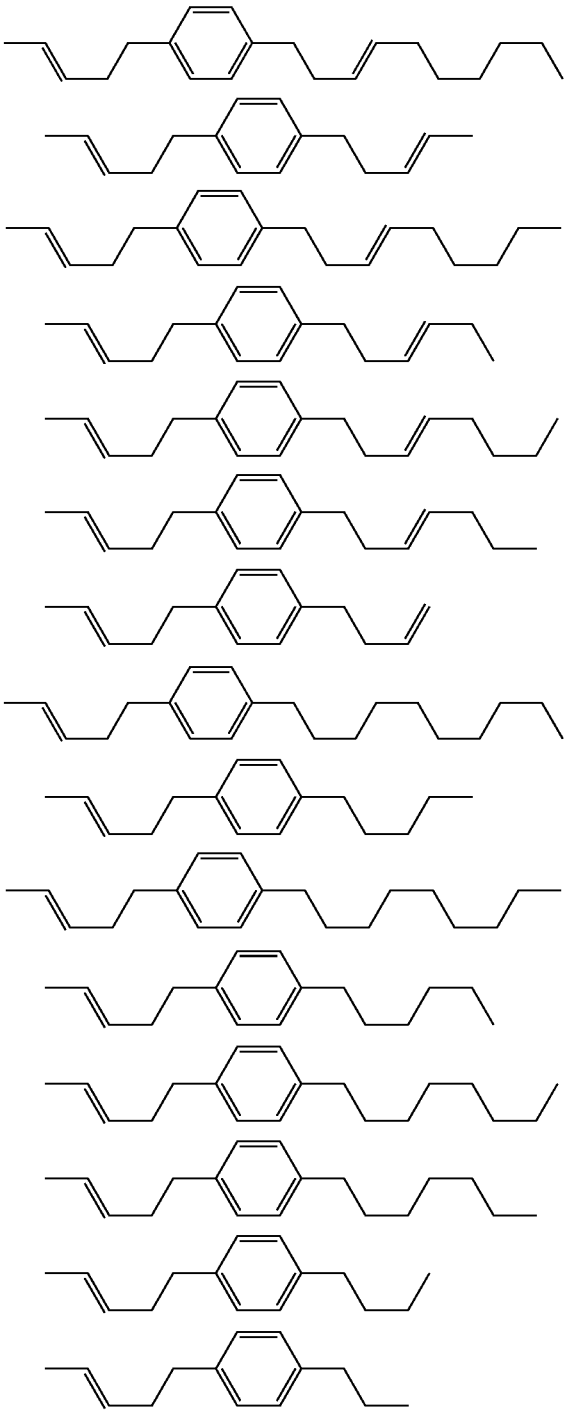

Moreover, the liquid crystal composition of the present invention also preferably further contains at least one of compounds represented by General Formula (M).

[Chem. 76]

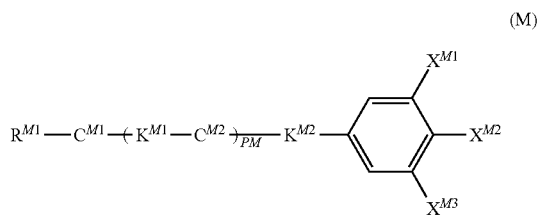

(M)

In General Formula (M), $R^{M1}$ represents an alkyl group having 1 to 8 carbon atoms, and one —$CH_2$— group or two or more —$CH_2$— groups not adjoining each other in the alkyl group are each independently optionally substituted with —CH=CH—, —C≡C—, —O—, —CO—, —COO—, or —OCO—;

PM represents 0, 1, 2, 3, or 4;

$C^{M1}$ and $C^{M2}$ each independently represent a group selected from the group consisting of (d) a 1,4-cyclohexylene group (of which one —$CH_2$— group or two or more —$CH_2$— groups not adjoining each other are optionally substituted with —O— or —S—) and (e) a 1,4-phenylene group (of which one —CH= group or two or more —CH= groups not adjoining each other are optionally substituted with —N=), and the groups (d) and (e) are each independently optionally substituted with a cyano group, a fluorine atom, or a chlorine atom;

$K^{M1}$ and $K^{M2}$ each independently represent a single bond, —$CH_2CH_2$—, $(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the multiple $K^{M1}$'s are the same as or different from each other; in the case where PM is 2, 3, or 4 and where $C^{M2}$ is multiple, the multiple $C^{M2}$'s are the same as or different from each other;

$X^{M1}$ and $X^{M3}$ each independently represent a hydrogen atom, a chlorine atom, or a fluorine atom; and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; where the compound represented by General Formula (M) excludes the compound represented by General Formula (i).

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six of the compounds are used. In another embodiment of the present invention, seven or more of the compounds are used.

In the liquid crystal composition of the present invention, the amount of the compound represented by General Formula (M) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (M) is, for example, in the range of 1 to 70 mass % in an embodiment of the present invention, 1 to 65 mass % in another embodiment of the present invention, 1 to 55 mass % in another embodiment of the present invention, 1 to 53 mass % in another embodiment of the present invention, 1 to 31 mass % in another embodiment of the present invention, 1 to 23 mass % in another embodiment of the present invention, 1 to 12 mass % in another embodiment of the present invention, 1 to 10 mass % in another embodiment of the present invention, 5 to 55 mass % in another embodiment of the present invention, 8 to 55 mass % in another embodiment of the present invention, 20 to 55 mass % in another embodiment of the present invention, 31 to 55 mass % in another embodiment of the present invention, 44 to 55 mass % in another embodiment of the present invention, 51 to 55 mass % in another embodiment of the present invention, 5 to 10 mass % in another embodiment of the present invention, 8 to 12 mass % in another embodiment of the present invention, 20 to 23 mass % in another embodiment of the present invention, and 44 to 53 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

In the case where the ring structure bonded to $R^{M1}$ is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms; in the case where the ring structure bonded to $R^{M1}$ is a saturated ring such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

In the case where the liquid crystal composition needs to be chemically stable, it is preferred that the molecules of the compound represented by General Formula (M) be free from a chlorine atom. The amount of a chlorine-atom-containing compound in the liquid crystal composition is preferably in the range of 0 to 5 mass %, also preferably 0 to 3 mass %, also preferably 0 to 1 mass %, and also preferably 0 to 0.5 mass % relative to the total mass of the liquid crystal composition of the present invention; and it is also preferred that the liquid crystal composition be substantially free from a chlorine-atom-containing compound. The term "substantially free from a chlorine-atom-containing compound" refers to that only a compound unavoidably containing a chlorine atom, such as a compound generated as an impurity in production of another compound, is contained in the liquid crystal composition.

The compound represented by General Formula (M) is, for instance, preferably at least one compound selected from the group consisting of compounds represented by General Formula (VIII).

[Chem. 77]

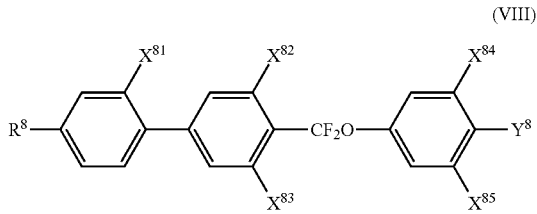

(VIII)

[Chem. 78]

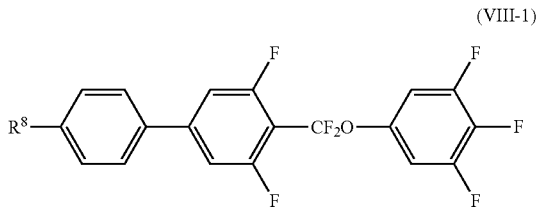

(VIII-1)

In General Formula (VIII), $R^8$ represents an alkyl group having 1 to 5 carbon atoms, an alkenyl group having 2 to 5 carbon atoms, or an alkoxy group having 1 to 4 carbon atoms; $X^{81}$ to $X^{85}$ each independently represent a hydrogen atom or a fluorine atom; and $Y^8$ represents a fluorine atom or —$OCF_3$.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

In the liquid crystal composition of the present invention, the amount of the compound represented by General Formula (VIII) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (VIII) is, for example, in the range of 2 to 30 mass % in an embodiment of the present invention, 2 to 25 mass % in another embodiment of the present invention, 2 to 20 mass % in another embodiment of the present invention, 2 to 16 mass % in another embodiment of the present invention, 2 to 12 mass % in another embodiment of the present invention, 2 to 11 mass % in another embodiment of the present invention, 2 to 10 mass % in another embodiment of the present invention, 5 to 30 mass % in another embodiment of the present invention, 8 to 30 mass % in another embodiment of the present invention, 11 to 30 mass % in another embodiment of the present invention, 5 to 16 mass % in another embodiment of the present invention, 5 to 10 mass % in another embodiment of the present invention, and 8 to 12 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to have a high temperature stability, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (VIII) is preferably any of compounds represented by General Formula (VIII-1).

In General Formula (VIII-1), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two or more of the compounds are used.

In particular, the compound represented by General Formula (VIII-1) is preferably at least one compound selected from the group consisting of compounds represented by Formulae (26.1) to (26.4), more preferably the compound represented by Formula (26.1) and/or the compound represented by Formula (26.2), and further preferably the compound represented by Formula (26.2).

[Chem. 79]

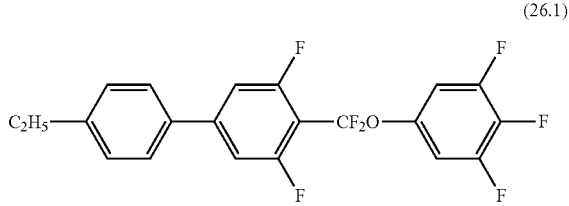

(26.1)

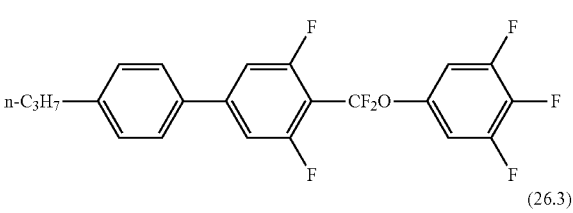

(26.2)

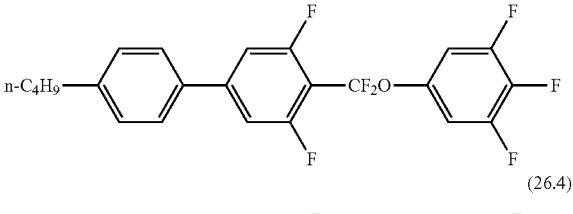

(26.3)

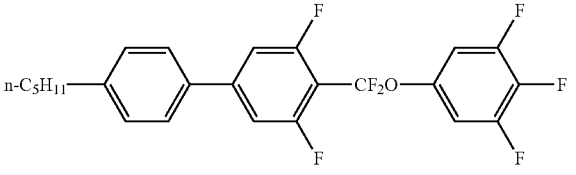

(26.4)

The amount of the compound represented by Formula (26.1) is preferably in the range of 1 mass % to 20 mass %, more preferably 1 mass % to 15 mass %, further preferably 1 mass % to 10 mass %, and especially preferably 1 mass % to 7 mass % relative to the total mass of the liquid crystal composition of the present invention in view of solubility at low temperature, transition temperature, electric reliability, birefringence, and another property. Examples of the especially preferred range are as follows: from 1 mass % to 6 mass %, from 1 mass % to 5 mass %, from 1 mass % to 3 mass %, and from 3 mass % to 6 mass %.

The amount of the compound represented by Formula (26.2) is preferably in the range of 1 mass % to 30 mass %, also preferably 1 mass % to 25 mass %, also preferably 1 mass % to 20 mass %, and also preferably 1 mass % to 18 mass % relative to the total mass of the liquid crystal composition of the present invention in view of solubility at low temperature, transition temperature, electric reliability, birefringence, and another property. In particular, for example, a preferred amount is as follows: from 5 mass % to 16 mass %, from 5 mass % to 12 mass %, from 5 mass % to 11 mass %, from 5 mass % to 10 mass %, from 6 mass % to 12 mass %, or from 8 mass % to 11 mass %.

The total amount of the compounds represented by Formulae (26.1) and (26.2) is preferably in the range of 1 to 30 mass %, more preferably 1 to 25 mass %, and further preferably 1 to 20 mass % relative to the total mass of the liquid crystal composition of the present invention. In particular, for example, a preferred amount is as follows: from 1 mass % to 16 mass %, from 1 mass % to 12 mass %, from 1 mass % to 11 mass %, from 1 mass % to 10 mass %, from 5 mass % to 16 mass %, from 5 mass % to 12 mass %, from 5 mass % to 11 mass %, from 5 mass % to 10 mass %, or from 8 mass % to 12 mass %.

Alternatively or additionally, the compound represented by General Formula (VIII) is preferably any of compounds represented by General Formula (VIII-2).

[Chem. 80]

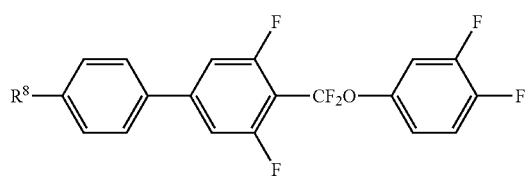

(VIII-2)

In General Formula (VIII-2), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (VIII-2) is preferably in the range of 2.5 mass % to 25 mass %, also preferably 8 mass % to 25 mass %, also preferably 10 mass % to 20 mass %, and also preferably 12 mass % to 15 mass % relative to the total mass of the liquid crystal composition of the present invention in view of solubility at low temperature, transition temperature, electric reliability, birefringence, and another property.

The compound represented by General Formula (VIII-2) is preferably at least one compound selected from the group consisting of compounds represented by Formulae (27.1) to (27.4); among these, the compound represented by Formula (27.2) is preferred.

[Chem. 81]

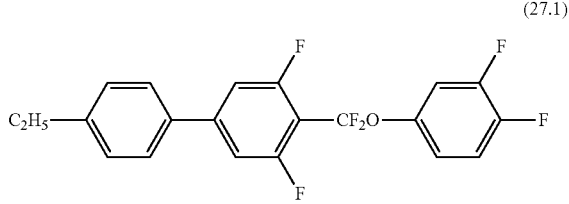

(27.1)

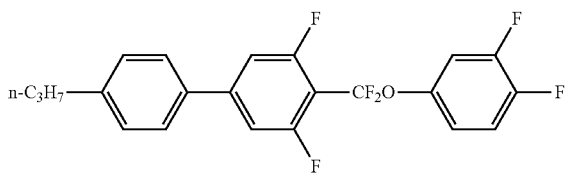

(27.2)

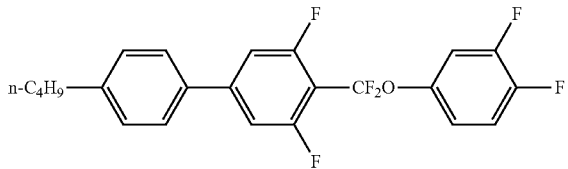

(27.3)

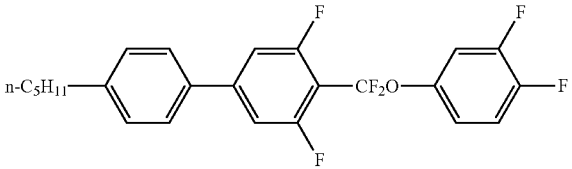

(27.4)

Alternatively or additionally, the compound represented by General Formula (VIII) is preferably any of compounds represented by General Formula (VIII-3).

[Chem. 82]

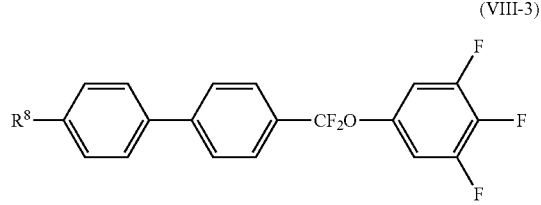

(VIII-3)

In General Formula (VIII-3), $R^8$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined on the basis of the intended properties such as solubility at low temperature, transition temperature, electric reliability, and birefringence.

In an embodiment of the present invention, for example, one of such compounds is used. In another embodiment of the present invention, two or more of the compounds are used.

In particular, the compound represented by General Formula (VIII-3) is preferably at least one compound selected from the group consisting of compounds represented by Formulae (26.11) to (26.14), more preferably the compound represented by Formula (26.11) and/or the compound represented by Formula (26.12), and further preferably the compound represented by Formula (26.12).

[Chem. 83]

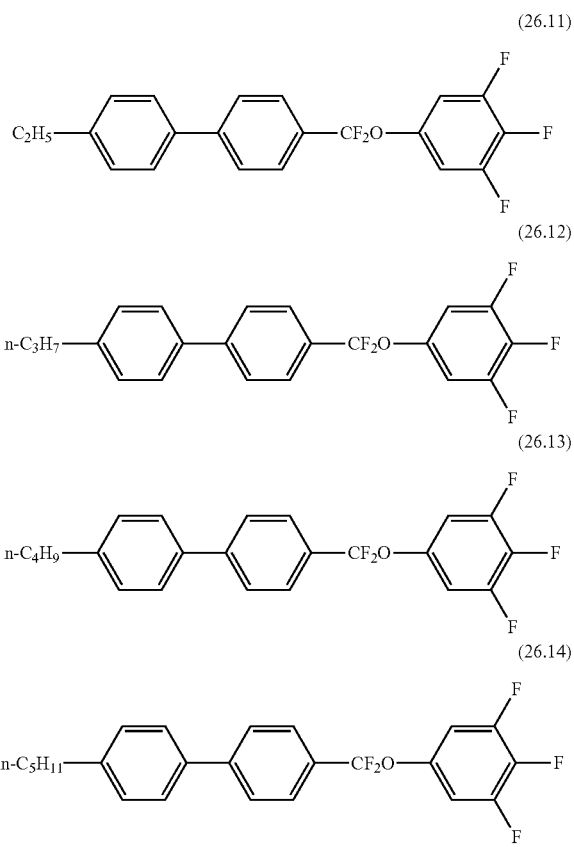

Alternatively or additionally, the compound represented by General Formula (VIII) is preferably any of compounds represented by General Formula (VIII-4).

[Chem. 84]

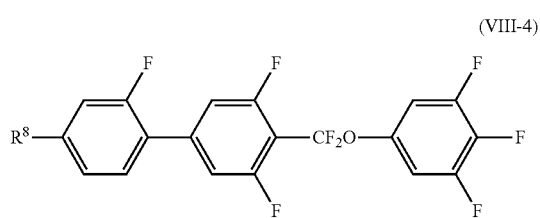

In General Formula (VIII-4), $R^8$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (VIII-4) is appropriately adjusted on the basis of properties such as solubility at low temperature, transition temperature, electric reliability, and birefringence.

The amount of the compound represented by General Formula (VIII-4) is, for example, in the range of 1 to 25 mass % in an embodiment of the present invention, 2 to 25 mass % in another embodiment, 3 to 20 mass % in another embodiment, 3 to 13 mass % in another embodiment, 3 to 10 mass % in another embodiment, and 1 to 5 mass % in another embodiment relative to the total mass of the liquid crystal composition of the present invention.

In particular, the compound represented by General Formula (VIII-4), which is used in the liquid crystal composition of the present invention, is preferably at least one compound selected from the group consisting of compounds represented by Formulae (26.21) to (26.24), and more preferably the compound represented by Formula (26.24).

[Chem. 85]

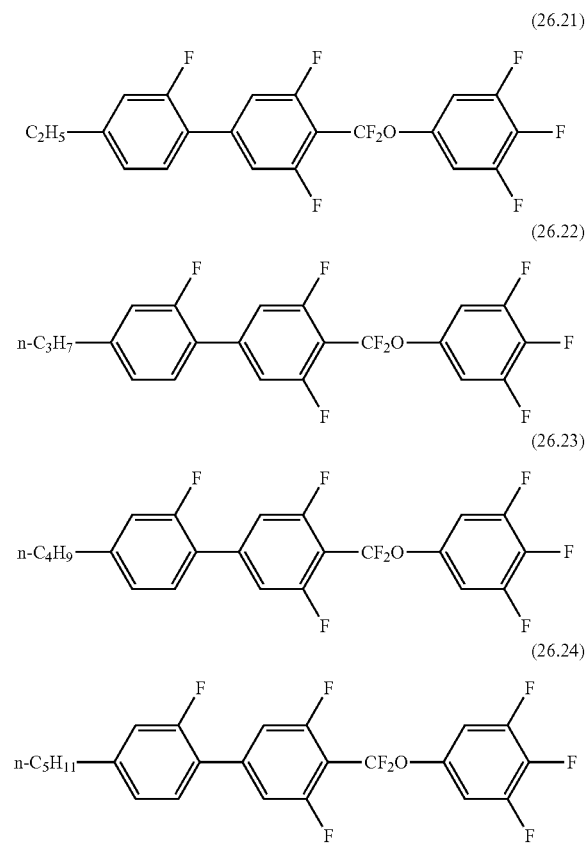

The compound represented by General Formula (M) is, for instance, preferably at least one compound selected from the group consisting of compounds represented by General Formula (IX), where the compound represented by General Formula (i) is excluded.

[Chem. 86]

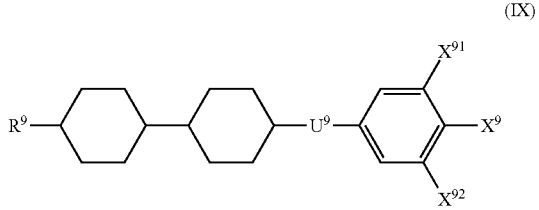

(IX)

In General Formula (IX), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; $Y^9$ represents a fluorine atom, a chlorine atom, or —$OCF_3$; and $U^9$ represents a single bond, —COO—, or —$CF_2O$—.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four of the compounds are used. In another embodiment of the present invention, five of the compounds are used. In another embodiment of the present invention, six or more of the compounds are used.

In the liquid crystal composition of the present invention, the amount of the compound represented by General Formula (Ix) needs to be appropriately adjusted on the basis of predetermined properties such as solubility at low temperature, transition temperature, electric reliability, birefringence, process adaptability, droplet stains, screen burn-in, and dielectric anisotropy.

The amount of the compound represented by General Formula (IX) is, for example, in the range of 1 to 45 mass % in an embodiment of the present invention, 1 to 40 mass % in another embodiment of the present invention, 1 to 35 mass % in another embodiment of the present invention, 1 to 34 mass % in another embodiment of the present invention, 1 to 30 mass % in another embodiment of the present invention, 1 to 10 mass % in another embodiment of the present invention, 1 to 2 mass % in another embodiment of the present invention, 2 to 34 mass % in another embodiment of the present invention, 7 to 34 mass % in another embodiment of the present invention, 24 to 34 mass % in another embodiment of the present invention, 30 to 34 mass % in another embodiment of the present invention, 2 to 30 mass % in another embodiment of the present invention, 7 to 30 mass % in another embodiment of the present invention, 24 to 30 mass % in another embodiment of the present invention, 2 to 10 mass % in another embodiment of the present invention, 2 to 7 mass % in another embodiment of the present invention, and 7 to 10 mass % in another embodiment of the present invention relative to the total mass of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to serve for a reduction in screen burn-in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (IX) is preferably any of compounds represented by General Formula (IX-1), where the compound represented by General Formula (i) is excluded.

[Chem. 87]

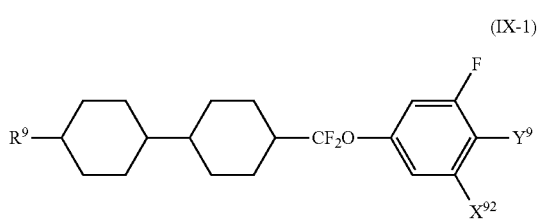

(IX-1)

In General Formula (IX-1), $R^9$ represents an alkyl group having 1 to 5 carbon atoms, an alkenyl group having 2 to 5 carbon atoms, or an alkoxy group having 1 to 4 carbon atoms; $X^{92}$ represents a hydrogen atom or a fluorine atom; and $Y^9$ represents a fluorine atom or —$OCF_3$.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three of the compounds are used. In another embodiment of the present invention, four or more of the compounds are used.

The compound represented by General Formula (IX-1) is preferably any of compounds represented by General Formula (IX-1-1).

[Chem. 88]

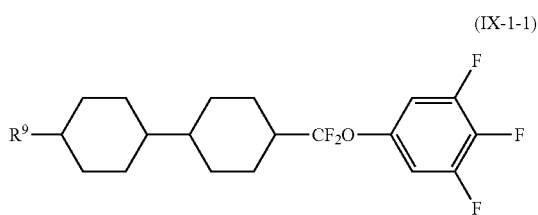

(IX-1-1)

In General Formula (IX-1-1), $R^9$ represents an alkyl group having 1 to 5 carbon atoms, an alkenyl group having 2 to 5 carbon atoms, or an alkoxy group having 1 to 4 carbon atoms, where the compound represented by Formula (i) is excluded.

Such compounds can be used in any combination; a proper combination of the compounds is determined on the basis of the intended properties such as solubility at low temperature, transition temperature, electric reliability, and birefringence. In an embodiment of the present invention, for example, one of such compounds is used. In another embodiment of the present invention, two of the compounds are used. In another embodiment of the present invention, three or more of the compounds are used.

The amount of the compound represented by General Formula (IX-1-1) is adjusted to be appropriate for an embodiment in view of solubility at low temperature, transition temperature, electric reliability, birefringence, and another property.

The amount of the compound represented by General Formula (IX-1-1) is, for example, in the range of 1 to 20 mass % in an embodiment of the present invention, 1 to 15 mass % in another embodiment of the present invention, 1 to 10 mass % in another embodiment of the present invention, 1 to 9 mass % in another embodiment of the present invention, 1 to 4 mass % in another embodiment of the present invention, 2 to 9 mass % in another embodiment of the present invention, 2 to 4 mass % in another embodiment of the present invention, and 5 to 9 mass % in another embodiment of the present invention relative to the total mass of the liquid crystal composition of the present invention.

The compound represented by General Formula (IX-1-1) is preferably at least one compound selected from the group consisting of compounds represented by Formulae (28.1), (28.2), (28.4), and (28.5); among these, the compound represented by Formula (28.5) is preferred.

[Chem. 89]

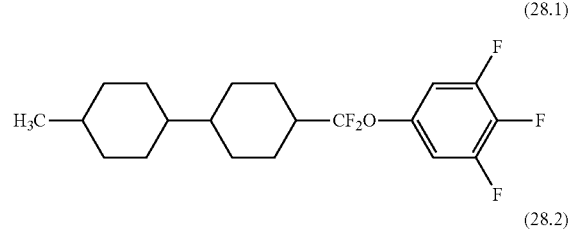

(28.1)

(28.2)

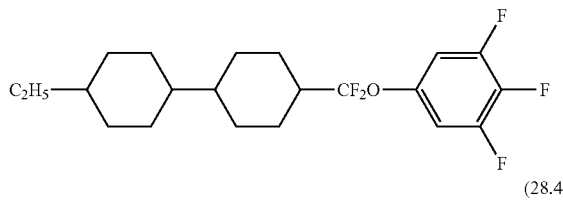

(28.4)

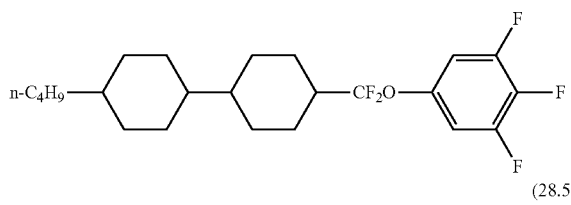

(28.5)

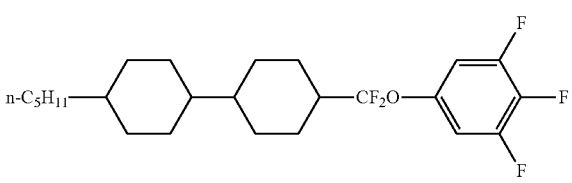

In the liquid crystal composition of the present invention, the amount of the compound represented by Formula (28.5) is preferably in the range of 1 mass % to 20 mass %, also preferably 1 mass % to 15 mass %, and also preferably 1 mass % to 10 mass % relative to the total mass of the liquid crystal composition of the present invention in view of solubility at low temperature, transition temperature, electric reliability, and another property. In particular, a preferred amount is as follows: from 2 mass % to 10 mass %, from 5 mass % to 10 mass %, from 2 mass % to 9 mass %, from 2 mass % to 4 mass %, or from 5 mass % to 9 mass %.

Alternatively or additionally, the compound represented by General Formula (IX-1) is preferably any of compounds represented by General Formula (IX-1-2).

[Chem. 90]

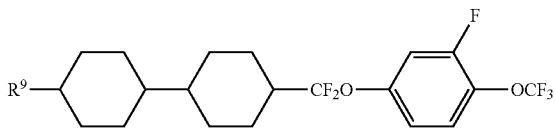

(IX-1-2)

In General Formula (IX-1-2), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one to three of the compounds be used, and it is more preferred that one to four of the compounds be used.

The amount of the compound represented by General Formula (IX-1-2) is preferably in the range of 1 mass % to 30 mass %, also preferably 5 mass % to 30 mass %, also preferably 8 mass % to 30 mass %, also preferably 10 mass % to 25 mass %, also preferably 14 mass % to 22 mass %, and also preferably 16 mass % to 20 mass % relative to the total mass of the liquid crystal composition of the present invention in view of solubility at low temperature, transition temperature, electric reliability, and another property.

The compound represented by General Formula (IX-1-2) is preferably at least one compound selected from the group consisting of compounds represented by Formulae (29.1) to (29.4); among these, the compound represented by Formula (29.2) and/or the compound represented by Formula (29.4) are preferred.

[Chem. 91]

(29.1)

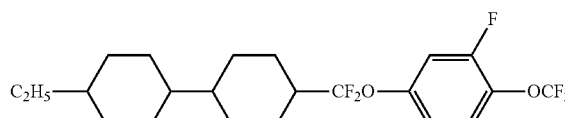

(29.2)

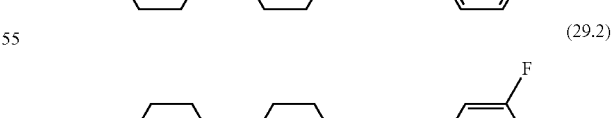

(29.3)

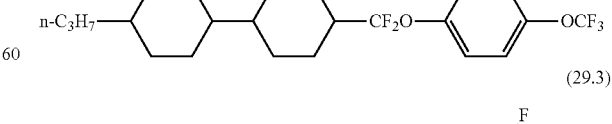

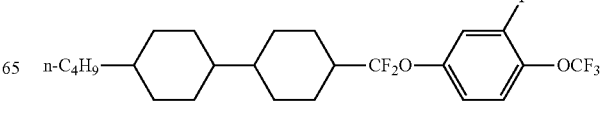

-continued (29.4)

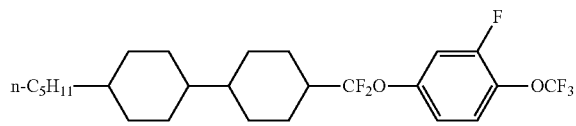

Alternatively or additionally, the compound represented by General Formula (IX) is preferably any of compounds represented by General Formula (IX-2).

[Chem. 92]

(IX-2)

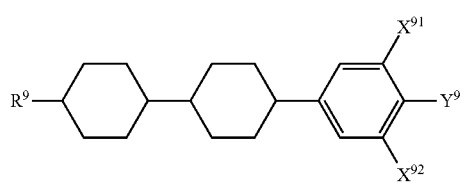

In General Formula (IX-2), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.

Such compounds can be used in any combination; a proper combination of the compounds for an embodiment is determined in view of solubility at low temperature, transition temperature, electric reliability, birefringence, and another property. For example, one of such compounds is used in an embodiment of the present invention; two of the compounds are used in another embodiment, three of the compounds are used in another embodiment, four of the compounds are used in another embodiment, five of the compounds are used in another embodiment, and six or more of the compounds are used in another embodiment.

The compound represented by General Formula (IX-2) is preferably any of compounds represented by General Formula (IX-2-1).

[Chem. 93]

(IX-2-1)

In General Formula (IX-2-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one to three of the compounds be used.

The amount of the compound represented by General Formula (IX-2-1) is appropriately adjusted on the basis of properties such as solubility at low temperature, transition temperature, electric reliability, and birefringence.

The amount of the compound represented by General Formula (IX-2-1) is, for instance, in the range of 1 to 25 mass % in an embodiment of the present invention, 1 to 20 mass % in another embodiment, 1 to 15 mass % in another embodiment, 1 to 10 mass % in another embodiment, 1 to 5 mass % in another embodiment, and 1 to 3 mass % in another embodiment relative to the total mass of the liquid crystal composition of the present invention.

The compound represented by General Formula (IX-2-1) is preferably at least one compound selected from the group consisting of compounds represented by Formulae (30.1) to (30.4); among these, the compound represented by Formula (30.1) and/or the compound represented by Formula (30.2) are preferred.

[Chem. 94]

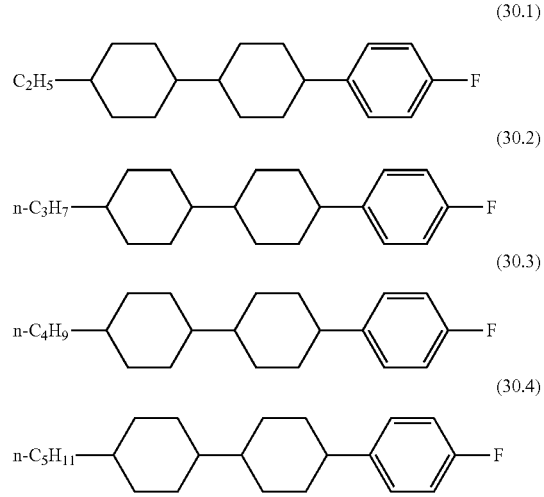

Alternatively or additionally, the compound represented by General Formula (IX-2) is preferably any of compounds represented by General Formula (IX-2-2).

[Chem. 95]

(IX-2-2)

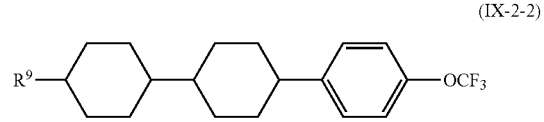

In General Formula (IX-2-2), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one to three of the compounds be used, and it is more preferred that one to four of the compounds be used.

The amount of the compound represented by General Formula (IX-2-2) is adjusted to be appropriate for an embodiment in view of properties such as solubility at low temperature, transition temperature, electric reliability, and birefringence.

The amount of the compound represented by General Formula (IX-2-2) is, for example, in the range of 1 to 30 mass % in an embodiment of the present invention, 1 to 25 mass % in another embodiment, 1 to 20 mass % in another embodiment, 1 to 15 mass % in another embodiment, 1 to 14 mass % in another embodiment, 7 to 14 mass % in another embodiment, 10 to 14 mass % in another embodiment, and 7 to 10 mass % in another embodiment relative to the total mass of the liquid crystal composition of the present invention.

The compound represented by General Formula (IX-2-2) is preferably at least one compound selected from the group consisting of compounds represented by Formulae (31.1) to (31.4), more preferably at least one compound selected from the group consisting of the compounds represented by Formulae (31.2) to (31.4), and further preferably the compound represented by Formula (31.2).

[Chem. 96]

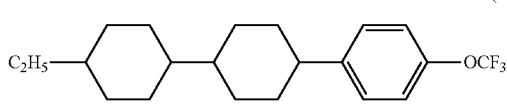
(31.1)

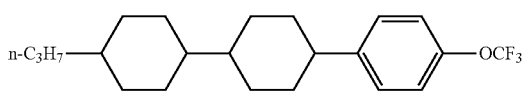
(31.2)

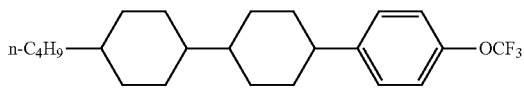
(31.3)

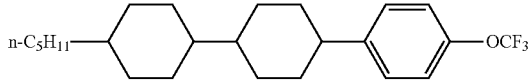
(31.4)

In the liquid crystal composition of the present invention, the amount of the compound represented by Formula (31.2) is preferably in the range of 1 mass % to 30 mass %, also preferably 1 mass % to 25 mass %, also preferably 1 mass % to 20 mass %, and also preferably 1 mass % to 15 mass % relative to the total mass of the liquid crystal composition of the present invention. In particular, for example, a preferred amount is as follows: from 1 mass % to 14 mass %, from 4 mass % to 14 mass %, from 10 mass % to 14 mass %, or from 4 mass % to 10 mass %.

In the liquid crystal composition of the present invention, the amount of the compound represented by Formula (31.4) is preferably in the range of 1 mass % to 20 mass %, also preferably 1 mass % to 15 mass %, also preferably 1 mass % to 5 mass %, and also preferably 2 mass % to 5 mass % relative to the total mass of the liquid crystal composition of the present invention.

Alternatively or additionally, the compound represented by General Formula (IX-2) is preferably any of compounds represented by General Formula (IX-2-3).

[Chem. 97]

(IX-2-3)

In General Formula (IX-2-3), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one or two of the compounds be used.

The amount of the compound represented by General Formula (IX-2-3) is preferably in the range of 1 mass % to 30 mass %, more preferably 3 mass % to 20 mass %, further preferably 6 mass % to 15 mass %, and further preferably 8 mass % to 10 mass % relative to the total mass of the liquid crystal composition of the present invention in view of solubility at low temperature, transition temperature, electric reliability, and another property.

The compound represented by General Formula (IX-2-3) is preferably at least one compound selected from the group consisting of compounds represented by Formulae (32.1) to (32.4); among these, the compound represented by Formula (32.2) and/or the compound represented by Formula (32.4) are preferred.

[Chem. 98]

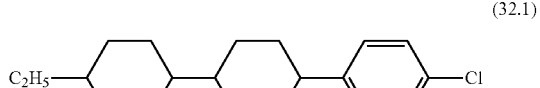
(32.1)

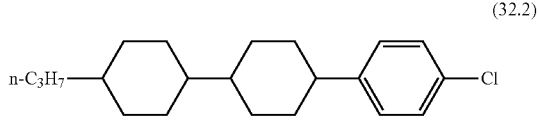
(32.2)

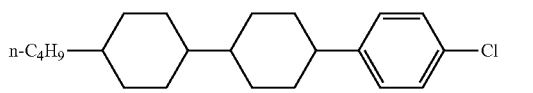
(32.3)

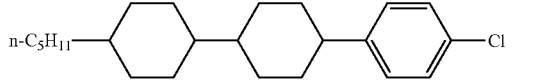
(32.4)

Alternatively or additionally, the compound represented by General Formula (IX-2) is preferably any of compounds represented by General Formula (IX-2-4).

[Chem. 99]

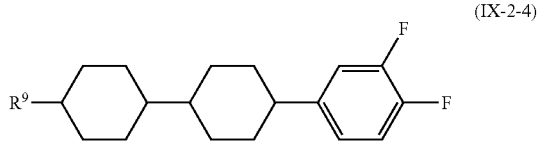
(IX-2-4)

In General Formula (IX-2-4), $R^9$ represents an alkyl group having 1 to 5 carbon atoms, an alkenyl group having 2 to 5 carbon atoms, or an alkoxy group having 1 to 4 carbon atoms.

The amount of the compound represented by General Formula (IX-2-4) is preferably in the range of 1 mass % to 30 mass %, more preferably 3 mass % to 20 mass %, further preferably 6 mass % to 15 mass %, and especially preferably 8 mass % to 10 mass % relative to the total mass of the liquid crystal composition of the present invention in view of solubility at low temperature, transition temperature, electric reliability, and another property.

The compound represented by General Formula (IX-2-4) is preferably at least one compound selected from the group consisting of compounds represented by Formulae (33.1) to (33.6); among these, the compound represented by Formula (33.1) and/or the compound represented by Formula (33.3) are preferred.

[Chem. 100]

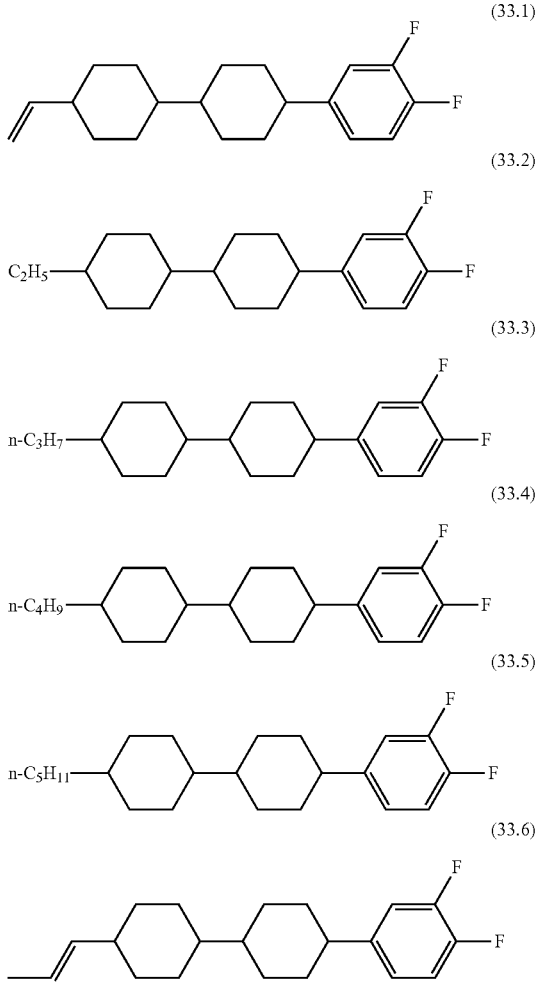

Alternatively or additionally, the compound represented by General Formula (IX-2) is preferably any of compounds represented by General Formula (IX-2-5).

[Chem. 101]

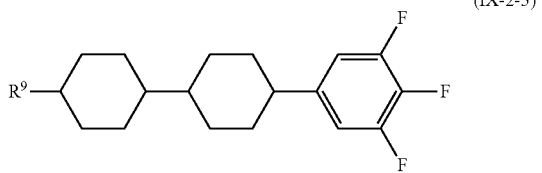

In General Formula (IX-2-5), $R^9$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment, three of the compounds are used in another embodiment, and four or more of the compounds are used in another embodiment.

The amount of the compound represented by General Formula (IX-2-5) is adjusted to be appropriate for an embodiment in view of properties such as solubility at low temperature, transition temperature, electric reliability, and birefringence.

The amount of the compound represented by General Formula (IX-2-5) is, for example, in the range of 1 to 40 mass % in an embodiment of the present invention, 1 to 35 mass % in another embodiment, 1 to 30 mass % in another embodiment, 1 to 8 mass % in another embodiment, 4 to 30 mass % in another embodiment, 8 to 30 mass % in another embodiment, and 4 to 8 mass % in another embodiment relative to the total mass of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition of the present invention needs to have a Tni kept at a high level to serve for a reduction in screen-burn in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (IX-2-5) is preferably at least one compound selected from the group consisting of compounds represented by Formulae (34.1) to (34.7); and more preferably the compound represented by Formula (34.1), the compound represented by Formula (34.2), the compound represented by Formula (34.3), and/or the compound represented by Formula (34.5).

[Chem. 102]

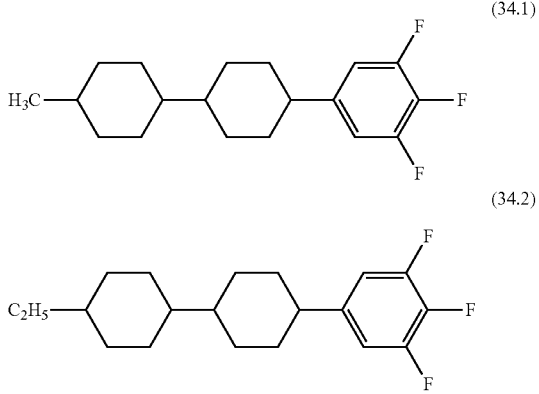

-continued (34.3)
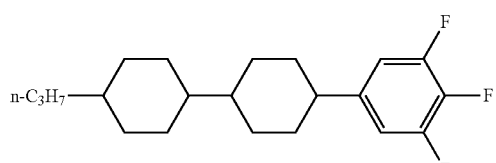

(34.4)
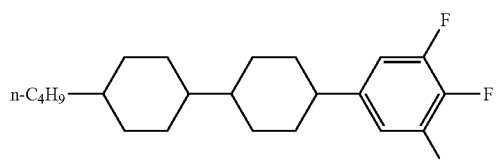

(34.5)
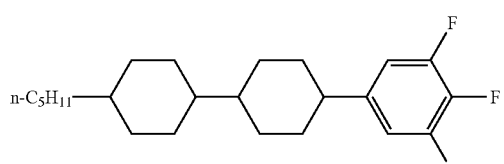

(34.6)
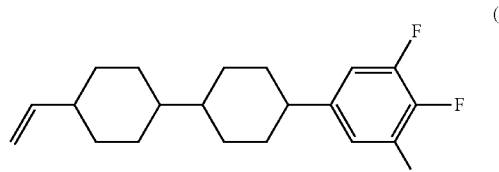

(34.7)
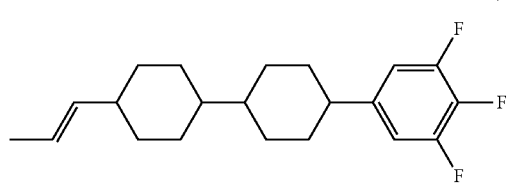

Alternatively or additionally, the compound represented by General Formula (IX) is preferably any of compounds represented by General Formula (IX-3).

[Chem. 103]

(IX-3)
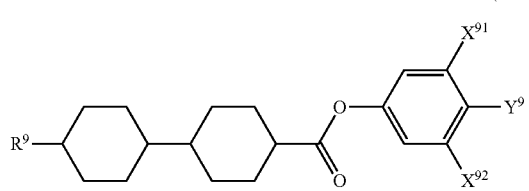

In General Formula (IX-3), $R^9$ represents an alkyl group having 1 to 5 carbon atoms, an alkenyl group having 2 to 5 carbon atoms, or an alkoxy group having 1 to 4 carbon atoms; $X^{91}$ and $X^{92}$ each independently represent a hydrogen atom or a fluorine atom; and $Y^9$ represents a fluorine atom, a chlorine atom, or —$OCF_3$.

The compound represented by General Formula (IX-3) is preferably any of compounds represented by General Formula (IX-3-1).

[Chem. 104]

(IX-3-1)
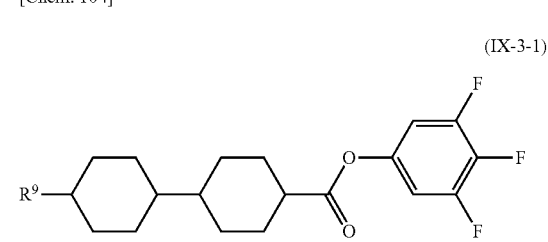

In General Formula (IX-3-1), $R^9$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one or two of the compounds be used.

The amount of the compound represented by General Formula (IX-3-1) is preferably in the range of 3 mass % to 30 mass %, also preferably 7 mass % to 30 mass %, also preferably 13 mass % to 20 mass %, and also preferably 15 mass % to 18 mass % relative to the total mass of the liquid crystal composition of the present invention in view of solubility at low temperature, transition temperature, electric reliability, and another property.

The compound represented by General Formula (IX-3-1) is preferably at least one compound selected from the group consisting of compounds represented by Formulae (35.1) to (35.4), and more preferably the compound represented by Formula (35.1) and/or the compound represented by Formula (35.2).

[Chem. 105]

(35.1)
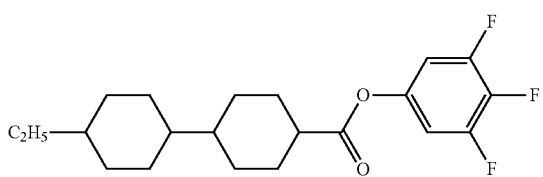

(35.2)
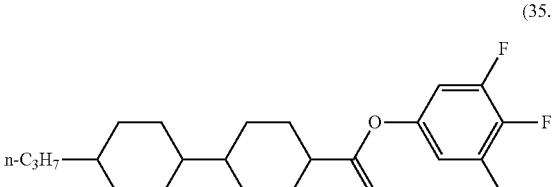

(35.3)
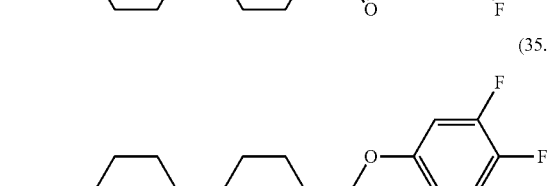

-continued (35.4)

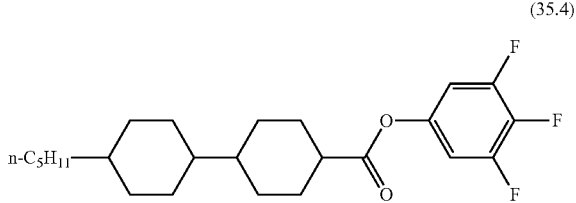

Alternatively or additionally, the compound represented by General Formula (M) is preferably any of compounds represented by General Formula (X).

[Chem. 106]

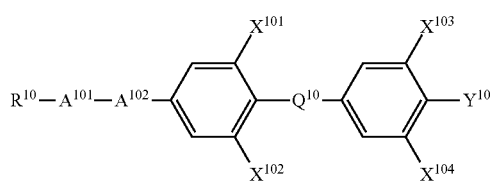

(X)

In General Formula (X), $X^{101}$ to $X^{104}$ each independently represent a fluorine atom or a hydrogen atom; $Y''$ represents a fluorine atom, a chlorine atom, or $-OCF_3$; $Q^{10}$ represents a single bond or $-CF_2O-$; $R''$ represents an alkyl group having 1 to 5 carbon atoms, an alkenyl group having 2 to 5 carbon atoms, or an alkoxy group having 1 to 4 carbon atoms; and $A^{101}$ and $A^{102}$ each independently represent a 1,4-cyclohexylene group, a 1,4-phenylene group, or any one of groups represented by the following formulae, and a hydrogen atom of the 1,4-phenylene group is optionally substituted with a fluorine atom.

[Chem. 107]

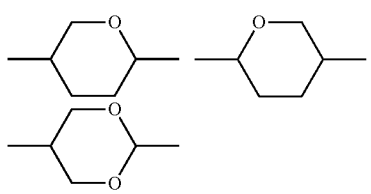

Such compounds can be used in any combination; a proper combination of the compounds is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (x) is adjusted to be appropriate for an embodiment in view of properties such as solubility at low temperature, transition temperature, electric reliability, and birefringence. The amount of the compound represented by General Formula (X) is, for example, in the range of 1 to 30 mass % in an embodiment of the present invention, 1 to 25 mass % in another embodiment, 1 to 20 mass % in another embodiment, 1 to 15 mass % in another embodiment, 1 to 10 mass % in another embodiment, 1 to 8 mass % in another embodiment, 1 to 4 mass % in another embodiment, 2 to 10 mass % in another embodiment, 2 to 8 mass % in another embodiment, 5 to 10 mass % in another embodiment, and 5 to 8 mass % in another embodiment relative to the total mass of the liquid crystal composition of the present invention.

In the case where the liquid crystal composition of the present invention needs to have a viscosity kept at a low level to contribute to a high response speed, it is preferred that the above-mentioned lower limit be low and that the upper limit be low. In the case where the liquid crystal composition needs to serve for a reduction in screen burn-in, it is preferred that the above-mentioned lower limit be low and that the upper limit be low. In order to increase dielectric anisotropy for keeping driving voltage at a low level, it is preferred that the above-mentioned lower limit be high and that the upper limit be high.

The compound represented by General Formula (X), which is used in the liquid crystal composition of the present invention, is preferably any of compounds represented by General Formula (X-1).

[Chem. 108]

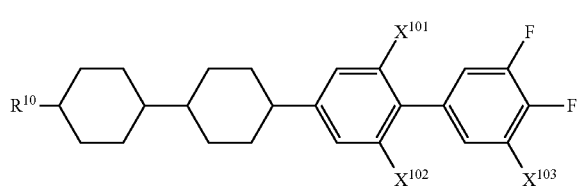

(X-1)

In General Formula (X-1), $X^{101}$ to $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (X-1) is, for example, in the range of 1 to 30 mass % in an embodiment of the present invention, 1 to 25 mass % in another embodiment, 1 to 20 mass % in another embodiment, 1 to 15 mass % in another embodiment, 1 to 10 mass % in another embodiment, 1 to 8 mass % in another embodiment, 1 to 3 mass % in another embodiment, 1 to 2 mass % in another embodiment, 2 to 8 mass % in another embodiment, and 2 to 3 mass % in another embodiment relative to the total mass of the liquid crystal composition of the present invention.

The compound represented by General Formula (X-1), which is used in the liquid crystal composition of the present invention, is preferably any of compounds represented by General Formula (X-1-1).

[Chem. 109]

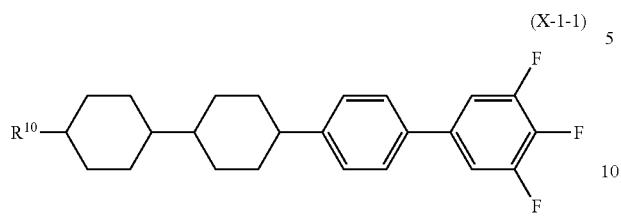

(X-1-1)

In General Formula (X-1-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined in view of solubility at low temperature, transition temperature, electric reliability, birefringence, and another property. For instance, one of such compounds is used in an embodiment of the present invention, two of the compounds are used in another embodiment of the present invention, three of the compounds are used in another embodiment, and four or more of the compounds are used in another embodiment.

The amount of the compound represented by General Formula (X-1-1) is appropriately adjusted on the basis of properties such as solubility at low temperature, transition temperature, electric reliability, and birefringence.

The amount of the compound represented by General Formula (X-1-1) is, for example, in the range of 1 to 30 mass % in an embodiment of the present invention, 1 to 25 mass % in another embodiment, 1 to 20 mass % in another embodiment, 1 to 15 mass % in another embodiment, 1 to 10 mass % in another embodiment, and 1 to 5 mass % in another embodiment relative to the total mass of the liquid crystal composition of the present invention.

In particular, the compound represented by General Formula (X-1-1), which is used in the liquid crystal composition of the present invention, is preferably at least one compound selected from the group consisting of compounds represented by Formulae (36.1) to (36.4); among these, the compound represented by Formula (36.1) and/or the compound represented by Formula (36.2) are preferably employed.

[Chem. 110]

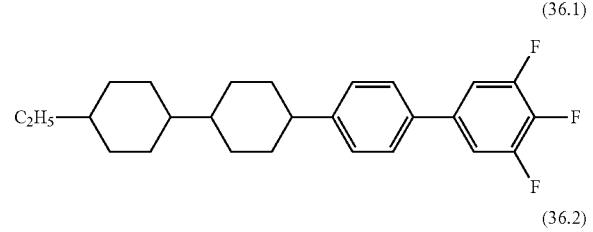

(36.1)

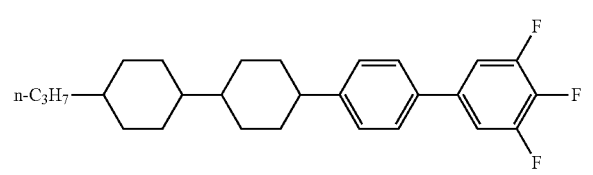

(36.2)

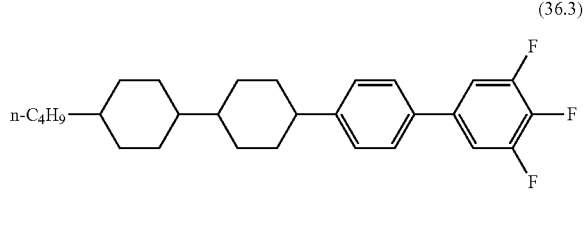

(36.3)

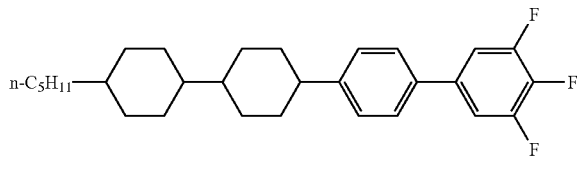

(36.4)

Alternatively or additionally, the compound represented by General Formula (X-1), which is used in the liquid crystal composition of the present invention, is preferably any of compounds represented by General Formula (X-1-2).

[Chem. 111]

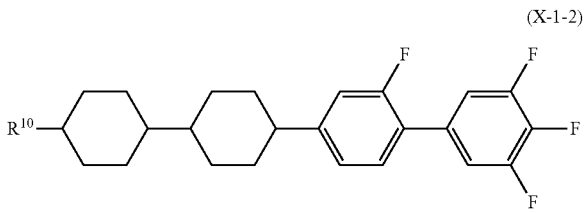

(X-1-2)

In General Formula (X-1-2), $R^{10}$ represents an alkyl group having 1 to 5 carbon atoms, an alkenyl group having 2 to 5 carbon atoms, or an alkoxy group having 1 to 4 carbon atoms.

The amount of the compound represented by General Formula (X-1-2) is appropriately adjusted on the basis of solubility at low temperature, transition temperature, electric reliability, and another property.

The amount of the compound represented by General Formula (X-1-2) is, for example, in the range of 1 to 20 mass % in an embodiment of the present invention, 1 to 15 mass % in another embodiment, 1 to 10 mass % in another embodiment, 1 to 6 mass % in another embodiment, 1 to 4 mass % in another embodiment, and 1 to 3 mass % in another embodiment relative to the total mass of the liquid crystal composition of the present invention.

In particular, the compound represented by General Formula (X-1-2), which is used in the liquid crystal composition of the present invention, is preferably at least one compound selected from the group consisting of compounds represented by Formulae (37.1) to (37.4); among these, the compound represented by Formula (37.2) is preferably employed.

[Chem. 112]

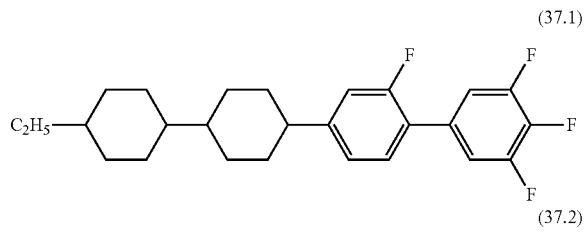
(37.1)

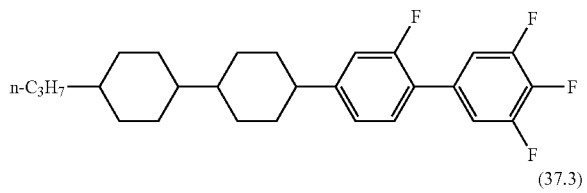
(37.2)

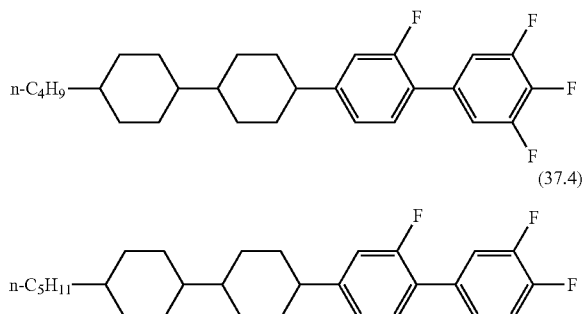
(37.3)

(37.4)

Alternatively or additionally, the compound represented by General Formula (X-1), which is used in the liquid crystal composition of the present invention, is preferably any of compounds represented by General Formula (X-1-3).

[Chem. 113]

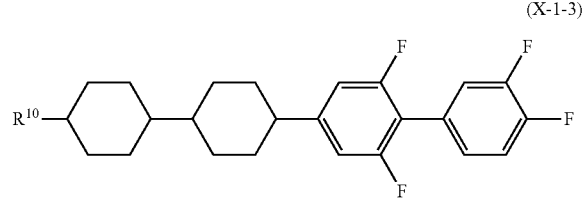
(X-1-3)

In General Formula (X-1-3), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X-1-3) is appropriately adjusted on the basis of solubility at low temperature, transition temperature, electric reliability, and another property.

The amount of the compound represented by General Formula (X-1-3) is, for example, in the range of 1 to 20 mass % in an embodiment of the present invention, 1 to 15 mass % in another embodiment, 1 to 10 mass % in another embodiment, 1 to 8 mass % in another embodiment, and 1 to 5 mass % in another embodiment relative to the total mass of the liquid crystal composition of the present invention.

Moreover, the amount of the compound represented by General Formula (X-1-3) is, for instance, in the range of 3 to 20 mass % in an embodiment of the present invention, 5 to 20 mass % in another embodiment, and 5 to 15 mass % in another embodiment relative to the total mass of the liquid crystal composition of the present invention.

In particular, the compound represented by General Formula (X-1-3), which is used in the liquid crystal composition of the present invention, is preferably at least one compound selected from the group consisting of compounds represented by Formulae (38.1) to (38.4); among these, the compound represented by Formula (38.2) is preferably employed.

[Chem. 114]

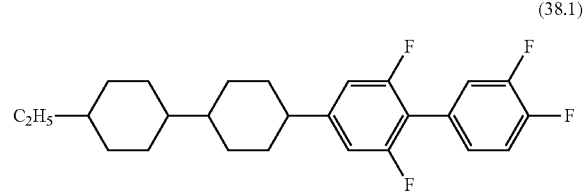
(38.1)

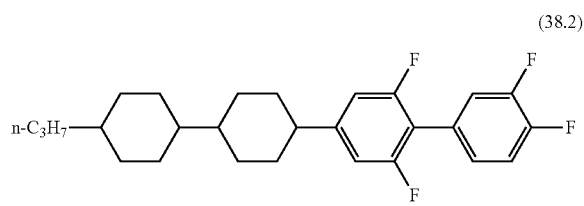
(38.2)

(38.3)

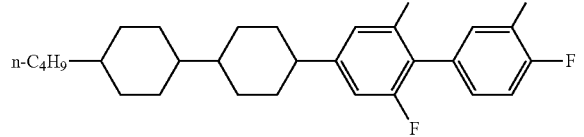
(38.4)

In the liquid crystal composition of the present invention, the amount of the compound represented by Formula (38.2) is preferably in the range of 1 mass % to 20 mass %, also preferably 1 mass % to 15 mass %, also preferably 1 mass % to 10 mass %, also preferably 1 mass % to 8 mass %, also preferably 3 mass % to 5 mass %, and also preferably 4 mass % to 5 mass % relative to the total mass of the liquid crystal composition of the present invention.

Alternatively or additionally, the compound represented by General Formula (X), which is used in the liquid crystal composition of the present invention, is preferably any of compounds represented by General Formula (X-2).

[Chem. 115]

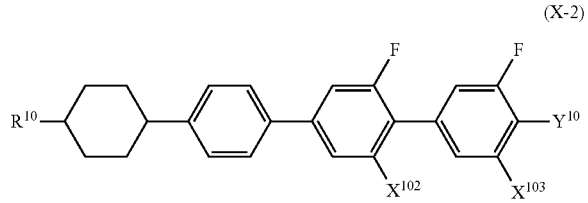

(X-2)

In General Formula (X-2), $X^{102}$ and $X^{103}$ each independently represent a fluorine atom or a hydrogen atom; $Y^{10}$ represents a fluorine atom, a chlorine atom, or —$OCF_3$; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The compound represented by General Formula (X-2), which is used in the liquid crystal composition of the present invention, is preferably any of compounds represented by General Formula (X-2-1).

[Chem. 116]

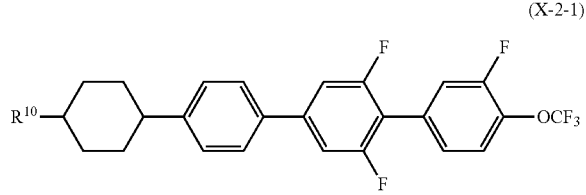

(X-2-1)

In General Formula (X-2-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination. In view of solubility at low temperature, transition temperature, electric reliability, birefringence, and another property, it is preferred that at least one of the compounds be used, and it is more preferred that at least three of the compounds be used.

The amount of the compound represented by General Formula (X-2-1) is preferably in the range of 1 mass % to 20 mass %, also preferably 1 mass % to 16 mass %, also preferably 1 mass % to 12 mass %, and also preferably 1 mass % to 10 mass % relative to the total mass of the liquid crystal composition of the present invention in view of solubility at low temperature, transition temperature, electric reliability, and another property. In particular, the amount of the compound represented by General Formula (X-2-1) is preferably from 1 to 5 mass %, and also preferably 1 to 3 mass % relative to the total mass of the liquid crystal composition of the present invention.

In particular, the compound represented by General Formula (X-2-1), which is used in the liquid crystal composition of the present invention, is preferably at least one compound selected from the group consisting of compounds represented by Formulae (39.1) to (39.4); among these, the compound represented by Formula (39.2) is preferably employed.

[Chem. 117]

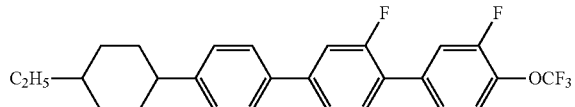

(39.1)

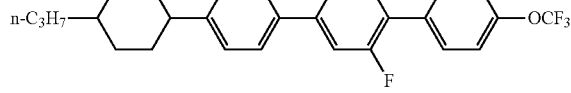

(39.2)

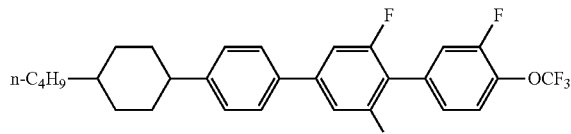

(39.3)

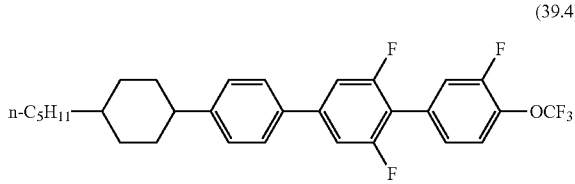

(39.4)

In the liquid crystal composition of the present invention, the amount of the compound represented by Formula (39.2) is preferably in the range of 1 mass % to 20 mass %, also preferably 1 mass % to 16 mass %, also preferably 1 mass % to 12 mass %, and also preferably 3 mass % to 10 mass % relative to the total mass of the liquid crystal composition of the present invention. In particular, the amount of the compound represented by Formula (39.2) is preferably from 1 to 5 mass %, also preferably 1 to 3 mass %, also preferably 5 to 10 mass %, and also preferably 6 to 9 mass % relative to the total mass of the liquid crystal composition of the present invention.

Alternatively or additionally, the compound represented by General Formula (X-2), which is used in the liquid crystal composition of the present invention, is preferably any of compounds represented by General Formula (X-2-2).

[Chem. 118]

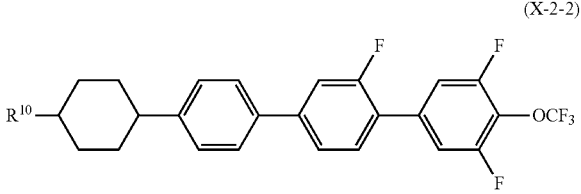

(X-2-2)

In General Formula (X-2-2), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X-2-2) is preferably in the range of 3 mass % to 20 mass %, also preferably 6 mass % to 16 mass %, also preferably 9 mass % to 12 mass %, and also preferably 9 mass % to 10 mass % relative to the total mass of the liquid crystal composition of the present invention in view of solubility at low temperature, transition temperature, electric reliability, and another property.

In particular, the compound represented by General Formula (X-2-2), which is used in the liquid crystal composition of the present invention, is preferably at least one compound selected from the group consisting of compounds represented by Formulae (40.1) to (40.4); among these, the compound represented by Formula (40.2) is preferably employed.

[Chem. 119]

(40.1)

$C_2H_5$—⬡—⌬—⌬(F)—⌬(F,F)—$OCF_3$ (40.2)

$n\text{-}C_3H_7$—⬡—⌬—⌬(F)—⌬(F,F)—$OCF_3$ (40.3)

$n\text{-}C_4H_9$—⬡—⌬—⌬(F)—⌬(F,F)—$OCF_3$ (40.4)

$n\text{-}C_5H_{11}$—⬡—⌬—⌬(F)—⌬(F,F)—$OCF_3$

Alternatively or additionally, the compound represented by General Formula (X) is preferably any of compounds represented by General Formula (X-3).

[Chem. 120]

(X-3)

$R^{10}$—⌬—⌬—⌬(F)—⌬(F,F)—F
with $X^{102}$, $X^{103}$

In General Formula (X-3), $X^{102}$ and $X^{103}$ each independently represent a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination. In view of solubility at low temperature, transition temperature, electric reliability, birefringence, and another property, the compounds are preferably used alone or in combination.

The compound represented by General Formula (X-3), which is used in the liquid crystal composition of the present invention, is preferably any of compounds represented by General Formula (X-3-1).

[Chem. 121]

(X-3-1)

$R^{10}$—⌬—⌬—⌬(F)—⌬(F,F,F)—F

In General Formula (X-3-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X-3-1) is appropriately adjusted on the basis of solubility at low temperature, transition temperature, electric reliability, and another property.

The amount of the compound represented by General Formula (X-3-1) is, for example, in the range of 1 to 10 mass % in an embodiment of the present invention, 1 to 8 mass % in another embodiment, 1 to 6 mass % in another embodiment, 1 to 4 mass % in another embodiment, and 1 to 2 mass % in another embodiment relative to the total mass of the liquid crystal composition of the present invention.

In particular, the compound represented by General Formula (X-3-1), which is used in the liquid crystal composition of the present invention, is preferably at least one compound selected from the group consisting of compounds represented by Formulae (41.1) to (41.4); among these, the compound represented by Formula (41.2) is preferably employed.

[Chem. 122]

(41.1)

$C_2H_5$—⌬—⌬—⌬(F)—⌬(F,F,F)—F (41.2)

$n\text{-}C_3H_7$—⌬—⌬—⌬(F)—⌬(F,F,F)—F

-continued (41.3)

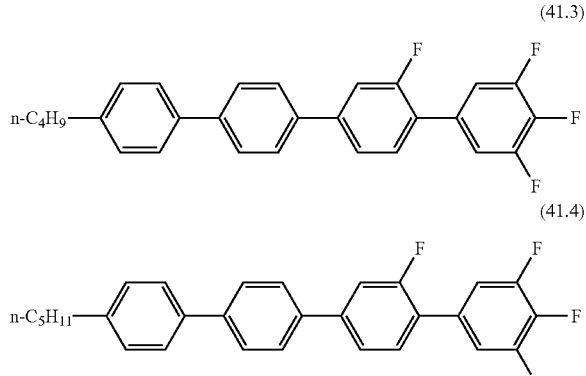

(41.4)

Alternatively or additionally, the compound represented by General Formula (X) is preferably any of compounds represented by General Formula (X-4).

[Chem. 123]

(X-4)

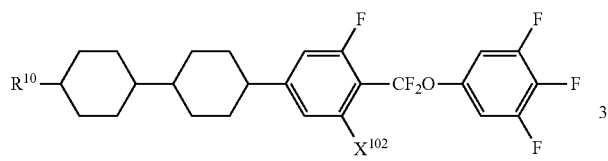

In General Formula (X-4), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

The compound represented by General Formula (X-4), which is used in the liquid crystal composition of the present invention, is preferably any of compounds represented by General Formula (X-4-1).

[Chem. 124]

(X-4-1)

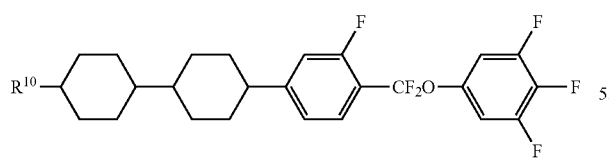

In General Formula (X-4-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

The amount of the compound represented by General Formula (X-4-1) is appropriately adjusted on the basis of solubility at low temperature, transition temperature, electric reliability, and another property.

The amount of the compound represented by General Formula (X-4-1) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention.

In particular, the compound represented by General Formula (X-4-1), which is used in the liquid crystal composition of the present invention, is preferably at least one compound selected from the group consisting of compounds represented by Formulae (42.1) to (42.4); among these, the compound represented by Formula (42.3) is preferably employed.

[Chem. 125]

(42.1)

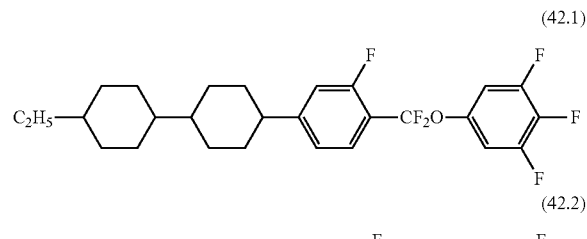

(42.2)

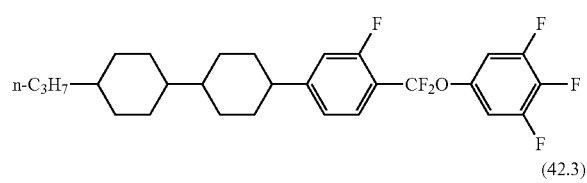

(42.3)

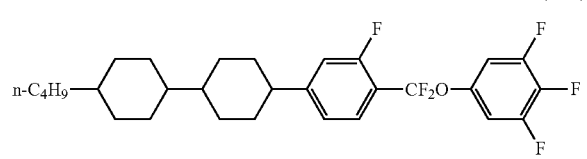

(42.4)

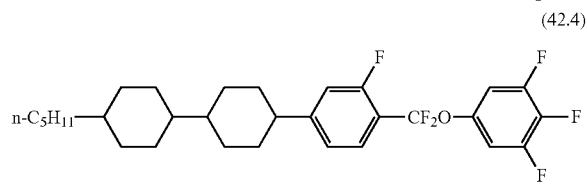

Alternatively or additionally, the compound represented by General Formula (X), which is used in the liquid crystal composition of the present invention, is preferably any of compounds represented by General Formula (X-4-2).

[Chem. 126]

(X-4-2)

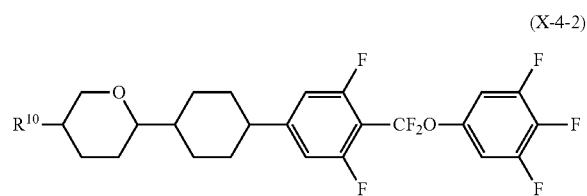

In General Formula (X-4-2), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

The amount of the compound represented by General Formula (X-4-2) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention in view of solubility at low temperature, transition temperature, electric reliability, and another property.

In particular, the compound represented by General Formula (X-4-2), which is used in the liquid crystal composition of the present invention, is preferably at least one compound selected from the group consisting of compounds represented by Formulae (42.11) to (42.14), and more preferably the compound represented by Formula (42.13) and/or the compound represented by Formula (42.14).

[Chem. 127]

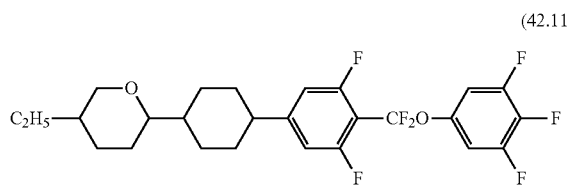
(42.11)

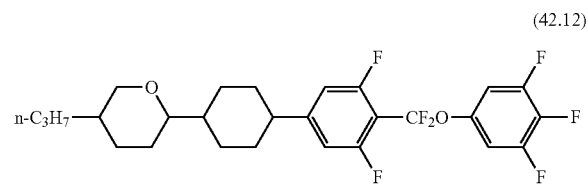
(42.12)

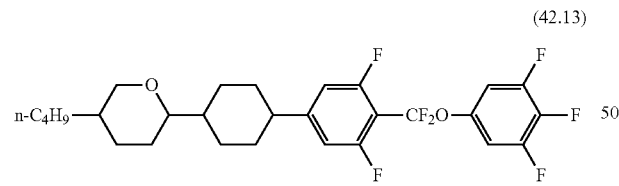
(42.13)

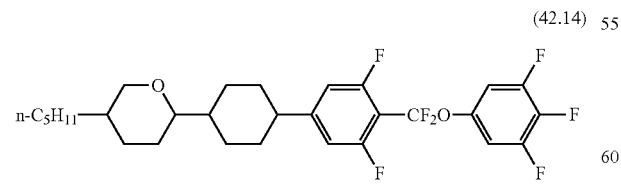
(42.14)

Alternatively or additionally, the compound represented by General Formula (X), which is used in the liquid crystal composition of the present invention, is preferably any of compounds represented by General Formula (X-4-3).

[Chem. 128]

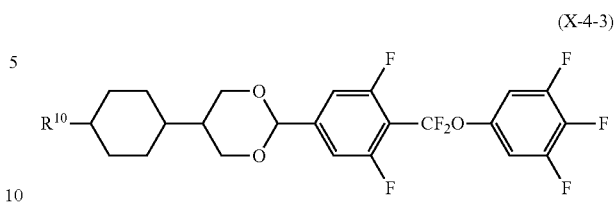
(X-4-3)

In General Formula (X-4-3), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

The amount of the compound represented by General Formula (X-4-3) is preferably in the range of 2 mass % to 20 mass %, also preferably 5 mass % to 17 mass %, also preferably 10 mass % to 15 mass %, and also preferably 10 mass % to 13 mass % relative to the total mass of the liquid crystal composition of the present invention in view of solubility at low temperature, transition temperature, electric reliability, and another property.

In particular, the compound represented by General Formula (X-4-3), which is used in the liquid crystal composition of the present invention, is preferably at least one compound selected from the group consisting of compounds represented by Formulae (42.21) to (42.24), and more preferably the compound represented by Formula (42.22).

[Chem. 129]

(42.21)

(42.22)
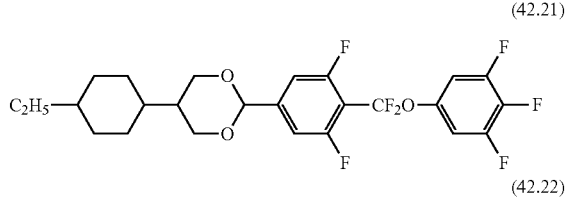

(42.23)
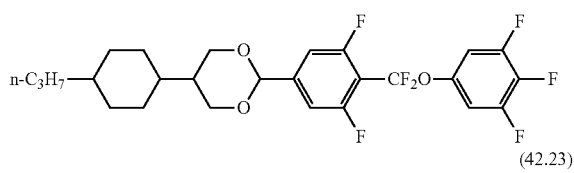

(42.24)
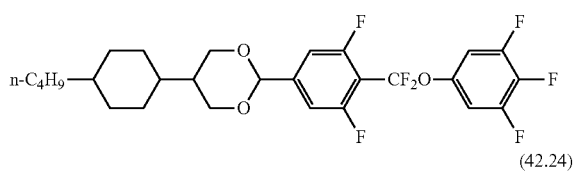

Alternatively or additionally, the compound represented by General Formula (X) is preferably any of compounds represented by General Formula (X-5).

[Chem. 130]

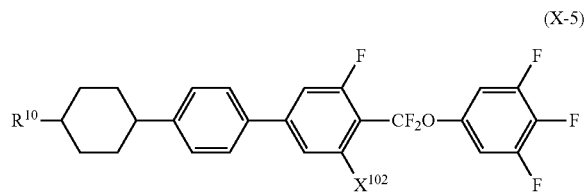
(X-5)

In General Formula (X-5), $X^{102}$ represents a fluorine atom or a hydrogen atom; and $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

The compound represented by General Formula (X-5) is preferably any of compounds represented by General Formula (X-5-1).

[Chem. 131]

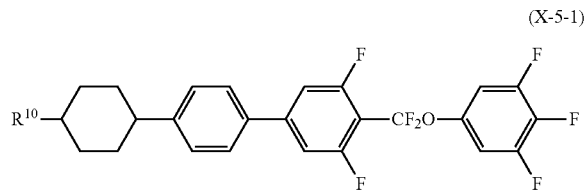
(X-5-1)

In General Formula (X-5-1), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that at least one of the compounds be used, and it is more preferred that at least three of the compounds be used.

In particular, the compound represented by General Formula (X-5-1) is preferably at least one compound selected from the group consisting of compounds represented by Formulae (43.1) to (43.4); among these, the compound represented by Formula (43.2) is preferably employed.

[Chem. 132]

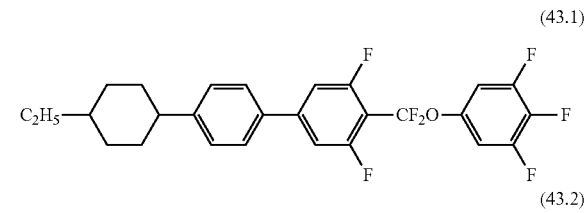
(43.1)

(43.2)

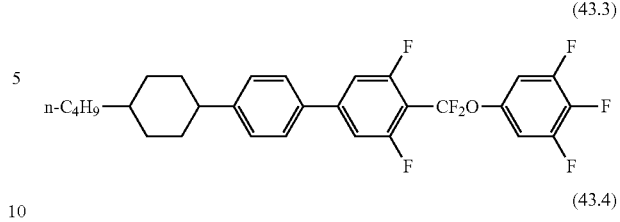
(43.3)

(43.4)

Alternatively or additionally, the compound represented by General Formula (X) is preferably any of compounds represented by General Formula (X-6).

[Chem. 133]

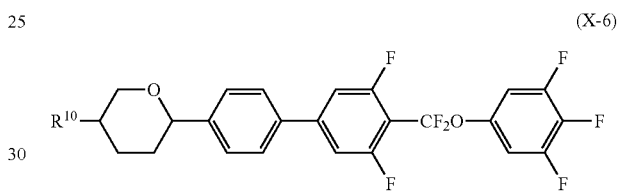
(X-6)

In General Formula (X-6), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X-6) is appropriately adjusted on the basis of properties such as solubility at low temperature, transition temperature, electric reliability, and birefringence.

The amount of the compound represented by General Formula (X-6) is, for example, in the range of 1 to 30 mass % in an embodiment of the present invention, 1 to 25 mass % in another embodiment, 1 to 20 mass % in another embodiment, 1 to 15 mass % in another embodiment, 1 to 12 mass % in another embodiment, 1 to 9 mass % in another embodiment, 1 to 8 mass % in another embodiment, 1 to 2 mass % in another embodiment, 3 to 30 mass % in another embodiment, 5 to 30 mass % in another embodiment, 5 to 25 mass % in another embodiment, 5 to 20 mass % in another embodiment, 5 to 11 mass % in another embodiment, and 5 to 8 mass % in another embodiment relative to the total mass of the liquid crystal composition of the present invention.

In particular, the compound represented by General Formula (X-6) is preferably at least one compound selected from the group consisting of compounds represented by Formulae (44.1) to (44.4); among these, the compound represented by Formula (44.1) and/or the compound represented by Formula (44.2) are preferably employed.

[Chem. 134]

(44.1)

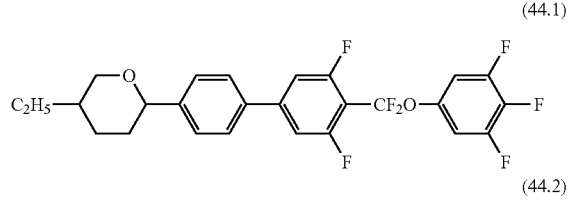
(44.2)

(44.3)

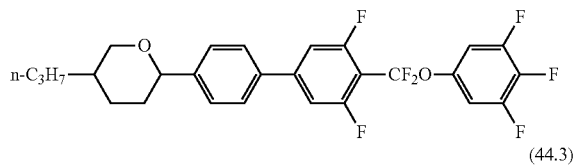

(44.4)

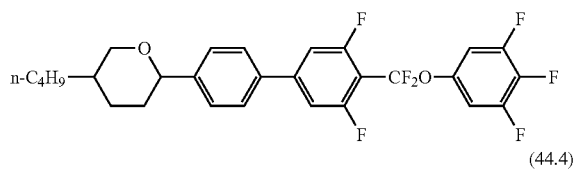

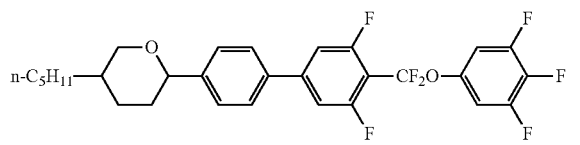

The compound represented by General Formula (M), which can be contained in the liquid crystal composition of the present invention, may be any of compounds which are represented by General Formula (X'-7) and which are analogous to the compound represented by General Formula (X).

[Chem. 135]

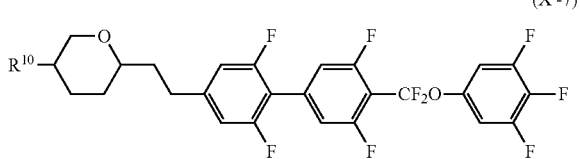
(X'-7)

In General Formula (X'-7), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X'-7) is appropriately adjusted on the basis of properties such as solubility at low temperature, transition temperature, electric reliability, and birefringence.

The amount of the compound represented by General Formula (X'-7) is, for example, in the range of 4 to 30 mass % in an embodiment of the present invention, 5 to 30 mass % in another embodiment, 6 to 30 mass % in another embodiment, 8 to 30 mass % in another embodiment, 9 to 30 mass % in another embodiment, 11 to 30 mass % in another embodiment, 14 to 30 mass % in another embodiment, and 18 to 30 mass % in another embodiment relative to the total mass of the liquid crystal composition of the present invention.

Moreover, the amount of the compound represented by General Formula (X'-7) is, for instance, in the range of 4 to 20 mass % in an embodiment of the present invention, 4 to 13 mass % in another embodiment, 4 to 10 mass % in another embodiment, and 4 to 7 mass % in another embodiment relative to the total mass of the liquid crystal composition of the present invention.

In particular, the compound represented by General Formula (x'-7), which is used in the liquid crystal composition of the present invention, is preferably at least one compound selected from the group consisting of compounds represented by Formulae (44.11) to (44.14), and more preferably the compound represented by Formula (44.13).

[Chem. 136]

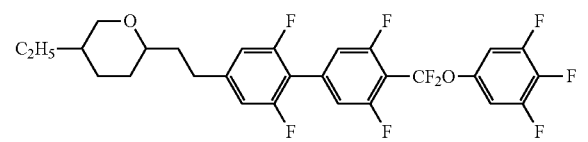
(44.11)

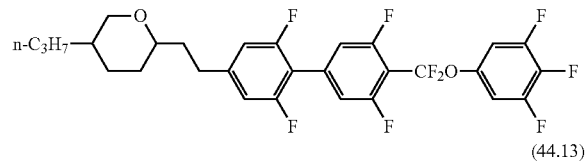
(44.12)

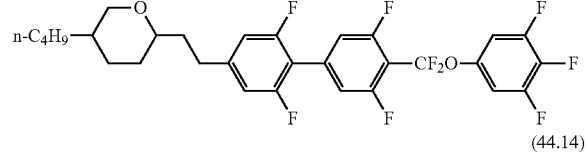
(44.13)

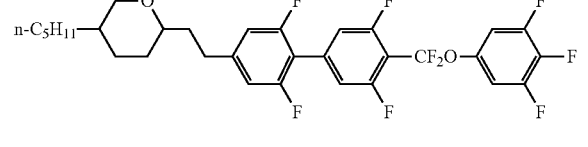
(44.14)

Alternatively or additionally, the compound represented by General Formula (X) is preferably any of compounds represented by General Formula (X-8).

[Chem. 137]

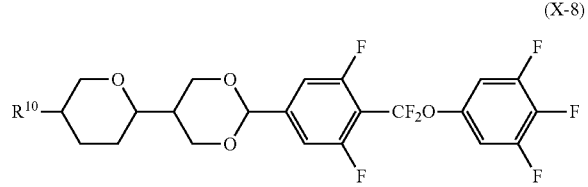
(X-8)

In General Formula (X-8), $R^{10}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (X-8) is appropriately adjusted on the basis of properties such as solubility at low temperature, transition temperature, electric reliability, and birefringence.

The amount of the compound represented by General Formula (X-8) is, for example, in the range of 1 to 25 mass % in an embodiment of the present invention, 1 to 20 mass % in another embodiment, 1 to 15 mass % in another embodiment, 1 to 10 mass % in another embodiment, 1 to 5 mass % in another embodiment, and 1 to 3 mass % in another embodiment relative to the total mass of the liquid crystal composition of the present invention.

In particular, the compound represented by General Formula (X-8) is preferably at least one compound selected from the group consisting of compounds represented by Formulae (44.21) to (44.24); among these, the compound represented by Formula (44.22) is preferably employed.

[Chem. 138]

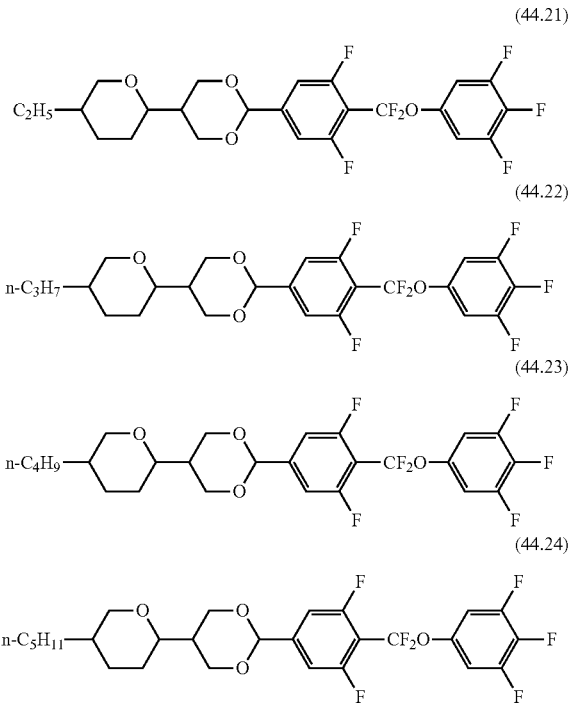

Alternatively or additionally, the compound represented by General Formula (X) is preferably at least one compound selected from the group consisting of compounds represented by General Formula (XI).

[Chem. 139]

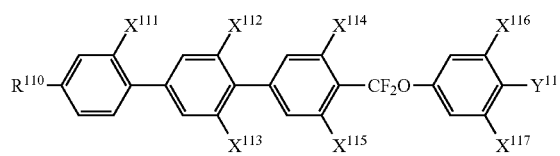

In General Formula (XI), $X^{111}$ to $X^{117}$ each independently represent a fluorine atom or a hydrogen atom, and at least one of $X^{111}$ to $X^{117}$ represents a fluorine atom; $R^{110}$ represents an alkyl group having 1 to 5 carbon atoms, an alkenyl group having 2 to 5 carbon atoms, or an alkoxy group having 1 to 4 carbon atoms; and $Y^{11}$ represents a fluorine atom or —$OCF_3$.

Such compounds can be used in any combination; for example, in view of solubility at low temperature, transition temperature, electric reliability, birefringence, and another property, one of the compounds is preferably used in an embodiment of the present invention, two of the compounds are preferably used in another embodiment, and three or more of the compounds are preferably used in another embodiment.

The amount of the compound represented by General Formula (XI) is appropriately adjusted on the basis of properties such as solubility at low temperature, transition temperature, electric reliability, and birefringence.

The amount of the compound represented by General Formula (XI) is, for example, in the range of 1 to 25 mass % in an embodiment of the present invention, 1 to 20 mass % in another embodiment, 1 to 11 mass % in another embodiment, 1 to 8 mass % in another embodiment, 3 to 25 mass % in another embodiment, 5 to 25 mass % in another embodiment, 5 to 20 mass % in another embodiment, 5 to 15 mass % in another embodiment, 5 to 11 mass % in another embodiment, and 5 to 8 mass % in another embodiment relative to the total mass of the liquid crystal composition of the present invention.

In the case where the liquid crystal composition of the present invention is used in a liquid crystal display device having a small cell gap, the appropriate amount of the compound represented by General Formula (XI) is at a higher level. In the case where the liquid crystal composition of the present invention is used in a liquid crystal display device which is driven at a small driving voltage, the appropriate amount of the compound represented by General Formula (XI) is at a higher level. In the case where the liquid crystal composition of the present invention is used in a liquid crystal display device which is used in a low-temperature environment, the appropriate amount of the compound represented by General Formula (XI) is at a lower level. In the case where the liquid crystal composition is used in a liquid crystal display device which quickly responds, the appropriate amount of the compound represented by General Formula (XI) is at a lower level.

The compound represented by General Formula (XI), which is used in the liquid crystal composition of the present invention, is preferably any of compounds represented by General Formula (XI-1).

[Chem. 140]

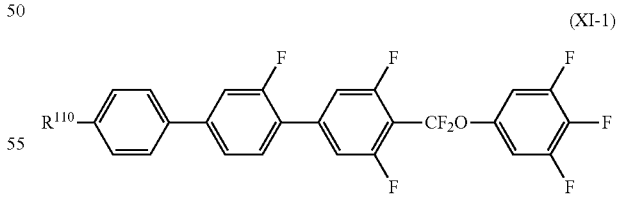

In General Formula (XI-1), $R^{110}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment can be determined in view of solubility at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-1) is preferably in the range of 1 mass % to 25 mass %, also preferably 2 mass % to 20 mass %, and also preferably 2 mass % to 15 mass % relative to the total mass of the liquid crystal composition of the present invention in view of solubility at low temperature, transition temperature, electric reliability, and another property. In particular, the amount of the compound represented by General Formula (XI-1) is preferably from 2 to 12 mass %, also preferably 2 to 8 mass %, also preferably 3 to 15 mass %, also preferably 3 to 13 mass %, and also preferably 5 to 8 mass % relative to the total mass of the liquid crystal composition of the present invention.

In particular, the compound represented by General Formula (XI-1), which is used in the liquid crystal composition of the present invention, is preferably at least one compound selected from the group consisting of compounds represented by Formulae (45.1) to (45.4); among these, at least one compound selected from the group consisting of the compounds represented by Formulae (45.2) to (45.4) is preferably used, and the compound represented by Formula (45.2) is more preferably used.

[Chem. 141]

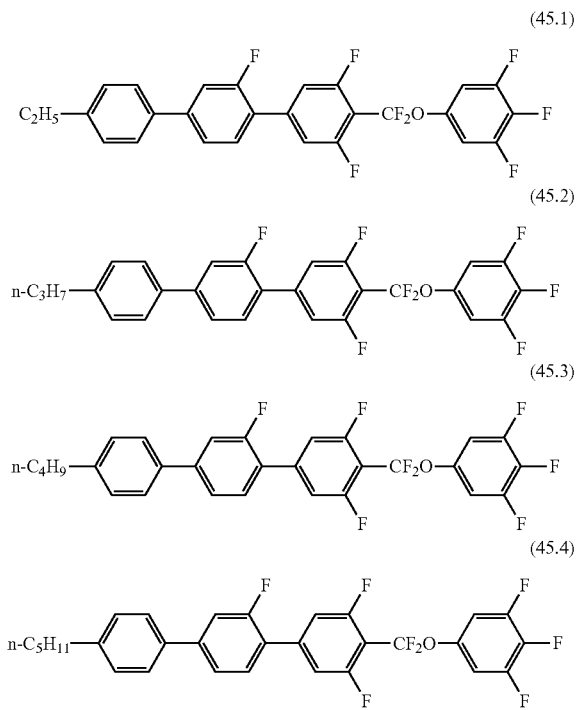

In the liquid crystal composition of the present invention, the amount of the compound represented by Formula (45.2) is preferably in the range of 1 mass % to 25 mass %, also preferably 2 mass % to 20 mass %, also preferably 2 mass % to 15 mass %, also preferably 2 mass % to 10 mass %, also preferably 2 mass % to 7 mass %, and also preferably 2 mass % to 5 mass % relative to the total mass of the liquid crystal composition of the present invention in view of solubility at low temperature, transition temperature, electric reliability, and another property.

In the liquid crystal composition of the present invention, the amount of the compound represented by Formula (45.3) is preferably in the range of 1 mass % to 20 mass %, also preferably 1 mass % to 15 mass %, also preferably 1 mass % to 10 mass %, also preferably 2 mass % to 9 mass %, also preferably 2 mass % to 5 mass %, and also preferably 2 mass % to 4 mass % relative to the total mass of the liquid crystal composition of the present invention in view of solubility at low temperature, transition temperature, electric reliability, and another property.

In the liquid crystal composition of the present invention, the amount of the compound represented by Formula (45.4) is preferably in the range of 1 mass % to 20 mass %, more preferably 1 mass % to 15 mass %, further preferably 1 mass % to 10 mass %, and especially preferably 2 mass % to 10 mass % relative to the total mass of the liquid crystal composition of the present invention in view of solubility at low temperature, transition temperature, electric reliability, and another property. Examples of the especially preferred range are as follows: from 4 mass % to 10 mass %, from 5 mass % to 10 mass %, from 2 mass % to 7 mass %, from 2 mass % to 6 mass %, and from 5 mass % to 7 mass %.

Alternatively or additionally, the compound represented by General Formula (XI), which is used in the liquid crystal composition of the present invention, is preferably any of compounds represented by General Formula (XI-2).

[Chem. 142]

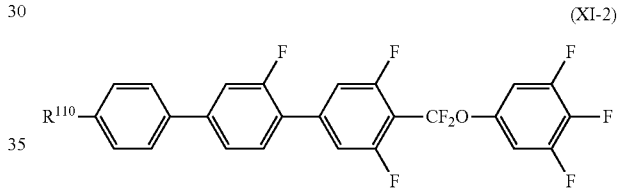

In General Formula (XI-2), $R^{110}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of solubility at low temperature, transition temperature, electric reliability, birefringence, and another property. For example, one of the compounds is used in an embodiment of the present invention, two of the compounds are used in another embodiment, and three or more of the compounds are used in another embodiment.

The amount of the compound represented by General Formula (XI-2) is preferably in the range of 1 mass % to 20 mass %, also preferably 3 mass % to 20 mass %, also preferably 4 mass % to 20 mass %, also preferably 6 mass % to 15 mass %, and also preferably 9 mass % to 12 mass % relative to the total mass of the liquid crystal composition of the present invention in view of solubility at low temperature, transition temperature, electric reliability, and another property.

In particular, the compound represented by General Formula (XI-2), which is used in the liquid crystal composition of the present invention, is preferably at least one compound selected from the group consisting of compounds represented by Formulae (45.11) to (45.14); among these, at least one compound selected from the group consisting of the compounds represented by Formulae (45.12) to (45.14) is preferably used, and the compound represented by Formula (45.12) is more preferably used.

[Chem. 143]

(45.11)
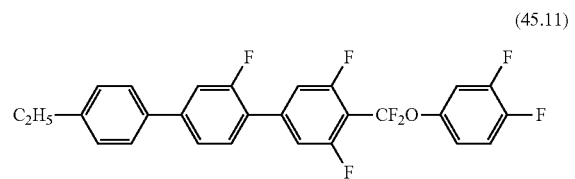

(45.12)
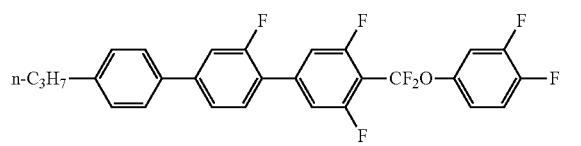

(45.13)
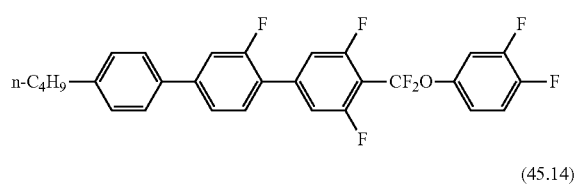

(45.14)
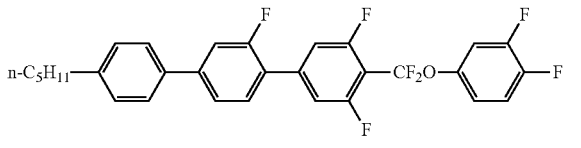

Alternatively or additionally, the compound represented by General Formula (X) is preferably at least one compound selected from the group consisting of compounds represented by General Formula (XII).

[Chem. 144]

(XII)
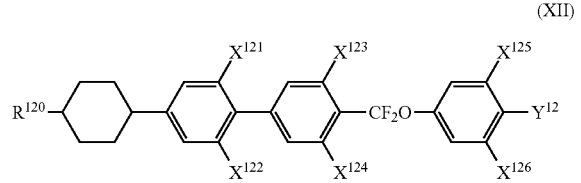

In General Formula (XII), $X^{121}$ to $X^{126}$ each independently represent a fluorine atom or a hydrogen atom; $R^{120}$ represents an alkyl group having 1 to 5 carbon atoms, an alkenyl group having 2 to 5 carbon atoms, or an alkoxy group having 1 to 4 carbon atoms; and $Y^{12}$ represents a fluorine atom or —$OCF_3$.

Such compounds can be used in any combination; in view of solubility at low temperature, transition temperature, electric reliability, birefringence, and another property, it is preferred that one to three or more of the compounds be appropriately used, and it is more preferred that one to four or more of the compounds be appropriately used.

The compound represented by General Formula (XII), which is used in the liquid crystal composition of the present invention, is preferably any of compounds represented by General Formula (XII-1).

[Chem. 145]

(XII-1)
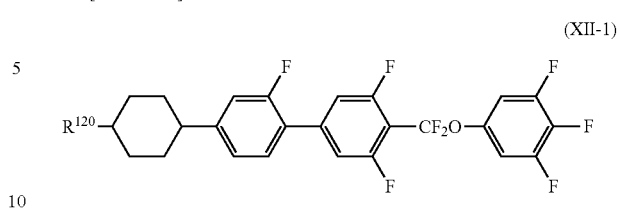

In General Formula (XII-1), $R^{120}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one or two or more of the compounds be appropriately used, and it is more preferred that one to three or more of the compounds be appropriately used.

The amount of the compound represented by General Formula (XII-1) is preferably in the range of 1 mass % to 15 mass %, also preferably 2 mass % to 10 mass %, also preferably 3 mass % to 8 mass %, and also preferably 4 mass % to 6 mass % relative to the total mass of the liquid crystal composition of the present invention in view of solubility at low temperature, transition temperature, electric reliability, and another property.

In particular, the compound represented by General Formula (XII-1), which is used in the liquid crystal composition of the present invention, is preferably at least one compound selected from the group consisting of compounds represented by Formulae (46.1) to (46.4); among these, at least one compound selected from the group consisting of the compounds represented by Formulae (46.2) to (46.4) is preferably used.

[Chem. 146]

(46.1)
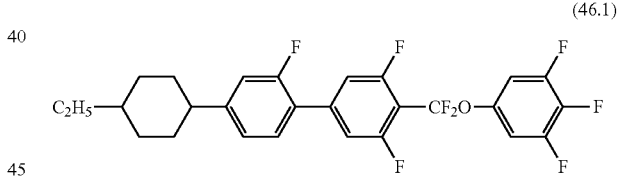

(46.2)
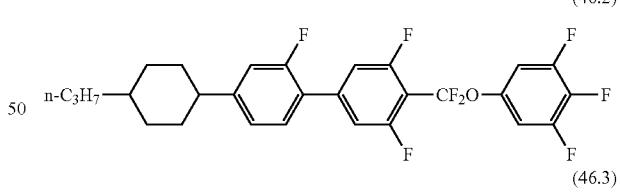

(46.3)
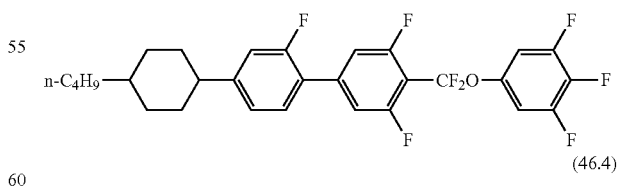

(46.4)
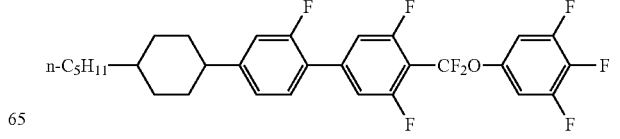

Alternatively or additionally, the compound represented by General Formula (XII) is preferably any of compounds represented by General Formula (XII-2).

[Chem. 147]

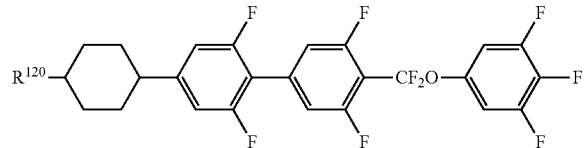

(XII-2)

In General Formula (XII-2), $R^{120}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, it is preferred that one or two or more of the compounds be appropriately used, and it is more preferred that one to three or more of the compounds be appropriately used.

The amount of the compound represented by General Formula (XII-2) is preferably in the range of 1 mass % to 20 mass %, also preferably 3 mass % to 20 mass %, also preferably 4 mass % to 17 mass %, also preferably 6 mass % to 15 mass %, and also preferably 9 mass % to 13 mass % relative to the total mass of the liquid crystal composition of the present invention in view of solubility at low temperature, transition temperature, electric reliability, and another property.

In particular, the compound represented by General Formula (XII-2), which is used in the liquid crystal composition of the present invention, is preferably at least one compound selected from the group consisting of compounds represented by Formulae (47.1) to (47.4); among these, at least one compound selected from the group consisting of the compounds represented by Formulae (47.2) to (47.4) is preferably used.

[Chem. 148]

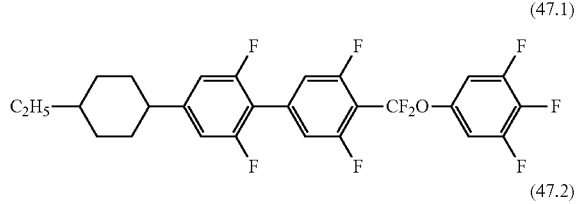

(47.1)

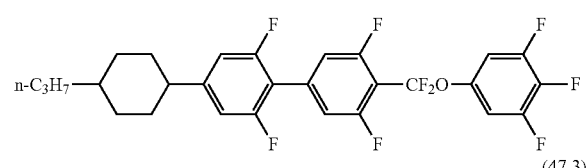

(47.2)

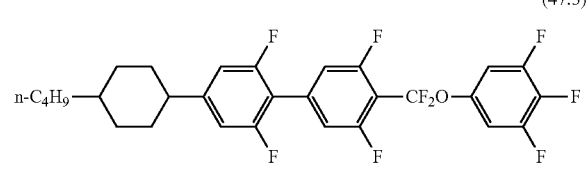

(47.3)

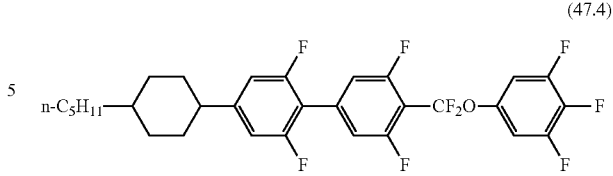

(47.4)

Alternatively or additionally, the compound represented by General Formula (M) is preferably at least one compound selected from the group consisting of compounds represented by General Formula (XIII).

[Chem. 149]

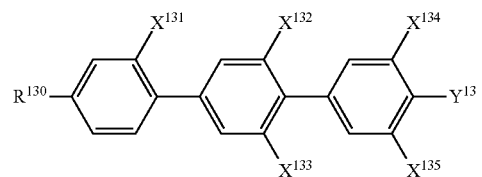

(XIII)

In General Formula (XIII), $X^{131}$ to $X^{135}$ each independently represent a fluorine atom or a hydrogen atom; $R^{130}$ represents an alkyl group having 1 to 5 carbon atoms, an alkenyl group having 2 to 5 carbon atoms, or an alkoxy group having 1 to 4 carbon atoms; and $Y^{13}$ represents a fluorine atom or —$OCF_3$.

Such compounds can be used in any combination; one or two of the compounds are preferably used, one to three of the compounds are more preferably used, and one to four of the compounds are further preferably used.

The amount of the compound represented by General Formula (XIII) is appropriately adjusted on the basis of properties such as solubility at low temperature, transition temperature, electric reliability, and birefringence.

The amount of the compound represented by General Formula (XIII) is, for example, in the range of 2 to 30 mass % in an embodiment of the present invention, 4 to 30 mass % in another embodiment, 5 to 30 mass % in another embodiment, 7 to 30 mass % in another embodiment, 9 to 30 mass % in another embodiment, 11 to 30 mass % in another embodiment, 13 to 30 mass % in another embodiment, 14 to 30 mass % in another embodiment, 16 to 30 mass % in another embodiment, and 20 to 30 mass % in another embodiment relative to the total mass of the liquid crystal composition of the present invention.

Moreover, the amount of the compound represented by General Formula (XIII) is, for instance, in the range of 2 to 25 mass % in an embodiment of the present invention, 2 to 20 mass % in another embodiment, 2 to 15 mass % in another embodiment, 2 to 10 mass % in another embodiment, and 2 to 5 mass % in another embodiment relative to the total mass of the liquid crystal composition of the present invention.

In the case where the liquid crystal composition of the present invention is used in a liquid crystal display device having a small cell gap, the appropriate amount of the compound represented by General Formula (XIII) is at a higher level. In the case where the liquid crystal composition of the present invention is used in a liquid crystal display device which is driven at a small driving voltage, the appropriate amount of the compound represented by General Formula (XIII) is at a higher level. In the case where the liquid crystal composition of the present invention is used in a liquid crystal display device which is used in a low-temperature environment, the appropriate amount of the compound represented by General Formula (XIII) is at a lower level. In the case where the liquid crystal composition is used in a liquid crystal display device which quickly responds, the appropriate amount of the compound represented by General Formula (XIII) is at a lower level.

The compound represented by General Formula (XIII) is preferably any of compounds represented by General Formula (XIII-1).

[Chem. 150]

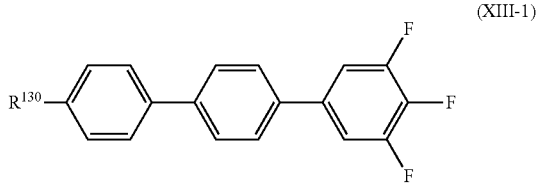

(XIII-1)

In General Formula (XIII-1), $R^{130}$ represents an alkyl group having 1 to 5 carbon atoms, an alkenyl group having 2 to 5 carbon atoms, or an alkoxy group having 1 to 4 carbon atoms.

The amount of the compound represented by General Formula (XIII-1) is preferably in the range of 1 mass % to 25 mass %, also preferably 3 mass % to 25 mass %, also preferably 5 mass % to 20 mass %, and also preferably 10 mass % to 15 mass % relative to the total mass of the liquid crystal composition of the present invention.

The compound represented by General Formula (XIII-1) is preferably at least one compound selected from the group consisting of compounds represented by Formulae (48.1) to (48.4); among these, the compound represented by Formula (48.2) is preferred.

[Chem. 151]

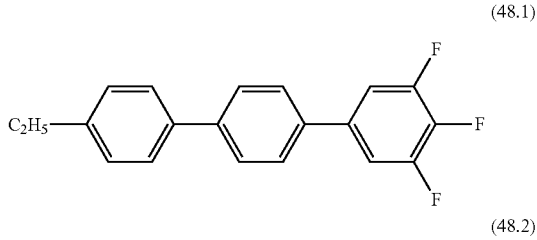

(48.1)

(48.2)

(48.3)

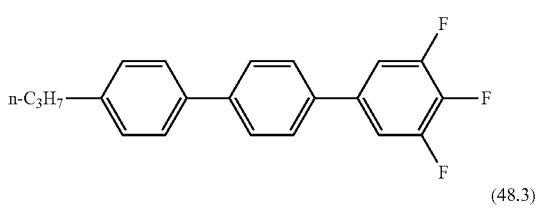

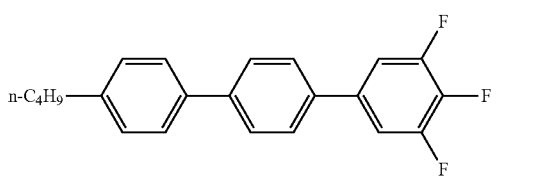

(48.4)

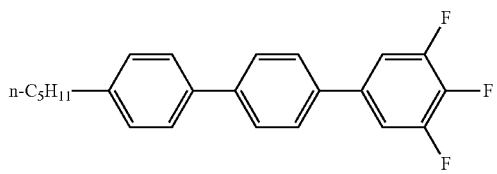

Alternatively or additionally, the compound represented by General Formula (XIII) is preferably any of compounds represented by General Formula (XIII-2).

[Chem. 152]

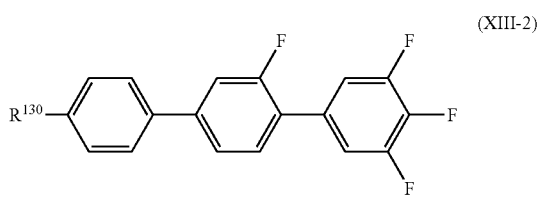

(XIII-2)

In General Formula (XIII-2), $R^{130}$ represents an alkyl group having 1 to 5 carbon atoms, an alkenyl group having 2 to 5 carbon atoms, or an alkoxy group having 1 to 4 carbon atoms.

Such compounds can be used in any combination; at least one of the compounds is preferably used.

The amount of the compound represented by General Formula (XIII-2) is preferably in the range of 1 mass % to 25 mass %, also preferably 1 mass % to 20 mass %, also preferably 1 mass % to 15 mass %, and also preferably 3 mass % to 14 mass % relative to the total mass of the liquid crystal composition of the present invention. In particular, the amount of the compound represented by General Formula (XIII-2) is preferably in the range of 3 mass % to 10 mass %, also preferably 3 mass % to 6 mass %, also preferably 6 mass % to 14 mass %, and also preferably 10 mass % to 14 mass % relative to the total mass of the liquid crystal composition of the present invention.

The compound represented by General Formula (XIII-2) is preferably at least one compound selected from the group consisting of compounds represented by Formulae (49.1) to (49.4); among these, the compound represented by Formula (49.1) and/or the compound represented by Formula (49.2) are preferred.

[Chem. 153]

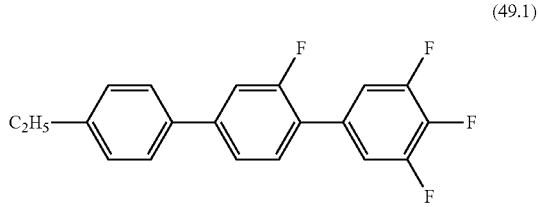

(49.1)

-continued (49.2)
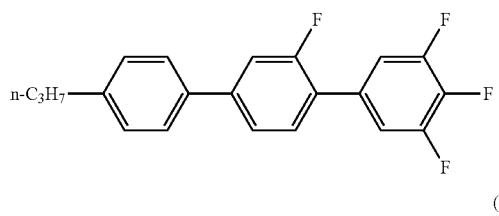

(49.3)
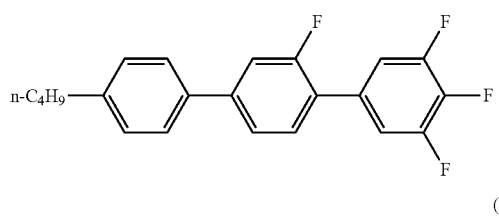

(49.4)
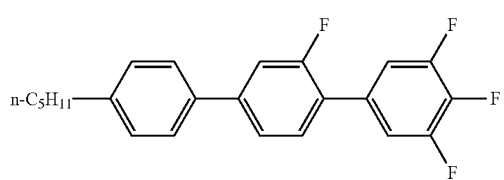

Alternatively or additionally, the compound represented by General Formula (XIII) is preferably any of compounds represented by General Formula (XIII-3).

[Chem. 154]

(XIII-3)
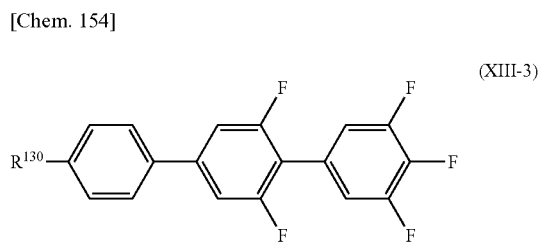

In General Formula (XIII-3), $R^{130}$ represents an alkyl group having 1 to 5 carbon atoms, an alkenyl group having 2 to 5 carbon atoms, or an alkoxy group having 1 to 4 carbon atoms.

Such compounds can be used in any combination; one or two of the compounds are preferably used.

The amount of the compound represented by General Formula (XIII-3) is preferably in the range of 2 mass % to 20 mass %, also preferably 4 mass % to 20 mass %, also preferably 9 mass % to 17 mass %, and also preferably 11 mass % to 14 mass % relative to the total mass of the liquid crystal composition of the present invention.

The compound represented by General Formula (XIII-3) is preferably at least one compound selected from the group consisting of compounds represented by Formulae (50.1) to (50.4); among these, the compound represented by Formula (50.1) and/or the compound represented by Formula (50.2) are preferred.

[Chem. 155]

(50.1)
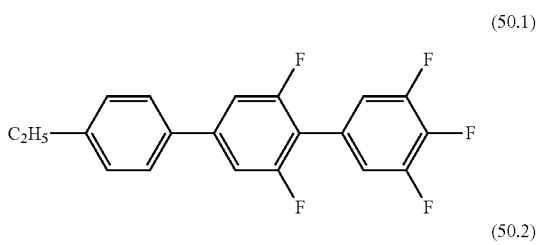

(50.2)
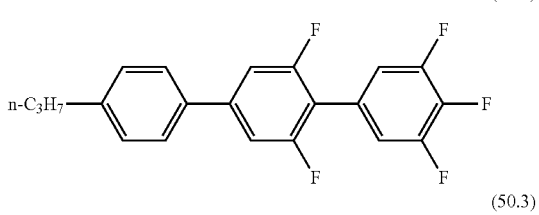

(50.3)
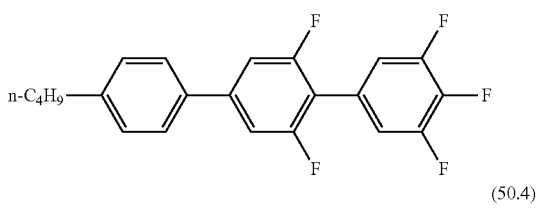

(50.4)
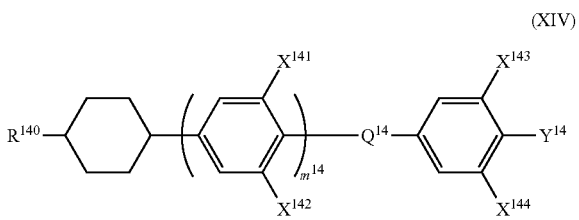

Alternatively or additionally, the compound represented by General Formula (M) is preferably at least one compound selected from the group consisting of compounds represented by General Formula (XIV).

[Chem. 156]

(XIV)

$$R^{140}\text{—}\bigcirc\text{—}\left(\bigcirc\!\!\!\!\!\!\!\!\!\!\!\overset{X^{141}}{\underset{X^{142}}{\phantom{X}}}\right)_{m^{14}}\!\!\!\!\!\!\!\!\!\!\!Q^{14}\text{—}\overset{X^{143}}{\underset{X^{144}}{\phantom{X}}}\text{—}Y^{14}$$

In General Formula (XIV), $R^{140}$ represents an alkyl group having 1 to 7 carbon atoms, an alkenyl group having 2 to 7 carbon atoms, or an alkoxy group having 1 to 7 carbon atoms; $X^{141}$ to $X^{144}$ each independently represent a fluorine atom or a hydrogen atom; $Y^{14}$ represents a fluorine atom, a chlorine atom, or $OCF_2$; $Q^{14}$ represents a single bond, —COO—, or —$CF_2O$—; and $m^{14}$ represents 0 or 1.

Such compounds can be used in any combination; a proper combination of the compounds for an embodiment is determined in view of solubility at low temperature, transition temperature, electric reliability, birefringence, and another property. For example, one of the compounds is used in an embodiment of the present invention, two of the compounds are used in another embodiment of the present invention, three of the compounds are used in another embodiment of the present invention, four of the compounds are used in another embodiment of the present invention, five of the compounds are used in another embodiment of the present invention, and six or more of the compounds are used in another embodiment of the present invention.

The amount of the compound represented by General Formula (XIV) is appropriately adjusted on the basis of properties such as solubility at low temperature, transition temperature, electric reliability, and birefringence.

The amount of the compound represented by General Formula (XIV) is, for example, in the range of 1 to 30 mass % in an embodiment of the present invention, 1 to 25 mass % in another embodiment, 1 to 20 mass % in another embodiment, 1 to 15 mass % in another embodiment, 3 to 30 mass % in another embodiment, 5 to 30 mass % in another embodiment, 7 to 30 mass % in another embodiment, 9 to 30 mass % in another embodiment, 9 to 25 mass % in another embodiment, 9 to 20 mass % in another embodiment, 9 to 15 mass % in another embodiment, and 9 to 11 mass % in another embodiment relative to the total mass of the liquid crystal composition of the present invention.

In the case where the liquid crystal composition of the present invention is used in a liquid crystal display device which is driven at a small driving voltage, the appropriate amount of the compound represented by General Formula (XIV) is at a higher level. In the case where the liquid crystal composition is used in a liquid crystal display device which quickly responds, the appropriate amount of the compound represented by General Formula (XIV) is at a lower level.

The compound represented by General Formula (XIV) is preferably any of compounds represented by General Formula (XIV-1).

[Chem. 157]

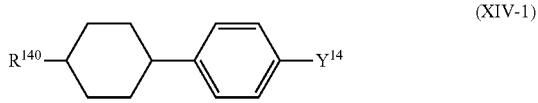

(XIV-1)

In General Formula (XIV-1), $R^{140}$ represents an alkyl group having 1 to 7 carbon atoms, an alkenyl group having 2 to 7 carbon atoms, or an alkoxy group having 1 to 7 carbon atoms; and $Y^{14}$ represents a fluorine atom, a chlorine atom, or $-OCF_3$.

Such compounds can be used in any combination; in view of solubility at low temperature, transition temperature, electric reliability, birefringence, and another property, it is preferred that one to three of the compounds be used.

The compound represented by General Formula (XIV-1) is preferably any of compounds represented by General Formula (XIV-1-1).

[Chem. 158]

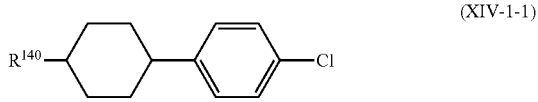

(XIV-1-1)

In General Formula (XIV-1-1), $R^{140}$ represents an alkyl group having 1 to 7 carbon atoms, an alkenyl group having 2 to 7 carbon atoms, or an alkoxy group having 1 to 7 carbon atoms.

The amount of the compound represented by General Formula (XIV-1) is appropriately adjusted on the basis of solubility at low temperature, transition temperature, electric reliability, and another property.

The amount of the compound represented by General Formula (XIV-1) is, for example, in the range of 2 mass % to 30 mass % in an embodiment of the present invention, 4 mass % to 30 mass % in another embodiment, 7 mass % to 30 mass % in another embodiment, 10 mass % to 30 mass % in another embodiment, and 18 mass % to 30 mass % in another embodiment relative to the total mass of the liquid crystal composition of the present invention.

Moreover, the amount of the compound represented by General Formula (XIV-1) is, for instance, in the range of 2 mass % to 27 mass % in an embodiment of the present invention, 2 mass % to 24 mass % in another embodiment, and 2 mass % or more and less than 21 mass % in another embodiment relative to the total mass of the liquid crystal composition of the present invention.

In particular, the compound represented by General Formula (XIV-1-1) is preferably at least one compound selected from the group consisting of compounds represented by Formulae (51.1) to (51.4), and more preferably the compound represented by Formula (51.1).

[Chem. 159]

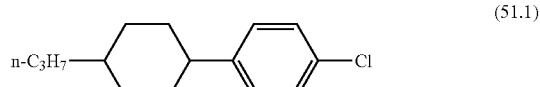

(51.1)

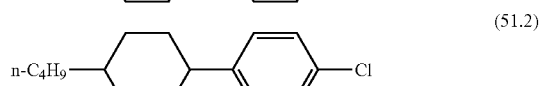

(51.2)

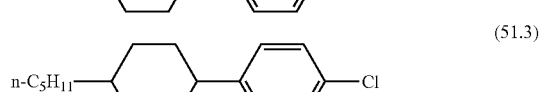

(51.3)

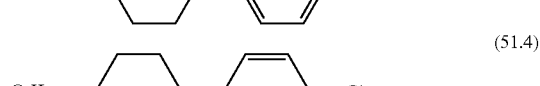

(51.4)

Alternatively or additionally, the compound represented by General Formula (XIV-1) is preferably any of compounds represented by General Formula (XIV-1-2).

[Chem. 160]

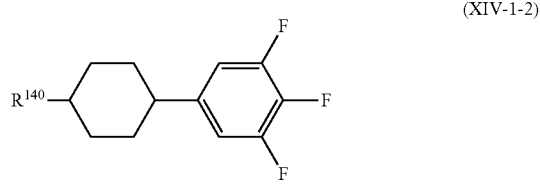

(XIV-1-2)

In General Formula (XIV-1-2), $R^{140}$ represents an alkyl group having 1 to 7 carbon atoms, an alkenyl group having 2 to 7 carbon atoms, or an alkoxy group having 1 to 7 carbon atoms.

The amount of the compound represented by General Formula (XIV-1-2) is preferably in the range of 1 mass % to 15 mass %, also preferably 3 mass % to 13 mass %, also preferably 5 mass % to 11 mass %, and also preferably 7 mass % to 9 mass % relative to the total mass of the liquid crystal composition of the present invention in view of solubility at low temperature, transition temperature, electric reliability, and another property.

In particular, the compound represented by General Formula (XIV-1-2) is preferably at least one compound selected from the group consisting of compounds represented by Formulae (52.1) to (52.4); among these, the compound represented by Formula (52.4) is preferably used.

[Chem. 161]

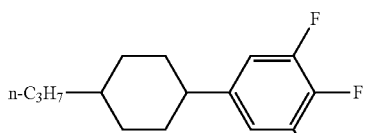
(52.1)

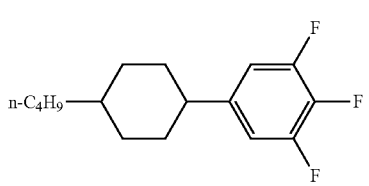
(52.2)

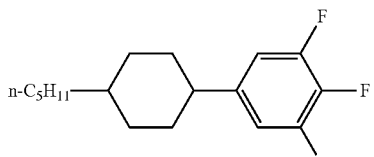
(52.3)

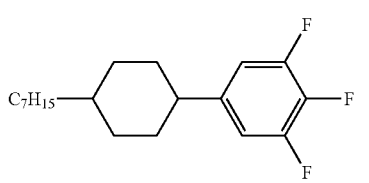
(52.4)

Alternatively or additionally, the compound represented by General Formula (XIV) is preferably any of compounds represented by General Formula (XIV-2).

[Chem. 162]

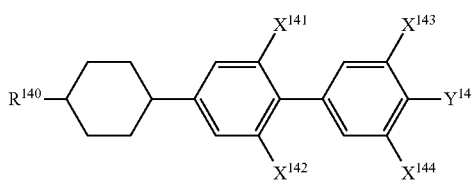
(XIV-2)

In General Formula (XIV-2), $R^{140}$ represents an alkyl group having 1 to 5 carbon atoms, an alkenyl group having 2 to 5 carbon atoms, or an alkoxy group having 1 to 4 carbon atoms; $X^{141}$ to $X^{144}$ each independently represent a fluorine atom or a hydrogen atom; and $Y^{14}$ represents a fluorine atom, a chlorine atom, or —$OCF_3$.

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, three of the compounds are used in another embodiment of the present invention, four of the compounds are used in another embodiment of the present invention, and five or more of the compounds are used in another embodiment of the present invention.

The amount of the compound represented by General Formula (XIV-2) is appropriately adjusted on the basis of properties such as solubility at low temperature, transition temperature, electric reliability, and birefringence.

The amount of the compound represented by General Formula (XIV-2) is, for example, in the range of 3 to 40 mass % in an embodiment of the present invention, 7 to 40 mass % in another embodiment, 8 to 40 mass % in another embodiment, 10 to 40 mass % in another embodiment, 11 to 40 mass % in another embodiment, 12 to 40 mass % in another embodiment, 18 to 40 mass % in another embodiment, 19 to 40 mass % in another embodiment, 21 to 40 mass % in another embodiment, and 22 to 40 mass % in another embodiment relative to the total mass of the liquid crystal composition of the present invention.

Moreover, the amount of the compound represented by General Formula (XIV-2) is, for instance, in the range of 3 to 35 mass % in an embodiment of the present invention, 3 to 25 mass % in another embodiment, 3 to 20 mass % in another embodiment, 3 to 15 mass % in another embodiment, and 3 to 10 mass % in another embodiment relative to the total mass of the liquid crystal composition of the present invention.

In the case where the liquid crystal composition of the present invention is used in a liquid crystal display device which is driven at a small driving voltage, the appropriate amount of the compound represented by General Formula (XIV-2) is at a higher level. In the case where the liquid crystal composition is used in a liquid crystal display device which quickly responds, the appropriate amount of the compound represented by General Formula (XIV-2) is at a lower level.

The compound represented by General Formula (XIV-2) is preferably any of compounds represented by General Formula (XIV-2-1).

[Chem. 163]

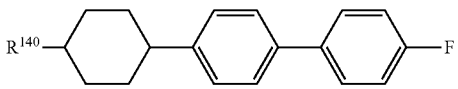
(XIV-2-1)

In General Formula (XIV-2-1), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-1) is preferably in the range of 1 mass % to 15 mass %, also preferably 3 mass % to 13 mass %, also preferably 5 mass % to 11 mass %, and also preferably 7 mass % to 9 mass % relative to the total mass of the liquid crystal composition of the present invention in view of solubility at low temperature, transition temperature, electric reliability, and another property.

In particular, the compound represented by General Formula (XIV-2-1) is preferably at least one compound selected from the group consisting of compounds represented by Formulae (53.1) to (53.4); among these, the compound represented by Formula (53.4) is preferably employed.

[Chem. 164]

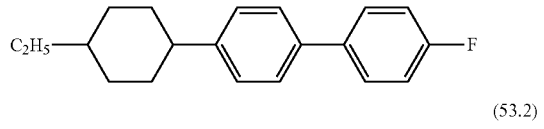

(53.1)

(53.2)

(53.3)

(53.4)

Alternatively or additionally, the compound represented by General Formula (XIV-2) is preferably any of compounds represented by General Formula (XIV-2-2).

[Chem. 165]

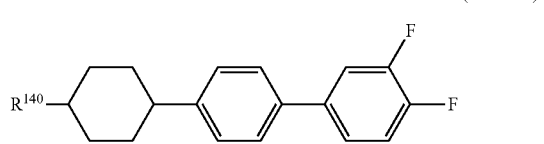

(XIV-2-2)

In General Formula (XIV-2-2), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-2) is preferably in the range of 3 mass % to 20 mass %, also preferably 6 mass % to 17 mass %, also preferably 6 mass % to 15 mass %, and also preferably 8 mass % to 10 mass % relative to the total mass of the liquid crystal composition of the present invention in view of solubility at low temperature, transition temperature, electric reliability, and another property.

In particular, the compound represented by General Formula (XIV-2-2) is preferably at least one compound selected from the group consisting of compounds represented by Formulae (54.1) to (54.4); among these, the compound represented by Formula (54.2) and/or the compound represented by Formula (54.4) are preferably used.

[Chem. 166]

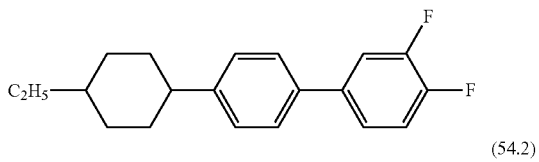

(54.1)

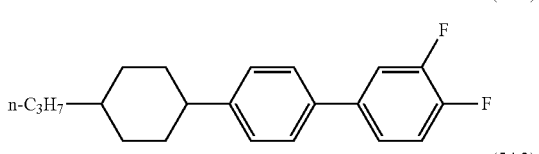

(54.2)

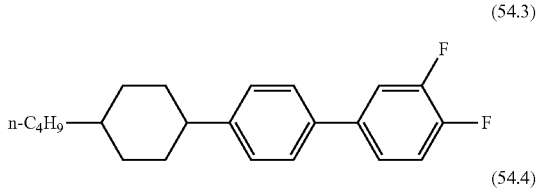

(54.3)

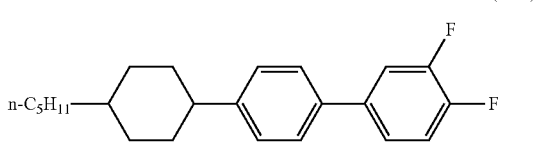

(54.4)

In the liquid crystal composition of the present invention, the amount of the compound represented by Formula (54.2) is preferably in the range of 5 mass % to 35 mass %, also preferably 5 mass % to 25 mass %, also preferably 5 mass % to 22 mass %, also preferably 6 mass % to 20 mass %, also preferably 6 mass % to 15 mass %, and also preferably 6 mass % to 9 mass % relative to the total mass of the liquid crystal composition of the present invention.

Alternatively or additionally, the compound represented by General Formula (XIV-2) is preferably any of compounds represented by General Formula (XIV-2-3).

[Chem. 167]

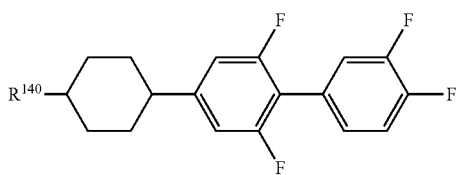

(XIV-2-3)

In General Formula (XIV-2-3), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-3) is preferably in the range of 5 mass % to 30 mass %, also preferably 9 mass % to 27 mass %, also preferably 12 mass % to 24 mass %, and also preferably 12 mass % to 20 mass % relative to the total mass of the liquid crystal composition of the present invention in view of solubility at low temperature, transition temperature, electric reliability, and another property.

In particular, the compound represented by General Formula (XIV-2-3) is preferably at least one compound selected from the group consisting of compounds represented by Formulae (55.1) to (55.4); among these, the compound represented by Formula (55.2) and/or the compound represented by Formula (55.4) are preferably used.

[Chem. 168]

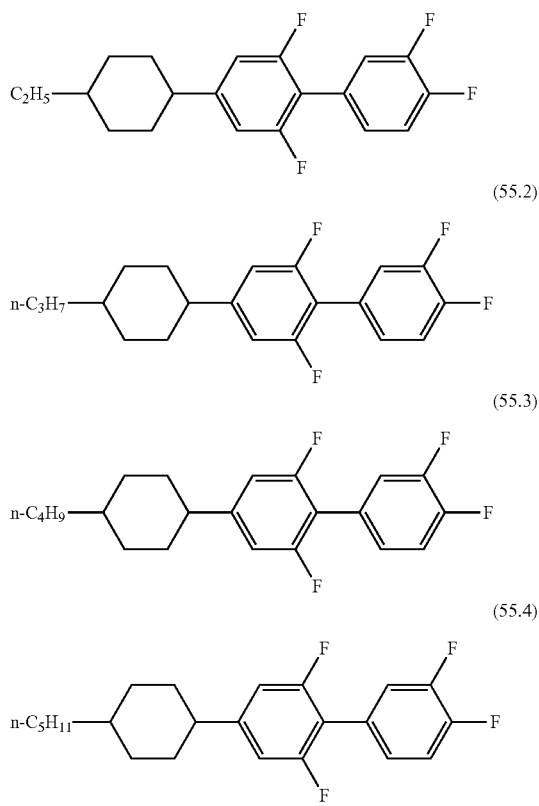

Alternatively or additionally, the compound represented by General Formula (XIV-2) is preferably any of compounds represented by General Formula (XIV-2-4).

[Chem. 169]

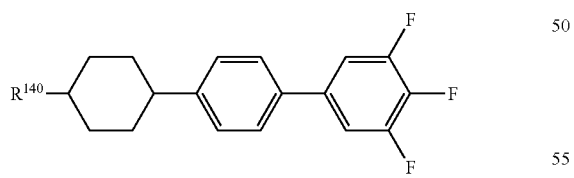

In General Formula (XIV-2-4), $R^{140}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds for an embodiment is determined in view of solubility at low temperature, transition temperature, electric reliability, birefringence, and another property. For example, one of such compounds is used in an embodiment of the present invention, two of the compounds are used in another embodiment of the present invention, and three or more of the compounds are used in another embodiment of the present invention.

The amount of the compound represented by General Formula (XIV-2-4) is adjusted to be appropriate for an embodiment on the basis of properties such as solubility at low temperature, transition temperature, electric reliability, and birefringence.

The amount of the compound represented by General Formula (XIV-2-4) is, for example, in the range of 1 to 20 mass % in an embodiment of the present invention, 1 to 15 mass % in another embodiment, 3 to 15 mass % in another embodiment, 5 to 15 mass % in another embodiment, 7 to 15 mass % in another embodiment, and 9 to 11 mass % in another embodiment relative to the total mass of the liquid crystal composition of the present invention.

In the case where the liquid crystal composition of the present invention is used in a liquid crystal display device which is driven at a small driving voltage, the appropriate amount of the compound represented by General Formula (XIV-2-4) is at a higher level. In the case where the liquid crystal composition is used in a liquid crystal display device which quickly responds, the appropriate amount of the compound represented by General Formula (XIV-2-4) is at a lower level.

In particular, the compound represented by General Formula (XIV-2-4) is preferably at least one compound selected from the group consisting of compounds represented by Formulae (56.1) to (56.4); among these, the compound represented by Formula (56.1), the compound represented by Formula (56.2), and/or the compound represented by Formula (56.4) are preferably used.

[Chem. 170]

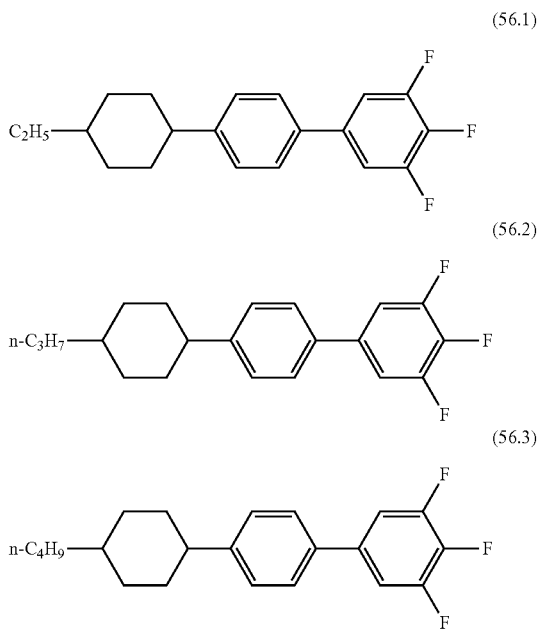

(56.4)

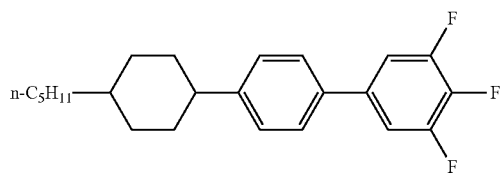

Alternatively or additionally, the compound represented by General Formula (XIV-2) is preferably any of compounds represented by General Formula (XIV-2-5).

[Chem. 171]

(XIV-2-5)

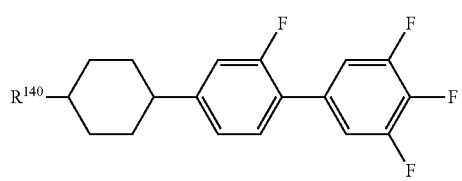

In General Formula (XIV-2-5), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-5) is preferably in the range of 5 mass % to 25 mass %, also preferably 10 mass % to 22 mass %, also preferably 13 mass % to 18 mass %, and also preferably 13 mass % to 15 mass % relative to the total mass of the liquid crystal composition of the present invention in view of solubility at low temperature, transition temperature, electric reliability, and another property.

In particular, the compound represented by General Formula (XIV-2-5) is at least one compound selected from the group consisting of compounds represented by Formulae (57.1) to (57.4). Among these, the compound represented by Formula (57.1) is preferably employed.

[Chem. 172]

(57.1)

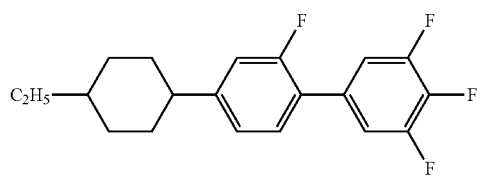

(57.2)

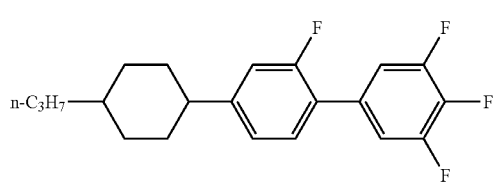

(57.3)

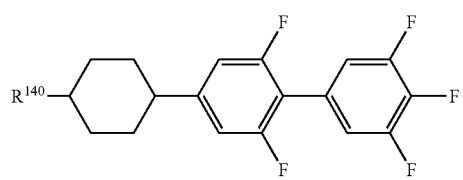

(57.4)

Alternatively or additionally, the compound represented by General Formula (XIV-2) is preferably any of compounds represented by General Formula (XIV-2-6).

[Chem. 173]

(XIV-2-6)

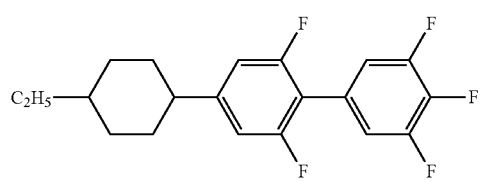

In General Formula (XIV-2-6), $R^{140}$ represents an alkyl group having 1 to 5 carbon atoms, an alkenyl group having 2 to 5 carbon atoms, or an alkoxy group having 1 to 4 carbon atoms.

The amount of the compound represented by General Formula (XIV-2-6) is preferably in the range of 5 mass % to 25 mass %, also preferably 10 mass % to 22 mass %, also preferably 15 mass % to 20 mass %, and also preferably 15 mass % to 17 mass % relative to the total mass of the liquid crystal composition of the present invention in view of solubility at low temperature, transition temperature, electric reliability, and another property.

In particular, the compound represented by General Formula (XIV-2-6) is preferably at least one compound selected from the group consisting of compounds represented by Formulae (58.1) to (58.4); among these, the compound represented by Formula (58.2) is preferably used.

[Chem. 174]

(58.1)

-continued

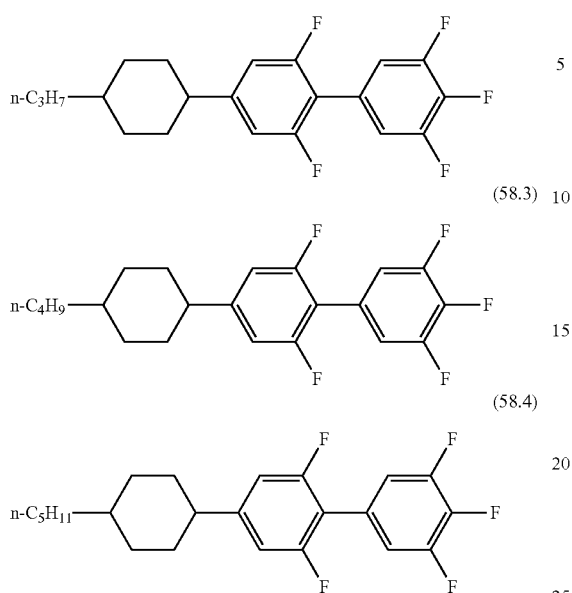

(58.2), (58.3), (58.4)

Alternatively or additionally, the compound represented by General Formula (XIV) is preferably any of compounds represented by General Formula (XIV-3).

[Chem. 175]

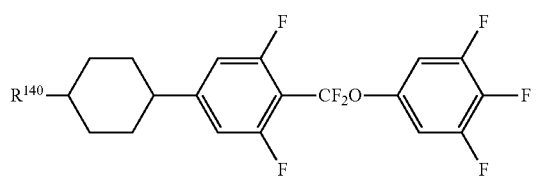

(XIV-3)

In General Formula (XIV-3), $R^{140}$ represents an alkyl group having 1 to 5 carbon atoms, an alkenyl group having 2 to 5 carbon atoms, or an alkoxy group having 1 to 4 carbon atoms.

Such compounds can be used in any combination; a proper combination of the compounds is determined on the basis of the intended properties such as solubility at low temperature, transition temperature, electric reliability, and birefringence. For example, one of such compounds is used in an embodiment of the present invention, and two or more of the compounds are used in another embodiment of the present invention.

The amount of the compound represented by General Formula (XIV-3) is preferably in the range of 2.5 mass % to 25 mass %, also preferably 3 mass % to 15 mass %, and also preferably 3 mass % to 10 mass % relative to the total mass of the liquid crystal composition of the present invention in view of solubility at low temperature, transition temperature, electric reliability, birefringence, and another property.

In particular, the compound represented by General Formula (XIV-3) is preferably at least one compound selected from the group consisting of compounds represented by Formulae (61.1) to (61.4), and more preferably the compound represented by Formula (61.1) and/or the compound represented by Formula (61.2).

[Chem. 176]

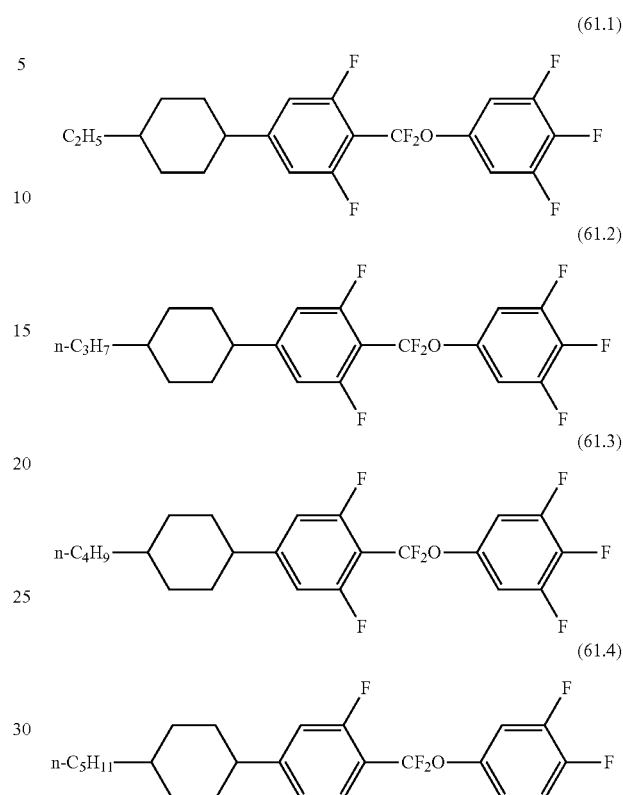

(61.1), (61.2), (61.3), (61.4)

Alternatively or additionally, the compound represented by General Formula (M) is preferably any of compounds represented by General Formula (XV).

[Chem. 177]

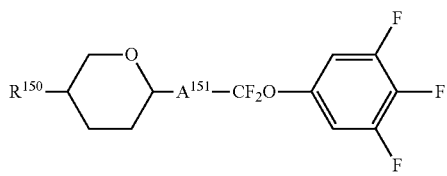

(XV)

In General Formula (XV), $R^{150}$ represents an alkyl group having 1 to 5 carbon atoms, an alkenyl group having 2 to 5 carbon atoms, or an alkoxy group having 1 to 4 carbon atoms; and $A^{151}$ represents a 1,4-cyclohexylene group or a 1,4-phenylene group, and a hydrogen atom of the 1,4-phenylene group is optionally substituted with a fluorine atom.

Such compounds can be used in any combination; a proper combination of the compounds is determined in view of solubility at low temperature, transition temperature, electric reliability, birefringence, and another property. For instance, one of such compounds is used in an embodiment of the present invention, two of the compounds are used in another embodiment of the present invention, three of the compounds are used in another embodiment, four of the compounds are used in another embodiment, and five or more of the compounds are used in another embodiment.

The amount of the compound represented by General Formula (XV) is adjusted to be appropriate for an embodiment on the basis of properties such as solubility at low temperature, transition temperature, electric reliability, and birefringence. The amount of the compound represented by General Formula (XV) is, for example, in the range of 0.5 to 30 mass % in an embodiment of the present invention, 1 to 30 mass % in another embodiment, 3 to 30 mass % in another embodiment, 6 to 30 mass % in another embodiment, 9 to 30 mass % in another embodiment, 11 to 30 mass % in another embodiment, 12 to 30 mass % in another embodiment, 18 to 30 mass % in another embodiment, 19 to 30 mass % in another embodiment, 23 to 30 mass % in another embodiment, and 25 to 30 mass % in another embodiment relative to the total mass of the liquid crystal composition of the present invention.

Furthermore, the amount of the compound represented by General Formula (XV) is, for instance, in the range of 0.5 to 25 mass % in an embodiment of the present invention, 0.5 to 20 mass % in another embodiment, 0.5 to 13 mass % in another embodiment, 0.5 to 9 mass % in another embodiment, and 1 to 6 mass % in another embodiment relative to the total mass of the liquid crystal composition of the present invention.

The compound represented by General Formula (XV), which is used in the liquid crystal composition of the present invention, is preferably any of compounds represented by General Formula (XV-1).

[Chem. 178]

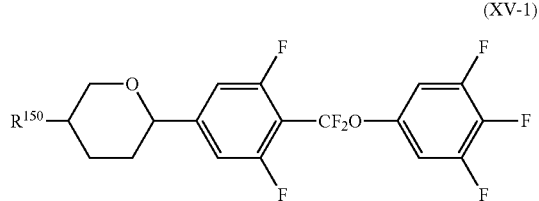

(XV-1)

In General Formula (XV-1), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (XV-1) is appropriately adjusted on the basis of properties such as solubility at low temperature, transition temperature, electric reliability, and birefringence.

The amount of the compound represented by General Formula (XV-1) is, for example, in the range of 1 to 25 mass % in an embodiment of the present invention, 1 to 20 mass % in another embodiment, 1 to 10 mass % in another embodiment, 3 to 10 mass % in another embodiment, 4 to 7 mass % in another embodiment, 1 to 5 mass % in another embodiment, and 5 to 10 mass % in another embodiment relative to the total mass of the liquid crystal composition of the present invention.

In particular, the compound represented by General Formula (XV-1), which is used in the liquid crystal composition of the present invention, is preferably at least one compound selected from the group consisting of compounds represented by Formulae (59.1) to (59.4), and more preferably the compound represented by Formula (59.2).

[Chem. 179]

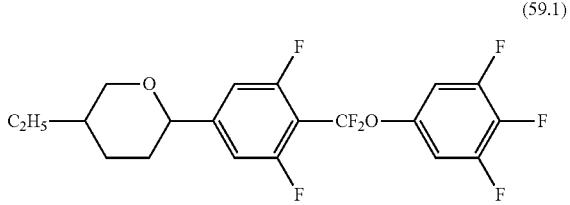

(59.1)

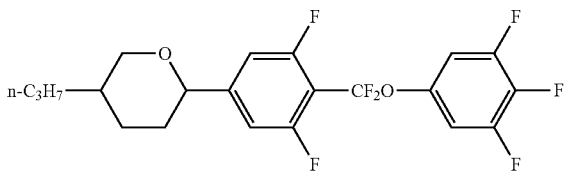

(59.2)

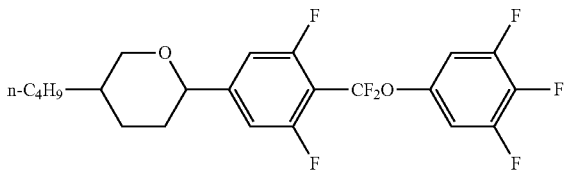

(59.3)

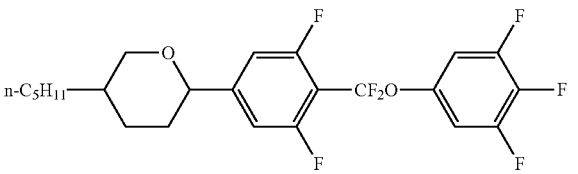

(59.4)

Alternatively or additionally, the compound represented by General Formula (XV) is preferably any of compounds represented by General Formula (XV-2).

[Chem. 180]

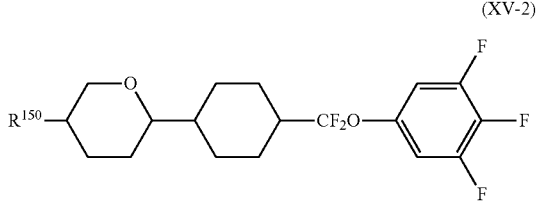

(XV-2)

In General Formula (XV-2), $R^{150}$ represents an alkyl group having 1 to 5 carbon atoms, an alkenyl group having 2 to 5 carbon atoms, or an alkoxy group having 1 to 4 carbon atoms.

Such compounds can be used in any combination; in view of solubility at low temperature, transition temperature, electric reliability, birefringence, and another property, the compounds are preferably used alone or in combination.

The amount of the compound represented by General Formula (XV-2) is appropriately adjusted on the basis of properties such as solubility at low temperature, transition temperature, electric reliability, and birefringence.

The amount of the compound represented by General Formula (XV-2) is, for instance, preferably in the range of 0.5 mass % to 20 mass %, also preferably 1 mass % to 15 mass %, also preferably 1 mass % to 10 mass %, and also preferably 1 mass % to 4 mass % relative to the total mass of the liquid crystal composition of the present invention in view of solubility at low temperature, transition temperature, electric reliability, birefringence, and another property.

In particular, the compound represented by General Formula (XV-2), which is used in the liquid crystal composition of the present invention, is preferably at least one compound selected from the group consisting of compounds represented by Formulae (60.1) to (60.4), and more preferably the compound represented by Formula (60.2).

[Chem. 181]

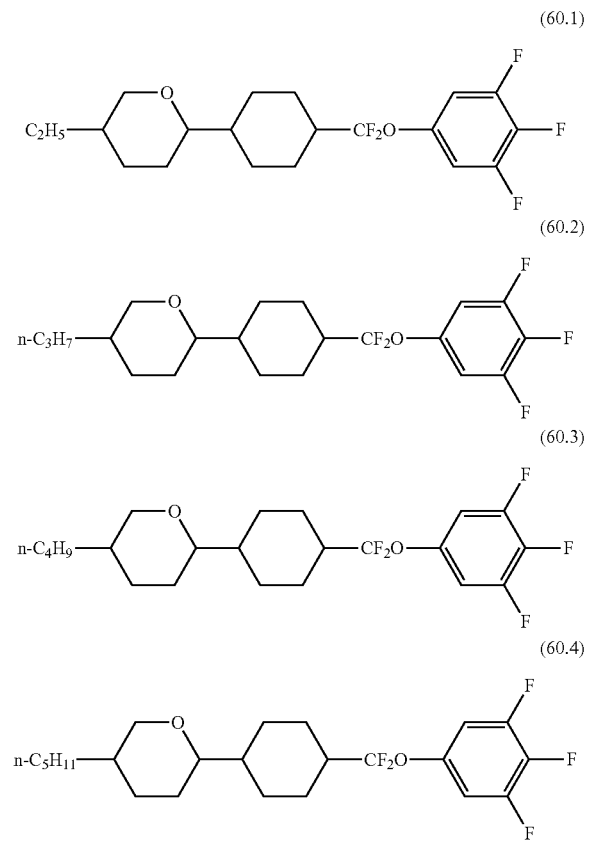

The liquid crystal composition of the present invention is preferably free from a compound having a molecular structure in which oxygen atoms are bonded to each other, such as the structure of a peroxy acid (—CO—OO—).

In terms of the reliability and long-term stability of the liquid crystal composition, the amount of a compound having a carbonyl group is preferably not more than 5 mass %, more preferably not more than 3 mass %, and further preferably not more than 1 mass % relative to the total mass of the composition. It is most preferred that the composition be substantially free from such a compound.

In terms of stability to irradiation with UV, the amount of a compound substituted with a chlorine atom is preferably not more than 15 mass %, more preferably not more than 10 mass %, and further preferably not more than 5 mass % relative to the total mass of the composition. It is most preferred that the composition be substantially free from such a compound.

The amount of compounds having molecules in which all of the ring structures are six-membered rings is preferably adjusted to be large. The amount of such compounds having molecules in which all of the ring structures are six-membered rings is preferably not less than 80 mass %, more preferably not less than 90 mass %, and further preferably not less than 95 mass % relative to the total mass of the composition. It is most preferred that the liquid crystal composition be substantially composed of only the compounds having molecules in which all of the ring structures are six-membered rings.

In order to suppress degradation of the liquid crystal composition due to oxidation thereof, the amount of a compound having a cyclohexenylene group that is a ring structure is preferably reduced. The amount of a compound having a cyclohexenylene group is preferably not more than 10 mass %, and more preferably not more than 5 mass % relative to the total mass of the composition. It is further preferred that the liquid crystal composition be substantially free from such a compound.

In terms of improvements in viscosity and Tni, the amount of a compound of which the molecules each contain a 2-methylbenzene-1,4-diyl group in which a hydrogen atom is optionally substituted with a halogen is preferably reduced. The amount of the compound of which the molecules each contain such a 2-methylbenzene-1,4-diyl group is preferably not more than 10 mass %, and more preferably not more than 5 mass % relative to the total mass of the composition. It is further preferred that the composition be substantially free from such a compound.

In the case where a compound contained in the composition of the first embodiment of the present invention has a side chain that is an alkenyl group, the alkenyl group preferably has 2 to 5 carbon atoms if the alkenyl group is bonded to cyclohexane, or the alkenyl group preferably has 4 or 5 carbon atoms if the alkenyl group is bonded to benzene. The unsaturated bond of the alkenyl group is preferably not directly connected to the benzene.

The liquid crystal composition of the present invention can contain a polymerizable compound for production of a liquid crystal display device of a PS mode, a PSA mode involving use of a horizontal electric field, or a PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which multiple six-membered rings are bonded to each other, such as biphenyl derivatives and terphenyl derivatives. Specifically, the polymerizable compound is preferably any of difunctional monomers represented by General Formula (XX).

[Chem. 182]

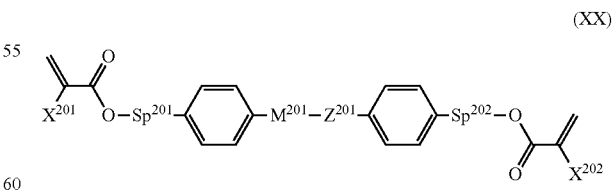

In General Formula (XX), $X^{201}$ and $X^{202}$ each independently represent a hydrogen atom or a methyl group;

$Sp^{201}$ and $Sp^{202}$ each independently represent a single bond, an alkylene group having 1 to 8 carbon atoms, or —O—$(CH_2)_s$— (where s represents an integer from 2 to 7, and the oxygen atom is bonded to an aromatic ring);

$Z^{201}$ represents —OCH$_2$—, —CH$_2$—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where Y$^1$ and Y$^2$ each independently represent a fluorine atom or a hydrogen atom), —C≡C—, or a single bond; and $M^{201}$ represents a 1,4-phenylene group, a trans-1,4-cyclohexylene group, or a single bond, and in each 1,4-phenylene group in the formula, any hydrogen atom is optionally substituted with a fluorine atom.

Diacrylate derivatives in which $X^{201}$ and $X^{202}$ each represent a hydrogen atom and dimethacrylate derivatives in which $X^{201}$ and $X^{202}$ are each a methyl group are preferred, and compounds in which one of $X^{201}$ and $X^{202}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^{201}$ and $Sp^{202}$ each independently represent a single bond, an alkylene group having 1 to 8 carbon atoms, or —O—(CH$_2$)$_s$—; in an application to PSA display devices, at least one of $Sp^{201}$ and $Sp^{202}$ is preferably a single bond, and compounds in which $Sp^{201}$ and $Sp^{202}$ each represent a single bond and compounds in which one of $Sp^{201}$ and $Sp^{202}$ is a single bond and in which the other one thereof represents an alkylene group having 1 to 8 carbon atoms or —O—(CH$_2$)$_s$— are preferred. In this case, an alkyl group having 1 to 4 carbon atoms is preferably employed, and s preferably ranges from 1 to 4.

$Z^{201}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond; more preferably —COO—, —OCO—, or a single bond; and especially preferably a single bond.

$M^{201}$ represents a 1,4-phenylene group in which any hydrogen atom is optionally substituted with a fluorine atom, a trans-1,4-cyclohexylene group, or a single bond; and a 1,4-phenylene group and a single bond are preferred. In the case where $M^{201}$ does not represent a single bond but represents a ring structure, $Z^{201}$ preferably does not represent a single bond but represents a linking group; in the case where $M^{201}$ represents a single bond, $Z^{201}$ is preferably a single bond.

From these viewpoints, a preferred ring structure between $Sp^{201}$ and $Sp^{202}$ in General Formula (XX) is particularly as follows.

In General Formula (XX), in the case where $M^{201}$ represents a single bond and where the ring structure consists of two rings, the ring structure is preferably represented by any of Formulae (XXa-1) to (XXa-5), more preferably Formulae (XXa-1) to (XXa-3), and especially preferably Formula (XXa-1).

[Chem. 183]

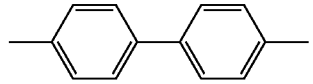

(XXa-1)

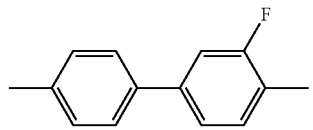

(XXa-2)

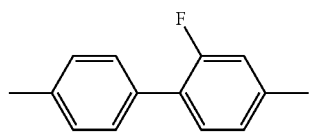

(XXa-3)

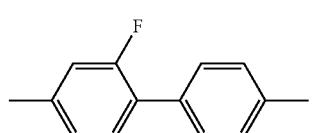

(XXa-4)

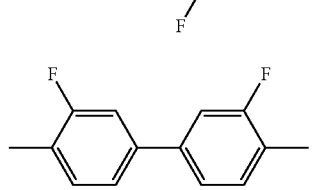

(XXa-5)

In Formulae (XXa-1) to (XXa-5), the two ends of each structure are connected to $Sp^{201}$ and $Sp^{202}$, respectively.

Since polymerizable compounds having such skeletons have an optimum alignment regulating force for PSA liquid crystal display devices after being polymerized and thus produce a good alignment state, such polymerizable compounds enable uneven display to be reduced or eliminated.

Accordingly, the polymerizable monomer is preferably at least one compound selected from the group consisting of compounds represented by General Formulae (XX-1) to (XX-4), and more preferably the compound represented by General Formula (XX-2).

[Chem. 184]

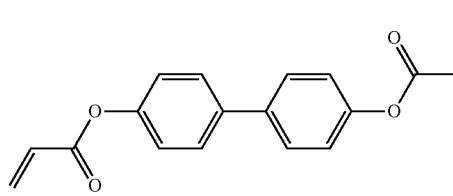

(XX-1)

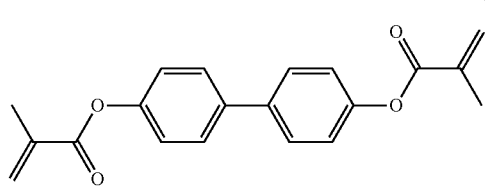

(XX-2)

-continued (XX-3)

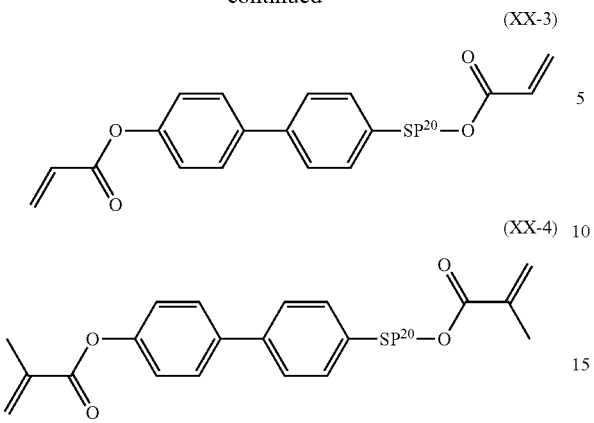

(XX-4)

In General Formulae (XX-3) and (XX-4), $Sp^{20}$ represents an alkylene group having 2 to 5 carbon atoms.

In the case where the monomer is added to the liquid crystal composition of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

The liquid crystal composition of the present invention can further contain any of compounds represented by General Formula (Q).

[Chem. 185]

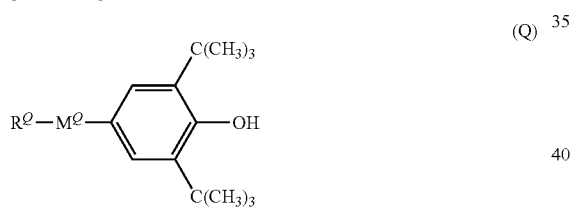

(Q)

In General Formula (Q), $R^Q$ represents a linear or branched alkyl group having 1 to 22 carbon atoms; at least one $CH_2$ moiety contained in the alkyl group is optionally substituted with —O—, —CH=CH—, —CO—, —OCO—, —COO—, —C≡C—, —CF$_2$O—, or —OCF$_2$— such that oxygen atoms do not directly adjoin each other; and $M^Q$ represents a trans-1,4-cyclohexylene group, a 1,4-phenylene group, or a single bond.

$R^Q$ represents a linear or branched alkyl group having 1 to 22 carbon atoms, and at least one $CH_2$ moiety contained in the alkyl group is optionally substituted with —O—, —CH=CH—, —CO—, —OCO—, —COO—, —C≡C—, —CF$_2$O—, or —OCF$_2$— such that oxygen atoms do not directly adjoin each other. $R^Q$ is preferably a linear alkyl group, a linear alkoxy group, a linear alkyl group of which one $CH_2$ moiety is substituted with —OCO— or —COO—, a branched alkyl group, a branched alkoxy group, or a branched alkyl group of which one $CH_2$ moiety is substituted with —OCO— or —COO—, each group having 1 to 20 carbon atoms; and more preferably a linear alkyl group, a linear alkyl group of which one $CH_2$ moiety is substituted with —OCO— or —COO—, a branched alkyl group, a branched alkoxy group, or a branched alkyl group of which one $CH_2$ moiety is substituted with —OCO— or —COO—, each group having 1 to 10 carbon atoms.

$M^Q$ represents a trans-1,4-cyclohexylene group, a 1,4-phenylene group, or a single bond and is preferably a trans-1,4-cyclohexylene group or a 1,4-phenylene group.

The compound represented by General Formula (Q) is preferably at least one compound selected from the group consisting of compounds represented by General Formulae (Q-a) to (Q-d), and more preferably the compound represented by General Formula (Q-c) and/or the compound represented by General Formula (Q-d).

[Chem. 186]

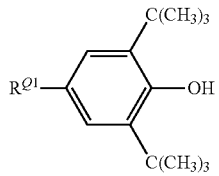

(Q-a)

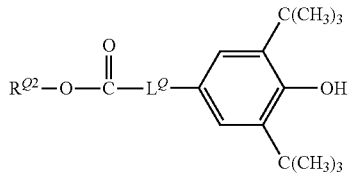

(Q-b)

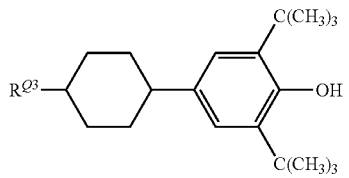

(Q-c)

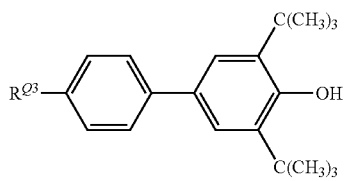

(Q-d)

In these formulae, $R^{Q1}$ is preferably a linear or branched alkyl group having 1 to 10 carbon atoms, $R^{Q2}$ is preferably a linear or branched alkyl group having 1 to 20 carbon atoms, $R^{Q3}$ is preferably a linear or branched alkyl or alkoxy group having 1 to 8 carbon atoms, and $L^Q$ is preferably a linear or branched alkylene group having 1 to 8 carbon atoms.

The liquid crystal composition of the present invention preferably contains one or two compounds represented by General Formula (Q), and more preferably one to five; the amount thereof is preferably in the range of 0.001 to 1 mass %, also preferably 0.001 to 0.1 mass %, and also preferably 0.001 to 0.05 mass % relative to the total mass of the liquid crystal composition of the present invention.

A preferred embodiment in which one compound represented by General Formula (ii) is used will now be described.

In an embodiment of the liquid crystal composition of the present invention in which only one type of compounds represented by General Formula (ii) is used, a compound in which both $R^{ii1}$ and $R^{ii2}$ in General Formula (ii) are alkyl groups is preferred; in particular, the compound represented by Formula (ii.1.1) or the compound represented by Formula (ii.1.2) is preferred.

In this embodiment, the amount of the compound represented by Formula (ii.1.1) or the compound represented by Formula (ii.1.2) is preferably in the range of 1 to 7 mass %, and more preferably 3 to 5 mass % relative to the total mass of the liquid crystal composition.

In the liquid crystal composition of the present invention, in the case where the compound represented by General Formula (i) is used in combination with the compound represented by Formula (ii.1.1) or the compound represented by Formula (ii.1.2), the liquid crystal composition preferably further contains any of compounds represented by General Formula (IX-2).

The amount of the compound represented by General Formula (IX-2) is preferably in the range of 10 to 50 mass %, more preferably 20 to 40 mass %, and further preferably 25 to 35 mass % relative to the total mass of the liquid crystal composition.

The compound represented by General Formula (IX-2) is preferably any of compounds represented by General Formula (IX-2-5).

The compound represented by General Formula (IX-2-5) is preferably the compound represented by Formula (34.2), the compound represented by Formula (34.3), and/or the compound represented by Formula (34.5).

The amount of the compound represented by Formula (34.2) is preferably in the range of 9 to 20 mass %, more preferably 9 to 15 mass %, and further preferably 9 to 12 mass % relative to the total mass of the liquid crystal composition.

The amount of the compound represented by Formula (34.3) is preferably in the range of 10 to 20 mass %, more preferably 12 to 18 mass %, and further preferably 14 to 16 mass % relative to the total mass of the liquid crystal composition.

The amount of the compound represented by Formula (34.5) is preferably in the range of 1 to 15 mass %, more preferably 2 to 10 mass %, and further preferably 3 to 7 mass % relative to the total mass of the liquid crystal composition.

The total amount of the compounds represented by Formulae (34.2), (34.3), and (34.5) is preferably from 80 to 100 mass %, more preferably 90 to 100 mass %, and further preferably 95 to 100 mass % relative to the total mass of all of the compounds represented by General Formula (IX-2) in the liquid crystal composition of the present invention.

Furthermore, the liquid crystal composition preferably contains any of compounds represented by General Formula (XIV-2-2). The compound represented by General Formula (XIV-2-2) is preferably the compound represented by Formula (54.2).

The amount of the compound represented by Formula (54.2) is preferably in the range of 4 to 20 mass %, and more preferably 6 to 15 mass % relative to the total mass of the liquid crystal composition.

Alternatively or additionally, the liquid crystal composition preferably further contains any of compounds represented by General Formula (II-3-1) and/or any of compounds represented by General Formula (III-2).

The compound represented by General Formula (II-3-1) is preferably the compound represented by Formula (13.3), and the compound represented by General Formula (III-2) is preferably the compound represented by Formula (17.3).

The total amount of the compound represented by Formula (13.3) and/or the compound represented by Formula (17.3) is preferably in the range of 1 to 10 mass %, and more preferably 2 to 7 mass % relative to the total mass of the liquid crystal composition.

The preferred composition of the above-mentioned embodiment has all of the following properties: being less likely to cause screen burn-in and droplet stains, greatly reducing contamination of manufacturing equipment, and having very high process adaptability and very good solubility at low temperature. Hence, it is an excellent liquid crystal composition having very well balanced properties. In particular, the composition has an excellent balance between process adaptability and solubility at low temperature.

In another embodiment of the liquid crystal composition of the present invention in which only one type of compounds represented by General Formula (ii) is used, it is preferred that one of $R^{ii1}$ and $R^{ii2}$ in General Formula (ii) be an alkenyl group and that the other one of them be an alkyl group; in particular, the compound represented by Formula (ii.2.3) or the compound represented by Formula (ii.2.4) is preferred.

In this embodiment, the amount of the compound represented by Formula (ii.2.3) or the compound represented by Formula (ii.2.4) is preferably in the range of 1 to 20 mass %, more preferably 5 to 15 mass %, and further preferably 8 to 13 mass % relative to the total mass of the liquid crystal composition.

In the liquid crystal composition of the present invention, in the case where the compound represented by General Formula (i) is used in combination with the compound represented by Formula (ii.2.3) or the compound represented by Formula (ii.2.4), the liquid crystal composition preferably further contains any of compounds represented by General Formula (IX-2).

The compound represented by General Formula (IX-2) is preferably any of compounds represented by General Formula (IX-2-2), and more preferably the compound represented by Formula (31.2) or the compound represented by Formula (31.4).

In this embodiment, the amount of the compound represented by Formula (31.2) or (31.4) is preferably in the range of 1 to 10 mass %, and more preferably 1 to 8 mass % relative to the total mass of the liquid crystal composition.

The total amount of compounds represented by General Formula (IX-2-2) is preferably in the range of 5 to 15 mass %, more preferably 7 to 12 mass %, and further preferably 8 to 10 mass % relative to the total mass of the liquid crystal composition.

In this embodiment, the liquid crystal composition preferably further contains any of compounds represented by General Formula (XI).

The compound represented by General Formula (XI) is preferably any of compounds represented by General Formula (XI-1), and it is preferred that at least two compounds represented by General Formula (XI-1) be used.

The amount of the compound represented by General Formula (XI-1) is preferably in the range of 1 to 10 mass %, more preferably 1 to 8 mass %, and further preferably 1 to 6 mass % relative to the total mass of the liquid crystal composition.

In the case where two compounds represented by General Formula (XI-1) are used, it is preferred that the compound represented by Formula (45.2) and the compound represented by Formula (45.3) be used in amounts of 1 to 2 mass % and 1 to 4 mass % relative to the total mass of the liquid crystal composition, respectively.

In this embodiment, the liquid crystal composition preferably further contains any of compounds represented by General Formula (X-6), and more preferably at least two compounds represented by General Formula (X-6).

The amount of the compound represented by General Formula (X-6) is preferably in the range of 1 to 12 mass %, more preferably 1 to 9 mass %, and further preferably 5 to 9 mass % relative to the total mass of the liquid crystal composition.

In the case where two compounds represented by General Formula (X-6) are used, it is preferred that the compound represented by Formula (44.1) and the compound represented by Formula (44.2) be used in combination; and the amount of each compound is preferably in the range of 1 to 5 mass %, and more preferably 2 to 4 mass % relative to the total mass of the liquid crystal composition.

Each of the compounds represented by General Formulae (XI-1) and (X-6) is a compound having four ring structures per molecule; the total amount of these compounds is preferably in the range of 5 to 20 mass %, and more preferably 10 to 15 mass % relative to the total mass of the liquid crystal composition. The total amount of the compounds represented by General Formulae (XI-1) and (X-6) is preferably in the range of 85 to 100 mass %, more preferably 90 to 100 mass %, and further preferably 95 to 100 mass % relative to the total mass of all of the compounds having four ring structures per molecule in the liquid crystal composition.

The preferred composition of the above-mentioned embodiment has all of the following properties: being less likely to cause screen burn-in and droplet stains, greatly reducing contamination of manufacturing equipment, and having very high process adaptability and very good solubility at low temperature. Hence, it is an excellent liquid crystal composition having very well balanced properties. In particular, the composition has an excellent balance between the degree of process adaptability and a reduction in screen burn-in.

A preferred embodiment in which two compounds represented by General Formula (ii) are used will now be described.

In an embodiment of the liquid crystal composition of the present invention in which two compounds represented by General Formula (ii) are used, compounds represented by General Formula (ii) in which each of $R^{ii1}$ and $R^{ii2}$ is an alkyl group are preferably used.

In an embodiment in which two compounds represented by General Formula (ii) are the compound represented by Formula (ii.1.1) or (ii.1.2) and the compound represented by Formula (ii.1.4) or (ii.1.5), the amount of the compound represented by Formula (ii.1.1) or (ii.1.2) is from 1 to 7 mass %, and more preferably 2 to 6 mass %; and the amount of the compound represented by Formula (ii.1.4) or (ii.1.5) is preferably from 1 to 5 mass %, and more preferably 2 to 4 mass %, relative to the total mass of the liquid crystal composition. The total amount of the two compounds represented by General Formula (ii) is preferably in the range of 5 to 15 mass %, and more preferably 8 to 11 mass % relative to the total mass of the liquid crystal composition.

In this embodiment, the liquid crystal composition preferably further contains at least two of compounds represented by General Formula (I-1-1), compounds represented by General Formula (I-1-2), and/or compounds represented by General Formula (II-2); and more preferably at least three of them.

In this embodiment, a preferred compound represented by General Formula (II-2) is the compound represented by Formula (11.1); the amount thereof is preferably from 6 to 10 mass %, and more preferably 6 to 8 mass % relative to the total mass of the liquid crystal composition.

A preferred compound represented by General Formula (I-1-1) is the compound represented by Formula (1.3); the amount thereof is preferably from 1 to 6 mass %, more preferably 1 to 5 mass %, and further preferably 1 to 3 mass % relative to the total mass of the liquid crystal composition.

A preferred compound represented by General Formula (I-1-2) is the compound represented by Formula (2.2); the amount thereof is preferably from 1 to 25 mass %, more preferably 5 to 20 mass %, further preferably 10 to 20 mass %, and especially preferably 13 to 18 mass % relative to the total mass of the liquid crystal composition.

In the case where three compounds represented by General Formulae (I-1-1), (I-1-2), and (II-2) are used, the total amount thereof is preferably in the range of 15 to 35 mass %, more preferably 20 to 30 mass %, and further preferably 22 to 27 mass % relative to the total mass of the liquid crystal composition.

The amount of the compounds represented by Formulae (11.1), (1.3), and (2.2) is preferably in the range of 85 to 100 mass %, more preferably 90 to 100 mass %, and further preferably 95 to 100 mass % relative to the total mass of all of the compounds represented by General Formulae (I-1-1), (I-1-2), and (II-2) in the liquid crystal composition of the embodiment.

The preferred composition of the above-mentioned embodiment has all of the following properties: being less likely to cause screen burn-in and droplet stains, greatly reducing contamination of manufacturing equipment, and having very high process adaptability and very good solubility at low temperature. Hence, it is an excellent liquid crystal composition having very well balanced properties. In particular, the composition has an excellent balance between the degree of process adaptability and a reduction in screen burn-in.

In another embodiment in which the two compounds represented by General Formula (ii) are the compound represented by Formula (ii.1.1) or (ii.1.2) and the compound represented by Formula (ii.1.6) or (ii.1.7), the amount of the compound represented by Formula (ii.1.1) or (ii.1.2) is preferably in the range of 7 to 20 mass %, more preferably 9 to 13 mass %; and the amount of the compound represented by Formula (ii.1.4) or (ii.1.5) is preferably in the range of 4 to 20 mass %, and more preferably 10 to 18 mass %, relative to the total mass of the liquid crystal composition. The total amount of the two compounds represented by General Formula (ii) is preferably from 15 to 30 mass %, and more preferably 20 to 30 mass % relative to the total mass of the liquid crystal composition.

The liquid crystal composition of this embodiment preferably further contains any of compounds represented by General Formula (VIII).

The amount of the compound represented by General Formula (VIII) is preferably in the range of 1 to 19 mass %, more preferably 5 to 15 mass %, and further preferably 8 to 13 mass % relative to the total mass of the liquid crystal composition.

The compound represented by General Formula (VIII) is preferably any of compounds represented by General Formula (VIII-1); in particular, the compound represented by Formula (26.1) or (26.2) is preferred, and the compound represented by Formula (26.2) is more preferred.

The liquid crystal composition of this embodiment preferably further contains at least two of the compound represented by Formula (2.5), compounds represented by General Formula (I-1-2), and/or compounds represented by General Formula (II-2); and more preferably at least three of them.

In particular, relative to the total mass of the liquid crystal composition, the amount of the compound represented by Formula (2.5) is preferably from 1 to 30 mass %, and more preferably 20 to 30 mass %; the amount of the compound represented by Formula (2.2) is preferably from 1 to 25 mass %, more preferably 10 to 20 mass %, and further preferably 12 to 18 mass %; and the amount of the compound represented by Formula (11.1) is preferably from 6 to 25 mass %, more preferably 10 to 20 mass %, and further preferably 12 to 17 mass %.

In an embodiment in which at least two of compounds represented by General Formula (I-1-2) and compounds represented by General Formula (II-2) are used, the total amount of the compound represented by Formula (2.2) and the compound represented by Formula (11.1) is preferably in the range of 80 to 100 mass %, more preferably 90 to 100 mass %, and further preferably 95 to 100 mass % relative to the total mass of all of the compounds represented by General Formulae (I-1-2) and (II-2).

The liquid crystal composition of this embodiment preferably further contains any of compounds represented by General Formula (V-2).

In General Formula (V-2), it is preferred that $R^{51}$ or $R^{52}$ be an alkyl group having 2 to 5 carbon atoms, it is more preferred that it be an alkyl group having 2 or 5 carbon atoms, and it is further preferred that $R^{51}$ and $R^{52}$ have difference in the number of carbon atoms.

In General Formula (V-2), it is preferred that one of $X^{51}$ and $X^{52}$ be a fluorine atom and that the other one of them be a hydrogen atom.

The especially preferred composition of the above-mentioned embodiment has all of the following properties: being less likely to cause screen burn-in and droplet stains, greatly reducing contamination of manufacturing equipment, and having very high process adaptability and very good solubility at low temperature. Hence, it is an excellent liquid crystal composition having very well balanced properties. In particular, the composition has an excellent balance between the degree of process adaptability and a reduction in screen burn-in.

<Liquid Crystal Display Device>

The liquid crystal composition of the present invention, to which a polymerizable compound has been added, is used in liquid crystal display devices in which the polymerizable compound is polymerized by being irradiated with ultraviolet for alignment of liquid crystal molecules and in which the birefringence of the liquid crystal composition is utilized to control the amount of light that is to be transmitted. Such a liquid crystal composition is useful for liquid crystal display devices, such as an ECB-LCD, a VA-LCD, a VA-IPS-LCD, an FFS-LCD, an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate.

Color filters can be produced by, for instance, a pigment dispersion technique, a printing technique, an electrodeposition technique, or a staining technique. In production of the color filters by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filters. Active elements such as a TFT and a thin-film diode may be provided on the resulting substrate to form pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted for maximization of contrast. In the case where two polarizing plates are used, the polarization axis of each polarizing plate may be adjusted to give a good viewing angle or contrast. Furthermore, a retardation film may be also used to increase a viewing angle. Examples of the spacer include columnar spacers made of, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The polymerizable-compound-containing liquid crystal composition can be put into the space between the two substrates by, for example, a vacuum injection technique or ODF technique which is generally employed. A vacuum injection technique, however, has a problem in which traces of the injection remain while droplet stains are not generated. The present invention can be more suitably applied to display devices manufactured by an ODF technique. In a process for manufacturing a liquid crystal display device by an ODF technique, an optically and thermally curable epoxy-based sealing material is applied to any one of a backplane and a frontplane with a dispenser in the form of a closed loop that serves as a wall, a certain amount of the liquid crystal composition is dropped onto part of the substrate surrounded by the applied sealing material in a degassed atmosphere, and then the frontplane and the backplane are bonded to each other, thereby being able to manufacture a liquid crystal display device. The liquid crystal composition of the present invention can be stably dropped in an ODF process and can be therefore desirably used.

Since a proper polymerization rate is desired to enable liquid crystal molecules to be aligned in a good manner, the polymerizable compound is preferably polymerized by being irradiated with one of active energy rays, such as an ultraviolet ray and an electron beam, or by being irradiated with such active energy rays used in combination or in sequence. In the use of an ultraviolet ray, a polarized light source or a non-polarized light source may be used. In the case where the polymerizable-compound-containing liquid crystal composition is polymerized in a state in which the composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjustment of conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjustment of voltage that is to be applied. In MVA-mode liquid crystal display devices which involve use of a horizontal electric field, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically from 15 to 35° C. Preferred examples of a lamp that is usable for emitting an ultraviolet ray include a metal halide lamp, a high-pressure mercury lamp, and an ultrahigh-pressure mercury lamp. In addition, an ultraviolet ray to be emitted preferably has a wavelength that is in a wavelength region different from the wavelength region of light absorbed by the liquid crystal composition; it is preferred that an ultraviolet ray in a particular wavelength range be cut off as needed. The intensity of an ultraviolet ray to be emitted is preferably from 0.1 mW/cm$^2$ to 100 W/cm$^2$, and more preferably 2 mW/cm$^2$ to 50 W/cm$^2$. The energy of an ultraviolet ray to be emitted can be appropriately adjusted: preferably from 10 mJ/cm$^2$ to 500 J/cm$^2$, and more preferably 100 mJ/cm$^2$ to 200 J/cm$^2$. The intensity may be changed in the exposure to ultraviolet radiation. The time of the exposure to ultraviolet radiation is appropriately determined on the basis of the intensity of an ultraviolet ray to be emitted: preferably from 10 seconds to 3600 seconds, and more preferably 10 seconds to 600 seconds.

Liquid crystal display devices using the liquid crystal composition of the present invention are practical because they quickly respond and are less likely to suffer from defective display at the same time; in particular, the liquid crystal composition is useful to active-matrix liquid crystal display devices and can be applied to liquid crystal display devices of a VA mode, PSVA mode, PSA mode, IPS (in-plane switching) mode, VA-IPS mode, FSS (fringe-field switching) mode, and ECB mode.

A liquid crystal display according to a preferred embodiment of the present invention will now be described in detail with reference to the drawings.

FIG. 1 is a cross-sectional view illustrating a liquid crystal display device which includes two substrates facing each other, a sealing material disposed between the substrates, and liquid crystal confined in a sealed region surrounded by the sealing material.

In particular, FIG. 1 illustrates a specific embodiment of a liquid crystal display device including a backplane, a frontplane, a sealing material 301 disposed between these substrates, and a liquid crystal layer 303 confined in a sealed region surrounded by the sealing material. The backplane includes a first substrate 100, TFT layers 102 and pixel electrodes 103 each formed so as to overlie the first substrate 100, and a passivation film 104 and first alignment film 105 each formed so as to cover these components. The frontplane faces the backplane and includes a second substrate 200; a black matrix 202, color filters 203, planarization film (overcoat layer) 201, and transparent electrode 204 each formed so as to overlie the second substrate 200; and a second alignment film 205 formed so as to cover these components. In addition, protrusions (columnar spacers) 302 and 304 are extending from a surface to which the sealing material 301 has been applied.

Any substantially transparent material can be used for the first substrate or the second substrate; for instance, glass, ceramic materials, and plastic materials can be used. Examples of materials used for the plastic substrate include cellulose derivatives such as cellulose, triacetyl cellulose, and diacetyl cellulose; polyesters such as polycycloolefin derivatives, polyethylene terephthalate, and polyethylene naphthalate; polyolefins such as polypropylene and polyethylene; polycarbonate; polyvinyl alcohol; polyvinyl chloride; polyvinylidene chloride; polyamide; polyimide; polyimideamide; polystyrene; polyacrylate; polymethyl methacrylate; polyethersulfone; polyarylate; and inorganic-organic composite materials such as glass fiber-epoxy resin and glass fiber-acrylic resin.

In the case where the plastic substrate is used, a barrier film is preferably formed. The barrier film serves to reduce the moisture permeability of the plastic substrate, which enhances the reliability of the electrical properties of the liquid crystal display device. Any barrier film having high transparency and low water vapor permeability can be used; in general, a thin film formed of an inorganic material, such as silicon oxide, by vapor deposition, sputtering, or a chemical vapor deposition method (CVD method) can be used.

In the present invention, the first and second substrates may be formed of materials that are the same as or different from each other without limitation. A glass substrate is preferably employed because using the glass substrate enables manufacturing of a liquid crystal display device exhibiting excellent thermal resistance and dimensional stability. A plastic substrate is also preferably employed because it is suitable for manufacturing by a roll-to-roll process and appropriately enables weight reduction and an enhancement in flexibility. In terms of imparting flatness and thermal resistance to the substrate, a combination of a plastic substrate and a glass substrate can give a good result.

In Examples which will be described later, a substrate is used as a material of the first substrate 100 or the second substrate 200.

In the backplane, the TFT layers 102 and the pixel electrodes 103 are disposed so as to overlie the first substrate 100. These components are formed through an arraying process which is generally used. The passivation film 104 and the first alignment film 105 are formed so as to cover these components, thereby completing the formation of the backplane.

The passivation film 104 (also referred to as an inorganic protective film) is a film used for protecting the TFT layers; in general, a nitride film (SiNx), an oxide film (SiOx), or another film is formed by, for example, a chemical vapor deposition (CVD) method.

The first alignment film 105 is a film which serves to align liquid crystal molecules; in general, a polymeric material, such as polyimide, is used in many cases. An alignment agent solution containing a polymeric material and a solvent is used as a coating liquid. The alignment film may reduce adhesion to the sealing material and is therefore applied in patterns in a sealed region. The alignment agent solution is applied by a printing technique, such as flexography, or a droplet ejection technique, such as an ink jet technique. The alignment agent solution which has been applied is temporarily dried for the solvent being evaporated and then baked to be cross-linked and cured. Then, the cured product is subjected to an alignment treatment in order to produce an alignment function.

In general, a rubbing process is employed for the alignment treatment. The polymeric film produced as described above is unidirectionally rubbed with a rubbing cloth formed of a fibrous material such as rayon, which produces a function of aligning liquid crystal molecules.

A photo-alignment technique may be used. In the photo-alignment technique, an alignment function is produced by emission of polarized light onto an alignment film containing a photosensitive organic material, so that damage of a substrate and generation of dusts which are each caused by a rubbing process are eliminated. Examples of the organic materials used in the photo-alignment technique include materials containing dichroic dyes. A material usable as the dichroic dye has a group which induces an optical reaction resulting in production of a function of aligning liquid crystal molecules (hereinafter referred to as photo-alignment group), such as induction of molecular alignment or isomerization reaction (e.g., azobenzene group) caused by the Weigert effect based on photodichroism, a dimerization reaction (e.g., cinnamoyl group), a photo-cross-linking reaction (e.g., benzophenone group), or a photodegradation reaction (e.g., polyimide group). After the applied alignment agent solution is temporarily dried for the solvent being evaporated, the product is irradiated with light having a predetermined polarization (polarized light), thereby being able to produce an alignment film which enables alignment in the intended direction.

In the frontplane, the black matrix 202, the color filters 203, the planarization film 201, the transparent electrode 204, and the second alignment film 205 are disposed so as to overlie the second substrate 200.

The black matrix 202 is formed by, for example, a pigment dispersion technique. In particular, a color resin liquid in which a black colorant has been uniformly dispersed for formation of the black matrix is applied onto the second substrate 200 on which the barrier film 201 has been formed, thereby forming a colored layer. The colored layer is subsequently cured by being baked. A photoresist is applied onto the cured layer and then pre-baked. The photoresist is exposed to light through a mask pattern, and then development is carried out to pattern the colored layer. Then, the photoresist layer is removed, and the colored layer is baked, thereby completing the black matrix 202.

Alternatively, a photoresist-type pigment dispersion liquid may be used. In this case, the photoresist-type pigment dispersion liquid is applied, pre-baked, and then exposed to light through a mask pattern; and development is subsequently carried out to pattern the colored layer. Then, the photoresist layer is removed, and the colored layer is baked, thereby completing the black matrix 202.

The color filters 203 are formed by a pigment dispersion technique, an electrodeposition technique, a printing technique, or a staining technique. In a pigment dispersion technique, for example, a color resin liquid in which a pigment (e.g., red) has been uniformly dispersed is applied onto the second substrate 200 and then cured by being baked, and a photoresist is applied onto the cured product and pre-baked. The photoresist is exposed to light through a mask pattern, and then development is carried out to form a pattern. The photoresist layer is subsequently removed, and baking is carried out again, thereby completing a (red) color filter 203. The color filters may be formed in any order of colors. A green color filter 203 and a blue color filter 203 are similarly formed.

The transparent electrode 204 is formed so as to overlie the color filters 203 (the overcoat layer (201) is optionally formed on the color filters 203 to flatten the surfaces). The transparent electrode 204 preferably has a high light transmittance and low electric resistance. In the formation of the transparent electrode 204, an oxide film of, for example, ITO is formed by sputtering.

In order to protect the transparent electrode 204, a passivation film is formed on the transparent electrode 204 in some cases.

The second alignment film 205 is the same as the above-mentioned first alignment film 105.

Although a specific embodiment of the backplane and frontplane used in the present invention has been described, the present invention is not limited to this specific embodiment and can be freely modified to provide a desired liquid crystal display device.

The columnar spacers may have any shape, and the horizontal section thereof may have any shape such as a circular, square, or polygonal shape; in particular, the horizontal section preferably has a circular shape or a regular polygonal shape in view of a margin for misalignment in the formation process. Furthermore, such protrusions preferably have the shape of a circular truncated cone or truncated pyramid.

Any material which is insoluble in the sealing material, an organic solvent used in the sealing material, and the liquid crystal can be used for the columnar spacers; a synthetic resin (curable resin) is preferably employed in terms of processability and weight reduction. The protrusions can be formed above the surface of the first substrate by photolithography or a droplet ejection technique, the surface being subjected to application of the sealing material. For such a reason, a photocurable resin suitable for photolithography and a droplet ejection technique is preferably employed.

Figure 2:
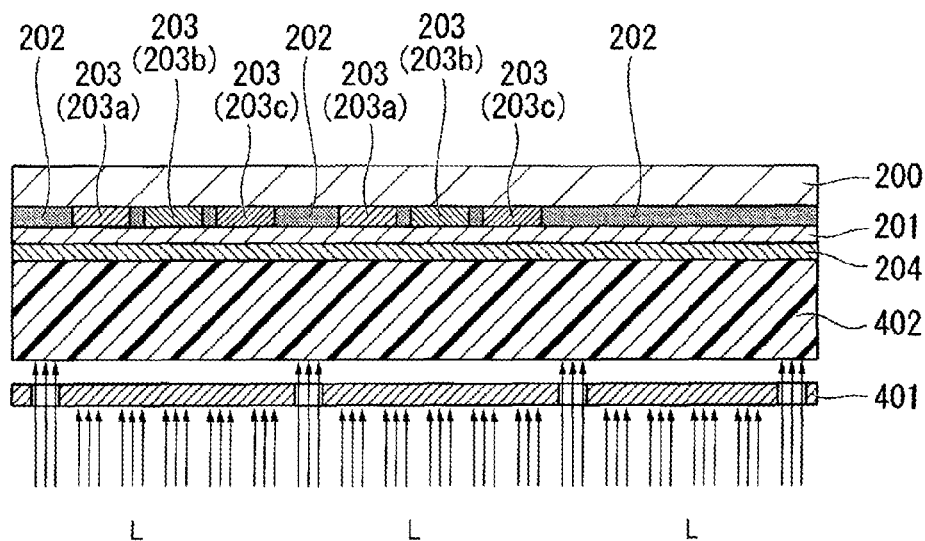
FIG. 2 illustrates an exposure process in which a pattern used for forming columnar spacers above a black matrix is employed as the pattern of a photomask.

An illustrative case in which the columnar spacers are formed by photolithography will now be described. FIG. 2 illustrates an exposure process in which a pattern for forming the columnar spacers above the black matrix is employed as the pattern of a photomask.

A resin solution (not containing a colorant) used for forming the columnar spacers is applied onto the transparent electrode 204 of the frontplane. Then, the resulting resin layer 402 is cured by being baked. A photoresist is applied onto the cured layer and then pre-baked. The photoresist is exposed to light through a mask pattern 401, and then development is carried out to pattern the resin layer. The photoresist layer is subsequently removed, and then the resin layer is baked, thereby completing the columnar spacers (corresponding to 302 and 0304 in FIG. 1).

Positions at which the columnar spacers are to be formed can be appropriately determined on the basis of the mask pattern. Accordingly, both the inside of the sealed region and the outside thereof (part to which the sealing material is to be applied) can be simultaneously formed in the liquid crystal display device. The columnar spacers are preferably formed above the black matrix in order to avoid degrading the quality of the sealed region. The columnar spacers formed by photolithography as described above are also referred to as column spacers or photo spacers.

The material used for forming the spacers is a mixture containing, for example, a negative water-soluble resin, such as a PVA-stilbazo photosensitive resin; a polyfunctional acrylic monomer; an acrylic acid copolymer; and a triazole-based initiator. In another technique, a color rein in which a colorant has been dispersed in a polyimide resin is used. In the present invention, any technique can be employed, and existing materials suitable for liquid crystal and sealing material, which are to be used, can be used to form the spacers.

After the columnar spacers are formed on part of the surface of the frontplane, which serves as the sealed region, in this manner, the sealing material (corresponding to 301 in FIG. 1) is applied to the intended part of the surface of the backplane.

Any material can be used as the sealing material, and a curable resin composition prepared by addition of a polymerization initiator to an epoxy-based or acrylic resin which is photocurable, thermosetting, or optically and thermally curable is used. Fillers containing inorganic or organic materials are added in some cases to control moisture permeability, an elastic modulus, viscosity, and another property. Such fillers may have any shape such as a spherical shape, a fibrous shape, or an amorphous shape. Furthermore, a spherical or fibrous gap material having a single dispersion diameter may be mixed to properly control the cell gap, and a fibrous material which can be easily wound around the protrusions formed above the substrate may be mixed to enhance the adhesion to the plates. The diameter of the fibrous material used in this case is desirably from approximately ⅕ to ⅒ of the cell gap, and the length of the fibrous material is desirably shorter than the width of an applied sealing material.

Any substance can be used as the fibrous material provided that the fibrous material can have a predetermined shape; synthetic fibers, such as cellulose, polyamide, and polyester, and inorganic materials, such as glass and carbon, can be appropriately selected.

The sealing material can be applied by a printing technique or a dispensing technique, and a dispensing technique is desirably employed because the amount of the sealing material to be used in the dispensing technique is small. In general, the sealing material is applied to a position corresponding to the position of the black matrix to avoid an adverse effect on the sealed region. In order to form a liquid crystal-dropped region used in the subsequent process (to prevent the liquid crystal from leaking), the sealing material is applied in the form of a closed loop.

Liquid crystal is dropped to the closed-loop structure (sealed region) of the frontplane, the closed-loop structure having been formed by application of the sealing material. In general, a dispenser is used. Since the amount of liquid crystal to be dropped should be equivalent to the capacity of a liquid crystal cell, the amount basically corresponds to the volume that is the product of the height of the columnar spacers and the area surrounded by the sealing material. In order to reduce the leakage of liquid crystal in a cell bonding process or to optimize displaying characteristics, the amount of the liquid crystal to be dropped may be appropriately adjusted, or positions to which the liquid crystal are dropped may be dispersed.

Then, the backplane is bonded to the frontplane to which the sealing material has been applied and liquid crystal has been dropped. In particular, the frontplane and the backplane are attached to stages having a mechanism for holding the substrates, such as an electrostatic chuck, and then the frontplane and the backplane are disposed at a position (in a distance) which enables the second alignment film of the frontplane to face the first alignment film of the backplane and which enables the sealing material not to contact the other side. In this state, pressure in the system is reduced. After the reduction in pressure, the positions of the frontplane and backplane are adjusted (alignment process) while parts of the frontplane and backplane which are to be bonded to each other are confirmed. After the adjustment of the positions, the frontplane and the backplane are moved to bring the sealing material on the frontplane into contact with the backplane. In this state, the inside of the system is filled with inert gas, and the vacuum is gradually released into normal pressure. In this process, atmospheric pressure enables the frontplane and the backplane to be bonded to each other, and the height of the columnar spacers defines a cell gap. In this state, the sealing material is cured by being irradiated with ultraviolet, thereby forming the liquid crystal cell. Then, a heating process is optionally carried out to promote the curing of the sealing material. The heating process is carried out in many cases to enhance the adhesion of the sealing material and the reliability of electrical properties.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

Tni: Nematic phase-isotropic liquid phase transition temperature (° C.)

Δn: Refractive index anisotropy at 298 K (also referred to as birefringence)

Δ∈: Dielectric anisotropy at 298 K

η: Viscosity at 293 K (mPa·s)

γ1: Rotational viscosity at 298 K (mPa·s)

VHR: Voltage holding ratio (%) at 333 K under the conditions including a frequency of 60 Hz and an applied voltage of 5 V VHR after Thermal Test: a TEG (test element group) in which a sample of a liquid crystal composition had been confined and which was used for evaluating electrooptical properties was held in a constant bath at 130° C. for an hour, and then the measurement was carried out under the same conditions as the above-mentioned measurement of VHR.

Screen Burn-in:

In order to evaluate screen burn-in in a liquid crystal display device, a certain fixed pattern was continuously displayed in a display area for a predetermined test time, and then an image was displayed evenly on the whole of the screen. In this procedure, test time taken for the afterimage of the fixed pattern to reach an unacceptable level was measured.
1) The term "test time" herein refers to time over which the fixed pattern was displayed. The longer the test time in result of the measurement was, the more the occurrence of the after image was reduced; the longer test time shows that the liquid crystal display device had a high performance.
2) The unacceptable level of the after image refers to a level at which the degree of the observed after image was determined as being unacceptable in judgment of acceptance.

Droplet Stains:

In order to evaluate droplet stains in a liquid crystal display apparatus, white droplet stains which emerged in an entirely-black display mode were visually observed. Result of the observation was evaluated on the basis of the following five criteria.

5: No droplet stain observed (excellent)
4: Slight droplet stains observed, but acceptable (good)
3: Some droplet stains observed, the borderline in judgment of acceptance (acceptable with some conditions)
2: Droplet stains observed, unacceptable (bad)
1: Droplet stains observed, quite inadequate (poor)

Process Adaptability:

In an ODF process, 50 pL of liquid crystal was dropped 100 times with a constant volume metering pump, and this 100-times dropping was repeated such as "0 to 100, 101 to 200, 201 to 300 . . . ". The mass of the liquid crystal dropped 100 times was measured in each cycle to obtain the number of times of the dropping at which a variation in mass reached the degree that was unsuitable for the ODF process. Process adaptability was evaluated on the basis of this obtained number of times of the dropping.

The larger the obtained number of times of the dropping was, the more liquid crystal was able to be stably dropped for a long time; the larger number of times of the dropping shows that the liquid crystal had high process adaptability.

Solubility at Low Temperature:

In order to evaluate solubility at low temperature, a liquid crystal composition was prepared and then weighted to 1 g in a 2-mL sample bottle, and the sample bottle was subjected to a continuous temperature change in a temperature controlled chamber in a cycle of the following operation: −20° C. (retained for an hour)→heating (0.1° C./min)→0° C. (retained for an hour)→heating (0.1° C./min)→20° C. (retained for an hour)→cooling (−0.1° C./min)→0° C. (retained for an hour)→cooling (−0.1° C./min)→−20° C. Then, precipitate generated in the liquid crystal composition was visually observed, and the test time at which the precipitate had been observed was measured.

The longer the test time was, the more the liquid crystal phase was stably maintained for a long time; the longer test time shows that the liquid crystal composition had a good solubility at low temperature.

Volatility/Contamination of Manufacturing Equipment:

In order to evaluate the volatility of a liquid crystal material, operation of a vacuum defoaming mixer was observed with a stroboscope for visual surveillance of foaming of the liquid crystal material. In particular, 0.8 kg of a liquid crystal composition was put into the 2.0-L container dedicated to the vacuum defoaming mixer, the vacuum defoaming mixer was operated under a vacuum of 4 kPa at an orbital speed of 15 $S^{-1}$ and a rotating velocity of 7.5 $S^{-1}$, and the time taken for the liquid crystal composition to start foaming was measured.

The longer the time taken for the liquid crystal composition to start foaming was, the less the liquid crystal composition was volatilized. Since a less volatile liquid crystal composition hardly contaminates manufacturing equipment, a longer time taken for the liquid crystal composition to start foaming shows that the liquid crystal composition had a high quality.

Examples 1 to 3

Compositions shown in Table 1 were prepared, and IPS liquid crystal display apparatuses having the structure illustrated in FIGS. 1 and 2 were produced. Table 2 shows results of the evaluations of the compositions and liquid crystal display apparatuses.

Comparative Example 1

A composition shown in Table 1 was prepared without use of the compound represented by General Formula (ii), and an IPS liquid crystal display apparatus having the structure illustrated in FIGS. 1 and 2 were produced. Table 2 shows results of the evaluations of the composition and liquid crystal display apparatus.

[Chem. 187]

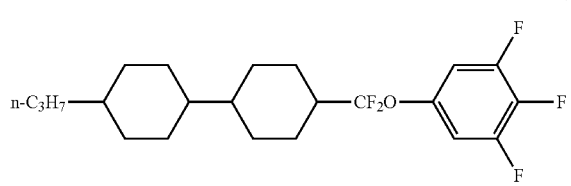

(i)

-continued

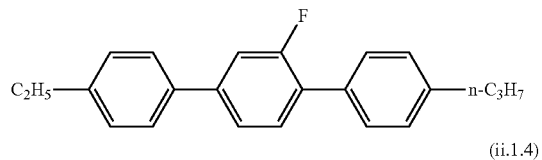

(ii.1.1)

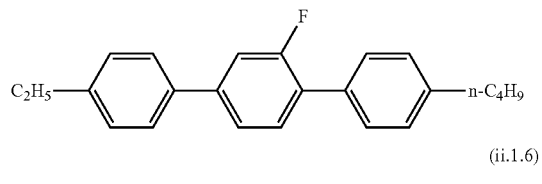

(ii.1.4)

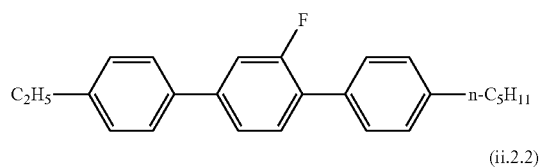

(ii.1.6)

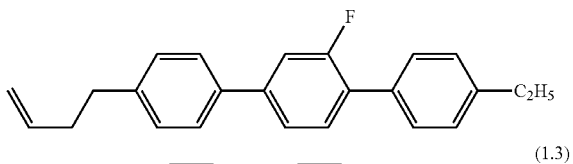

(ii.2.2)

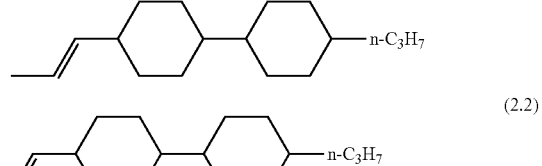

(1.3)

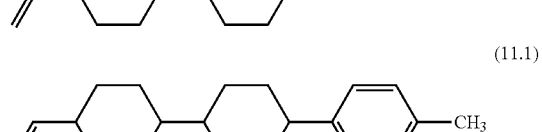

(2.2)

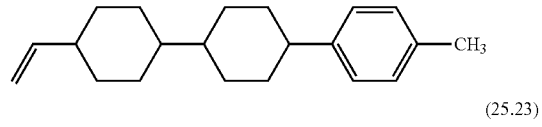

(11.1)

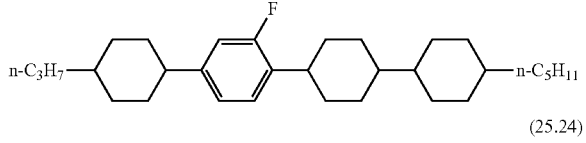

(25.23)

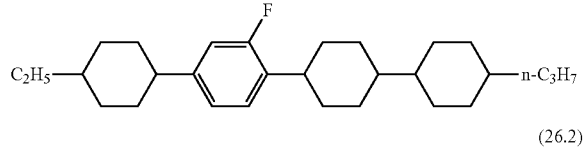

(25.24)

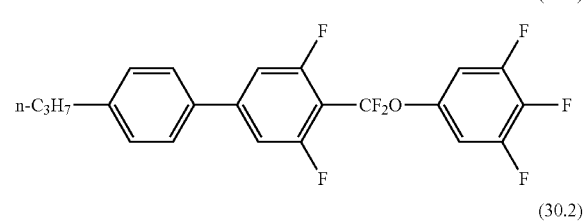

(26.2)

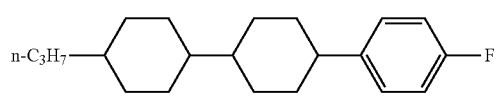

(30.2)

-continued

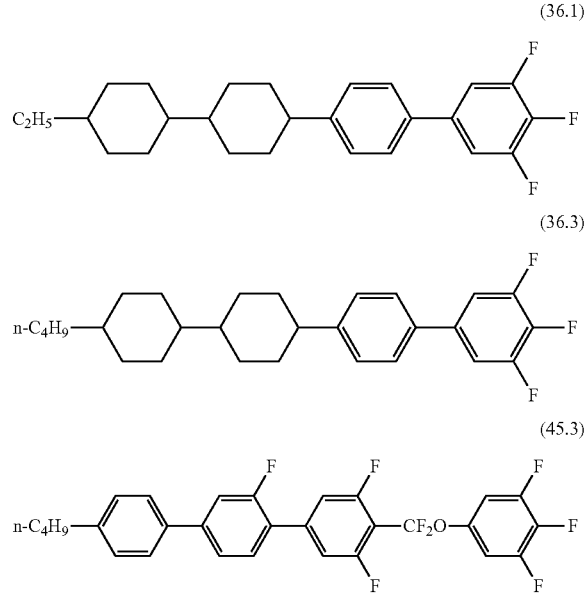

TABLE 1

| | Ratio (Mass %) | | | |
|---|---|---|---|---|
| Formula of Compound | Comparative Example 1 | Example 1 | Example 2 | Example 3 |
| Formula (i) | 14 | 14 | 14 | 14 |
| Formula (ii.1.1) | | | 7 | |
| Formula (ii.1.4) | | | 4 | 3 |
| Formula (ii.1.6) | | | | 8 |
| Formula (ii.2.2) | | 11 | | |
| Formula (1.3) | 10 | 10 | 10 | 10 |
| Formula (2.2) | 27 | 27 | 27 | 27 |
| Formula (11.1) | 11 | | | |
| Formula (25.23) | 5 | 5 | 5 | 5 |
| Formula (25.24) | 2 | 2 | 2 | 2 |
| Formula (26.2) | 16 | 16 | 16 | 16 |
| Formula (30.2) | 2 | 2 | 2 | 2 |
| Formula (36.1) | 4 | 4 | 4 | 4 |
| Formula (36.3) | 4 | 4 | 4 | 4 |
| Formula (45.3) | 5 | 5 | 5 | 5 |

TABLE 2

| | Result | | | |
|---|---|---|---|---|
| Evaluation Item | Comparative Example 1 | Example 1 | Example 2 | Example 3 |
| $T_{NI}/°C$ | 97.2 | 95.6 | 90.2 | 91.5 |
| $\Delta n$ | 0.095 | 0.111 | 0.104 | 0.106 |
| $\Delta\epsilon$ | 6.3 | 7.3 | 7.4 | 7.1 |
| $\eta/mPa \cdot s$ | 13 | 17 | 15 | 16 |
| $\gamma_1/mPa \cdot s$ | 71 | 78 | 78 | 80 |
| Initial Voltage Holding Ratio (%) | 99.0 | 99.4 | 99.3 | 99.4 |
| Voltage Holding Ratio after Thermal Test (%) | 97.5 | 98.8 | 98.8 | 98.7 |
| Evaluation of Screen Burn-in (h) | 108 | 220 | 360 | 200 |
| Evaluation of Droplet Stains | 2 | 5 | 4 | 5 |
| Evaluation of Contamination of Manufacturing Equipment (s) | 60 | 75 | 70 | 100 |
| Evaluation of Process Adaptability (Times) | 7800 | 36000 | 40000 | 23200 |
| Evaluation of Solubility at Low Temperature (h) | 108 | 600 | 360 | 630 |

The composition prepared in Example 1 was able to be steadily and continuously dropped for a long time in an ODF process and had significantly high solubility at low temperature as compared with the composition prepared in Comparative Example 1. The liquid crystal display apparatus produced in Example 1 enabled a reduction in screen burn-in as compared with the liquid crystal display apparatus produced in Comparative Example 1.

Examples 4 to 8

Compositions shown in Table 3 were prepared, and IPS liquid crystal display apparatuses having the structure illustrated in FIGS. 1 and 2 were produced. Table 4 shows results of the evaluations of the compositions and liquid crystal display apparatuses.

[Chem. 188]

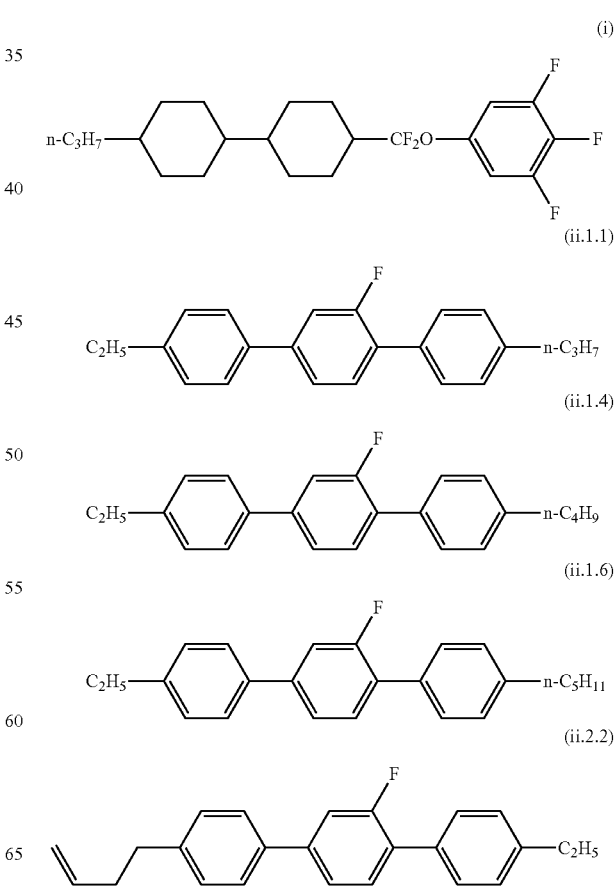

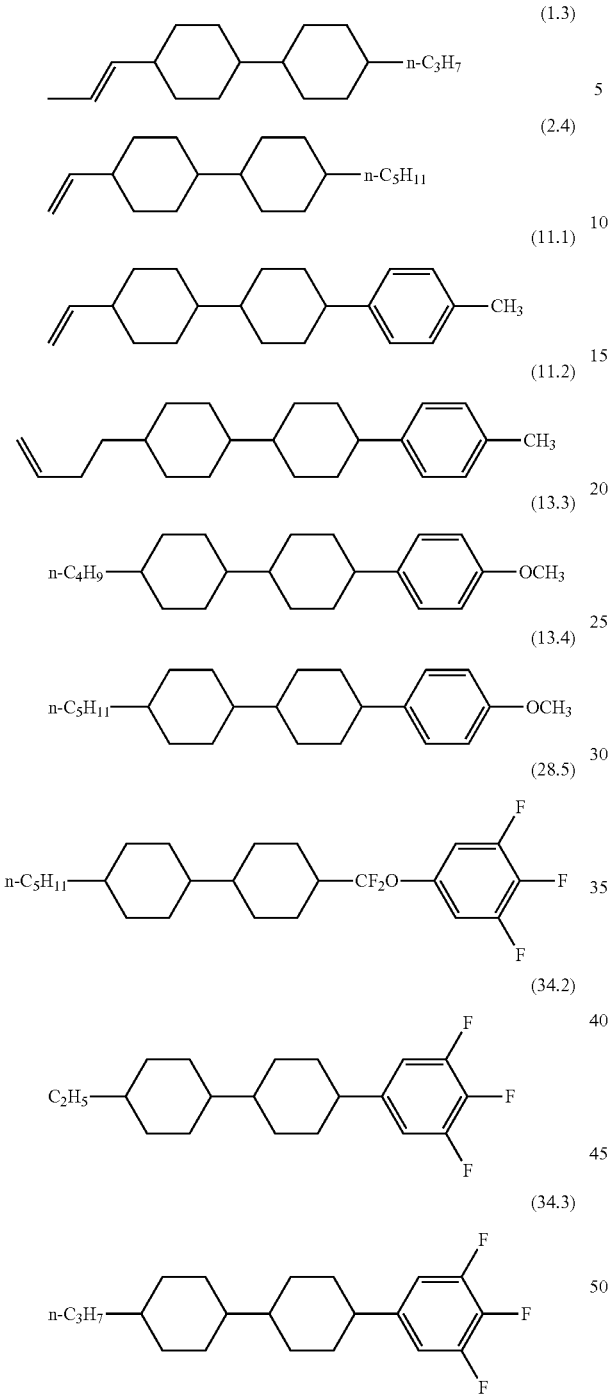

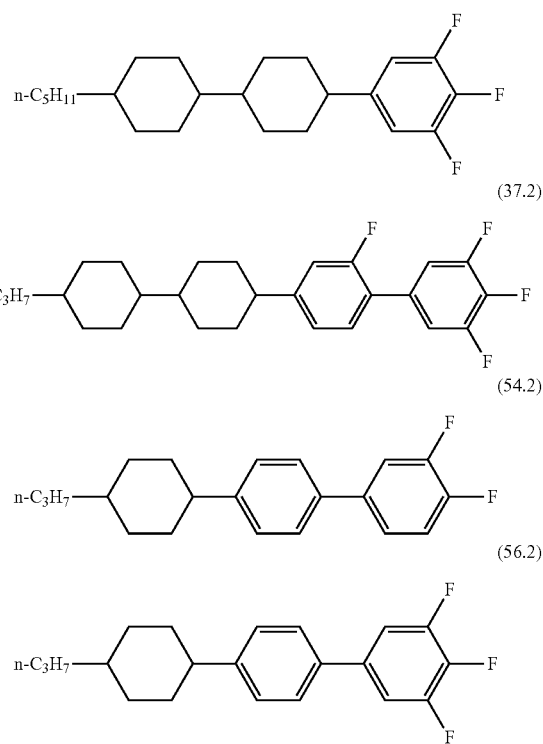

TABLE 3

| Formula of Compound | Ratio (Mass %) | | | | |
|---|---|---|---|---|---|
| | Example 4 | Example 5 | Example 6 | Example 7 | Example 8 |
| Formula (i) | 4 | 6 | 8 | 8 | 8 |
| Formula (ii.1.1) | 6 | 5 | | | 5 |
| Formula (ii.1.4) | | | | | 5 |
| Formula (ii.1.6) | | | | 5 | |
| Formula (ii.2.2) | | | 5 | | |
| Formula (1.3) | 8 | 9 | 12 | 12 | 12 |
| Formula (2.4) | 7 | 6 | 3 | 3 | 3 |
| Formula (11.1) | 10 | 11 | 11 | 6 | 6 |
| Formula (11.2) | | | | 5 | |
| Formula (13.3) | 4 | 5 | 6 | 6 | 6 |
| Formula (13.4) | 6 | 5 | 4 | 4 | 4 |
| Formula (28.5) | 4 | 2 | | | |
| Formula (34.2) | 10 | 13 | 10 | 15 | 15 |
| Formula (34.3) | 15 | 13 | 10 | 15 | 15 |
| Formula (34.5) | 5 | 4 | 10 | | |
| Formula (37.2) | 2 | 2 | 2 | 2 | 2 |
| Formula (54.2) | 10 | 9 | 8 | 8 | 8 |
| Formula (56.2) | 9 | 10 | 11 | 11 | 11 |

TABLE 4

| Evaluation Item | Result | | | | |
|---|---|---|---|---|---|
| | Example 4 | Example 5 | Example 6 | Example 7 | Example 8 |
| $T_{NI}/°$ C. | 101.4 | 100.7 | 105.6 | 101.4 | 97.0 |
| $\Delta n$ | 0.097 | 0.094 | 0.098 | 0.093 | 0.096 |
| $\Delta\epsilon$ | 7.2 | 7.3 | 7.2 | 7.5 | 8.0 |
| $\eta$/mPa · s | 21 | 20 | 22 | 19 | 19 |
| $\gamma_1$/mPa · s | 104 | 103 | 111 | 100 | 101 |
| Initial Voltage Holding Ratio (%) | 99.4 | 99.6 | 99.6 | 99.4 | 99.4 |

TABLE 4-continued

| Evaluation Item | Result | | | | |
| --- | --- | --- | --- | --- | --- |
| | Example 4 | Example 5 | Example 6 | Example 7 | Example 8 |
| Voltage Holding Ratio after Thermal Test (%) | 98.8 | 98.9 | 98.1 | 97.5 | 98.8 |
| Evaluation of Screen Burn-in (h) | 600 | 590 | 590 | 280 | 600 |
| Evaluation of Droplet Stains | 5 | 5 | 4 | 5 | 5 |
| Evaluation of Contamination of Manufacturing Equipment (s) | 200 | 110 | 190 | 185 | 180 |
| Evaluation of Process Adaptability (Times) | 110000 | 100000 | 100500 | 99000 | 43000 |
| Evaluation of Solubility at Low Temperature (h) | 720 | 660 | 610 | 630 | 660 |

Examples 9 to 13

Compositions shown in Table 5 were prepared, and IPS liquid crystal display apparatuses having the structure illustrated in FIGS. 1 and 2 were produced. Table 6 shows results of the evaluations of the compositions and liquid crystal display apparatuses.

[Chem. 189]

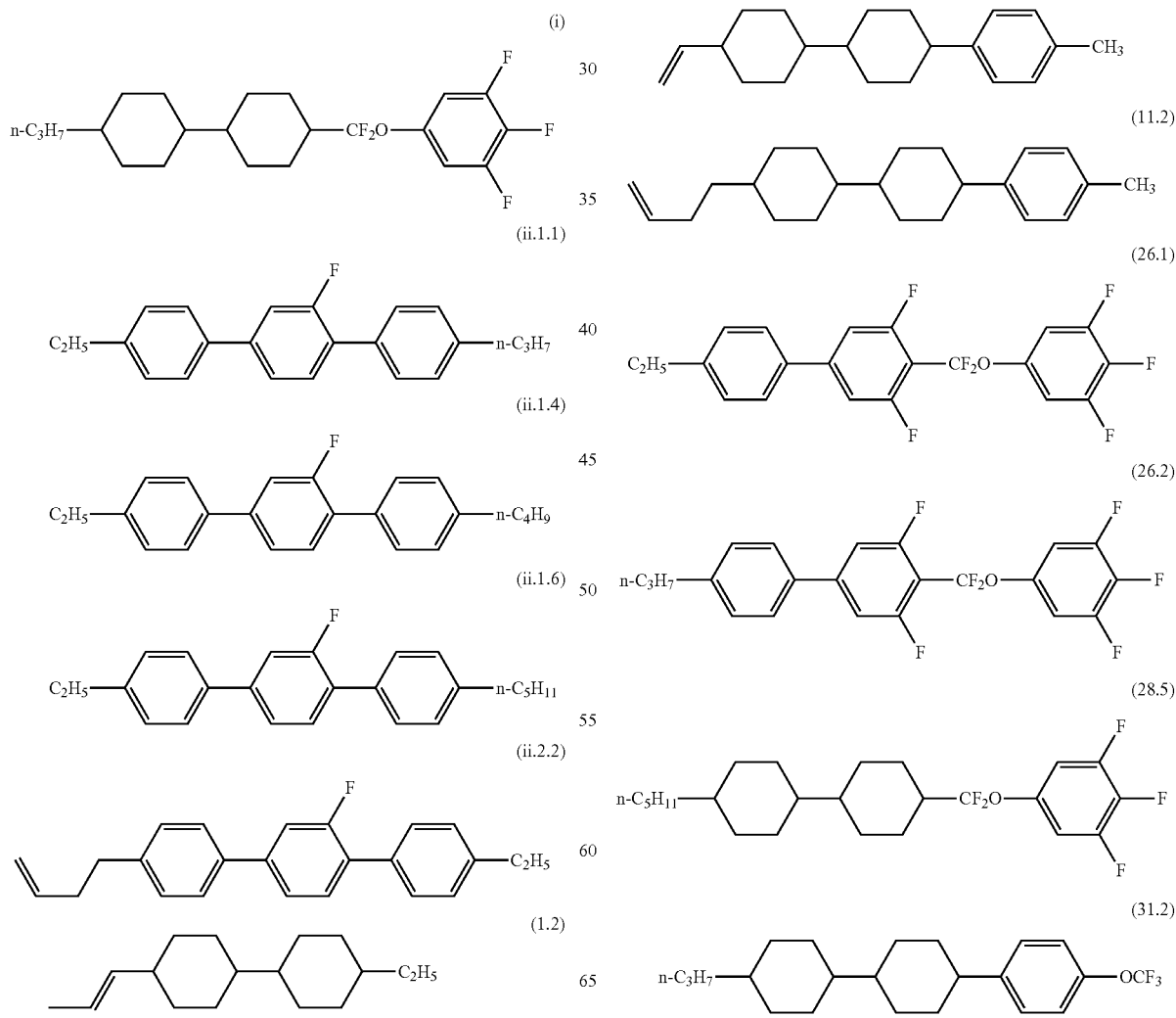

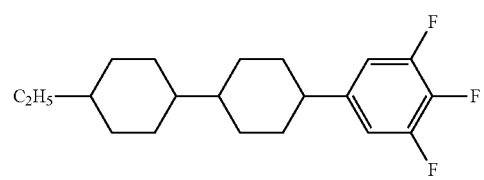

(34.2)

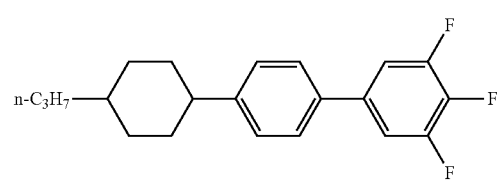

(56.2)

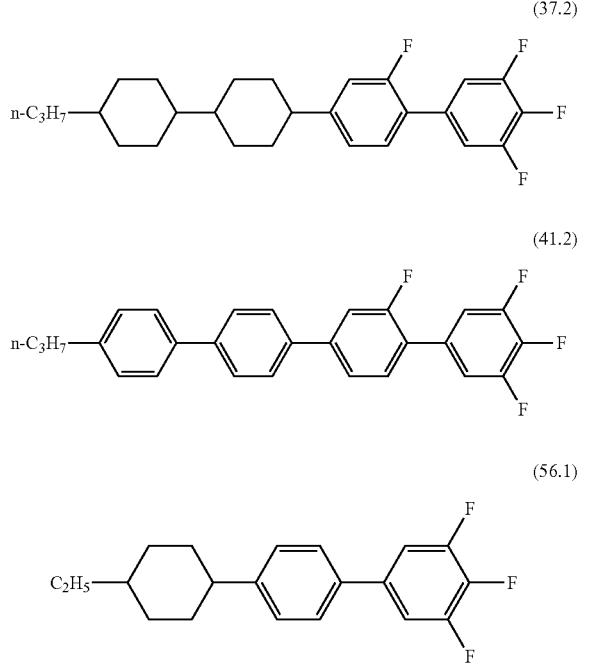

TABLE 5

| Formula of Compound | Ratio (Mass %) | | | | |
|---|---|---|---|---|---|
| | Example 9 | Example 10 | Example 11 | Example 12 | Example 13 |
| Formula (i) | 9 | 10 | 11 | 12 | 8 |
| Formula (ii.1.1) | 6 | 8 | 7 | 3 | 6 |
| Formula (ii.1.4) | 4 | 2 | 7 | 3 | 4 |
| Formula (ii.1.6) | 3 | | | | |
| Formula (ii.2.2) | | 5 | 4 | 8 | 7 |
| Formula (1.2) | | | | | 15 |
| Formula (1.3) | 2 | | 2 | 5 | 2 |
| Formula (2.2) | 15 | 17 | 15 | 12 | |
| Formula (11.1) | 8 | 6 | 4 | 12 | 8 |
| Formula (11.2) | | 2 | | | |
| Formula (26.1) | | 3 | 2 | 1 | |
| Formula (26.2) | 11 | 8 | 9 | 10 | 11 |
| Formula (28.5) | 8 | 7 | 6 | 5 | 9 |
| Formula (31.2) | 14 | 14 | 14 | 14 | 14 |
| Formula (34.2) | 8 | 7 | 6 | 5 | 4 |
| Formula (37.2) | 3 | 1 | 2 | | 2 |
| Formula (41.2) | | 1 | 2 | | 1 |
| Formula (56.1) | | 1 | 2 | 3 | |
| Formula (56.2) | 9 | 8 | 7 | 6 | 9 |

TABLE 6

| Evaluation Item | Result | | | | |
|---|---|---|---|---|---|
| | Example 9 | Example 10 | Example 11 | Example 12 | Example 13 |
| $T_{NI}/°$ C. | 90.4 | 88.2 | 87.9 | 92.4 | 94.9 |
| $\Delta n$ | 0.105 | 0.110 | 0.114 | 0.111 | 0.116 |
| $\Delta \epsilon$ | 9.3 | 9.4 | 10.1 | 8.2 | 8.6 |
| $\eta$/mPa·s | 17 | 17 | 19 | 17 | 19 |
| $\gamma_1$/mPa·s | 78 | 79 | 87 | 79 | 73 |
| Initial Voltage Holding Ratio (%) | 99.4 | 99.6 | 99.6 | 99.4 | 99.4 |
| Voltage Holding Ratio after Thermal Test (%) | 98.8 | 98.9 | 98.9 | 98.8 | 98.8 |
| Evaluation of Screen Burn-in (h) | 700 | 650 | 640 | 300 | 600 |
| Evaluation of Droplet Stains | 5 | 5 | 4 | 5 | 5 |
| Evaluation of Contamination of Manufacturing Equipment (s) | 210 | 100 | 190 | 195 | 185 |
| Evaluation of Process Adaptability (Times) | 120000 | 99000 | 100000 | 98000 | 29500 |
| Evaluation of Solubility at Low Temperature (h) | 640 | 600 | 610 | 625 | 630 |

Examples 14 to 17

Compositions shown in Table 7 were prepared, and IPS liquid crystal display apparatuses having the structure illustrated in FIGS. 1 and 2 were produced. Table 8 shows results of the evaluations of the compositions and liquid crystal display apparatuses.

[Chem. 190]

(i)

n-C$_3$H$_7$—◯—◯—CF$_2$O—⬡(F,F,F)

(ii.1.1)

C$_2$H$_5$—⬡—⬡(F)—⬡—n-C$_3$H$_7$ (ii.1.4)

C$_2$H$_5$—⬡—⬡(F)—⬡—n-C$_4$H$_9$ (ii.1.6)

C$_2$H$_5$—⬡—⬡(F)—⬡—n-C$_5$H$_{11}$ (1.3)

CH$_2$=CH—◯—◯—n-C$_3$H$_7$ (2.2)

CH$_2$=CH—◯—◯—n-C$_3$H$_7$ (2.5)

n-C$_3$H$_7$—◯—◯—CH=CF$_2$ (11.1)

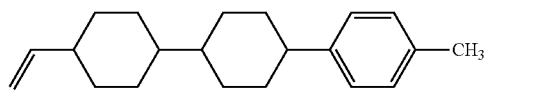

(11.2)

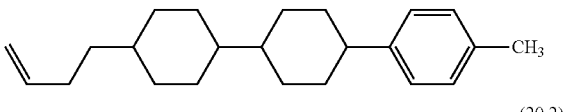

(20.2)

n-C$_3$H$_7$—◯—⬡—⬡—◯—n-C$_3$H$_7$ (23.1)

n-C$_5$H$_{11}$—◯—⬡—⬡(F)—⬡—C$_2$H$_5$ (26.2)

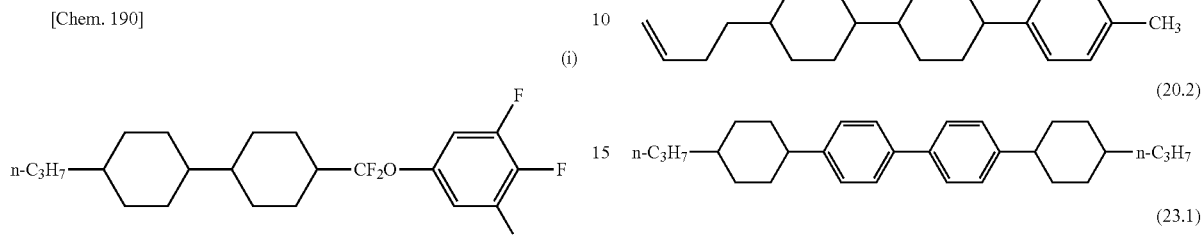

TABLE 7

| | Ratio (Mass %) | | | |
|---|---|---|---|---|
| Formula of Compound | Example 14 | Example 15 | Example 16 | Example 17 |
| Formula (i) | 6 | 7 | 3 | 8 |
| Formula (ii.1.1) | 11 | 10 | 11 | |
| Formula (ii.1.4) | | 10 | | 13 |
| Formula (ii.1.6) | 15 | | 12 | 11 |
| Formula (1.3) | | 6 | 16 | |
| Formula (2.2) | 16 | 18 | 14 | 39 |
| Formula (2.5) | 28 | 20 | 15 | 5 |
| Formula (11.1) | 15 | 11 | 10 | 8 |
| Formula (11.2) | | 9 | 1 | 8 |
| Formula (20.2) | | | 4 | 3 |
| Formula (23.1) | 2 | 3 | 4 | |
| Formula (26.2) | 7 | 6 | 10 | 5 |

TABLE 8

| | Result | | | |
|---|---|---|---|---|
| Evaluation Item | Example 14 | Example 15 | Example 16 | Example 17 |
| T$_{NI}$/° C. | 76.3 | 84.8 | 88.0 | 85.0 |
| Δn | 0.117 | 0.110 | 0.124 | 0.112 |
| Δε | 3.9 | 3.7 | 3.8 | 3.4 |
| η/mPa·s | 11 | 10 | 14 | 11 |
| γ$_1$/mPa·s | 44 | 47 | 54 | 51 |
| Initial Voltage Holding Ratio (%) | 99.4 | 99.6 | 99.6 | 99.4 |
| Voltage Holding Ratio after Thermal Test (%) | 98.8 | 98.9 | 98.9 | 98.8 |
| Evaluation of Screen Burn-in (h) | 700 | 650 | 640 | 300 |
| Evaluation of Droplet Stains | 5 | 5 | 4 | 5 |

TABLE 8-continued

| Evaluation Item | Result | | | |
|---|---|---|---|---|
| | Example 14 | Example 15 | Example 16 | Example 17 |
| Evaluation of Contamination of Manufacturing Equipment (s) | 210 | 100 | 190 | 195 |
| Evaluation of Process Adaptability (Times) | 120000 | 99000 | 100000 | 98000 |
| Evaluation of Solubility at Low Temperature (h) | 640 | 600 | 610 | 625 |

Examples 18 to 21

Compositions shown in Table 9 were prepared, and IPS liquid crystal display apparatuses having the structure illustrated in FIGS. 1 and 2 were produced. Table 10 shows results of the evaluations of the compositions and liquid crystal display apparatuses.

[Chem. 191]

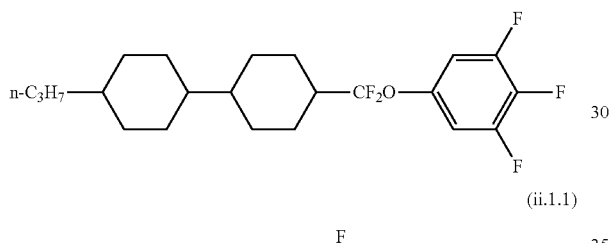

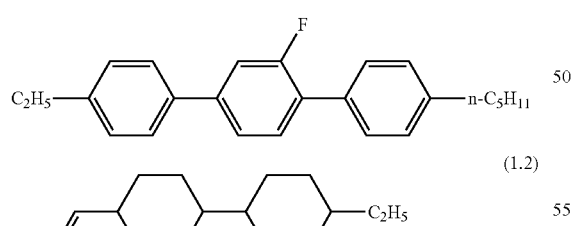

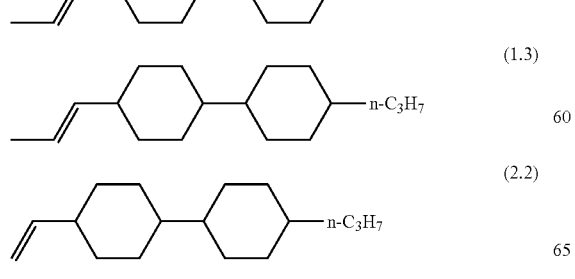

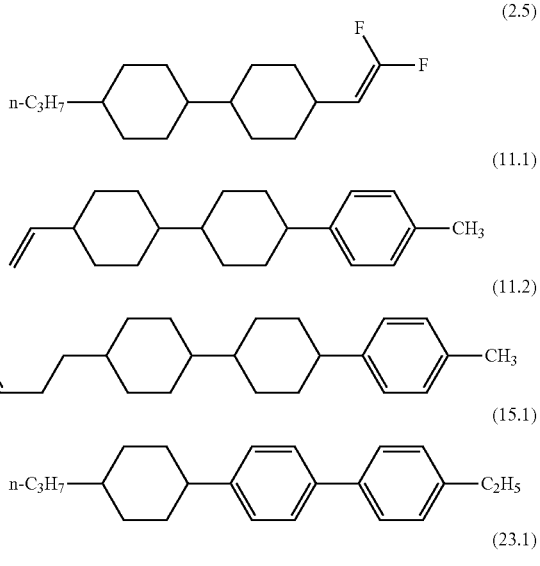

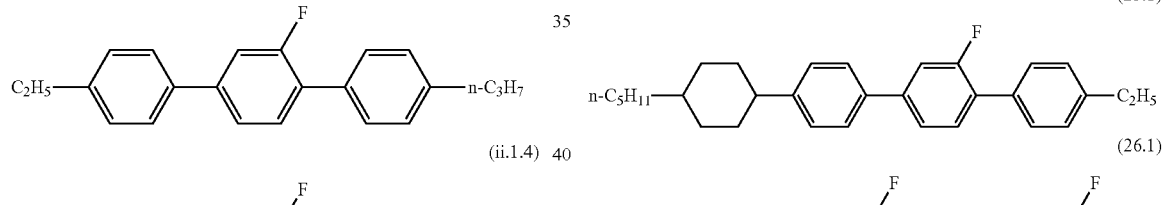

TABLE 9

| Formula of Compound | Ratio (Mass %) | | | |
|---|---|---|---|---|
| | Example 18 | Example 19 | Example 20 | Example 21 |
| Formula (i) | 2 | 2 | 4 | 6 |
| Formula (ii.1.1) | 11 | 13 | 10 | 9 |
| Formula (ii.1.4) | | | 6 | 5 |
| Formula (ii.1.6) | 15 | 11 | 5 | 7 |

TABLE 9-continued

| Formula of Compound | Ratio (Mass %) | | | |
|---|---|---|---|---|
| | Example 18 | Example 19 | Example 20 | Example 21 |
| Formula (1.2) | | | | 18 |
| Formula (1.3) | | | 7 | 8 |
| Formula (2.2) | 16 | 23 | 26 | 14 |
| Formula (2.5) | 27 | 20 | 10 | 5 |
| Formula (11.1) | 15 | 5 | 10 | 13 |
| Formula (11.2) | | 10 | 5 | |
| Formula (15.1) | | 2 | 5 | 5 |
| Formula (23.1) | 2 | 2 | 2 | 2 |
| Formula (26.1) | | 6 | | |
| Formula (26.2) | 12 | 6 | 10 | 8 |

TABLE 10

| Evaluation Item | Result | | | |
|---|---|---|---|---|
| | Example 18 | Example 19 | Example 20 | Example 21 |
| $T_{NI}/°$ C. | 76.3 | 76.6 | 84.7 | 86.4 |
| $\Delta n$ | 0.117 | 0.114 | 0.113 | 0.111 |
| $\Delta \epsilon$ | 3.9 | 4.0 | 3.4 | 2.9 |
| $\eta$/mPa·s | 11 | 11 | 10 | 9 |
| $\gamma_1$/mPa·s | 44 | 46 | 50 | 42 |
| Initial Voltage Holding Ratio (%) | 99.4 | 99.4 | 99.6 | 99.4 |
| Voltage Holding Ratio after Thermal Test (%) | 98.8 | 98.8 | 98.9 | 98.8 |
| Evaluation of Screen Burn-in (h) | 550 | 450 | 450 | 460 |
| Evaluation of Droplet Stains | 5 | 5 | 4 | 4 |
| Evaluation of Contamination of Manufacturing Equipment (s) | 180 | 175 | 168 | 200 |
| Evaluation of Process Adaptability (Times) | 98000 | 80000 | 89000 | 97000 |
| Evaluation of Solubility at Low Temperature (h) | 550 | 540 | 550 | 525 |

Examples 22 to 25

Compositions shown in Table 11 were prepared, and IPS liquid crystal display apparatuses having the structure illustrated in FIGS. 1 and 2 were produced. Table 12 shows results of the evaluations of the compositions and liquid crystal display apparatuses.

[Chem. 192]

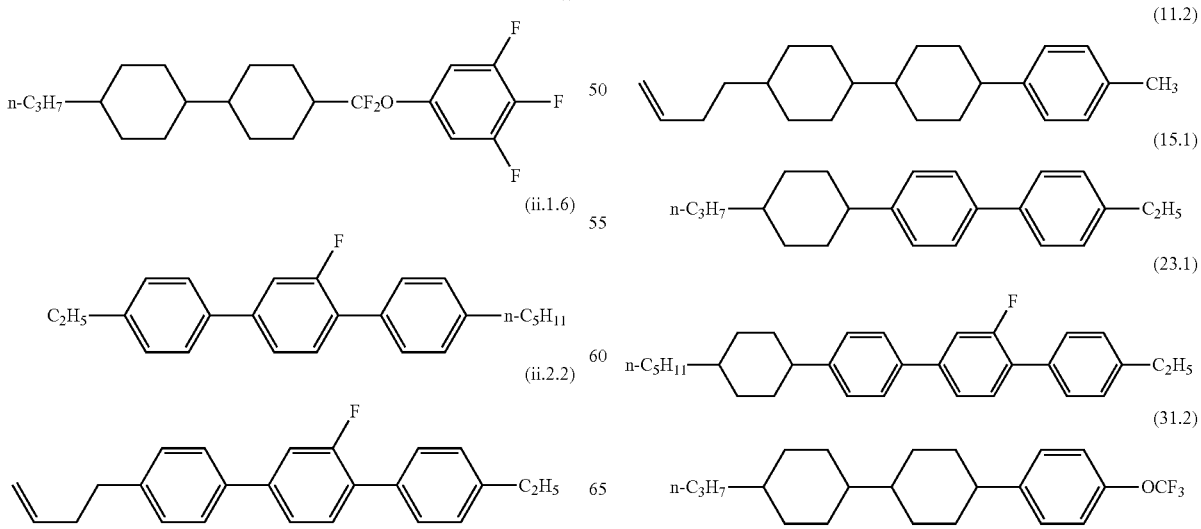

-continued (31.4)
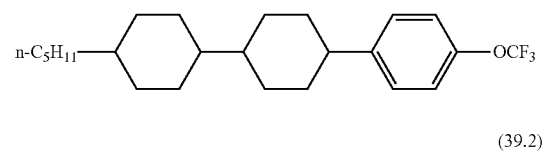

(39.2)
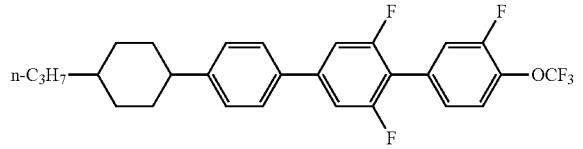

(44.1)
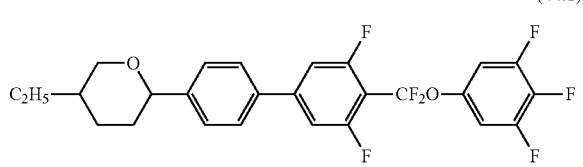

(44.2)
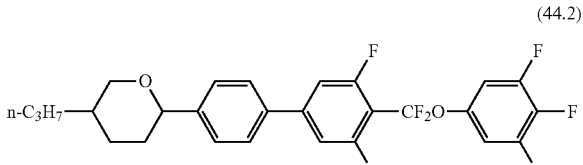

(45.2)
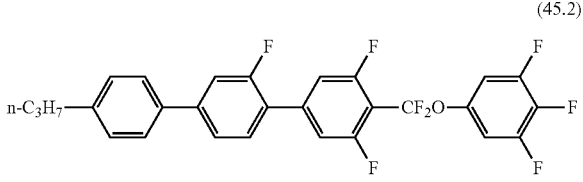

(45.3)
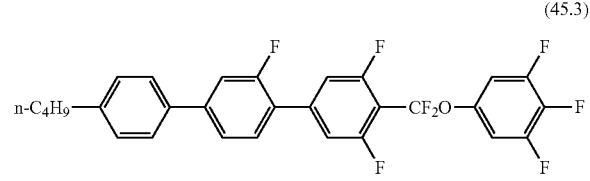

TABLE 11

| Formula of Compound | Ratio (Mass %) | | | |
|---|---|---|---|---|
| | Example 22 | Example 23 | Example 24 | Example 25 |
| Formula (i) | 2 | 5 | 4 | 5 |
| Formula (ii.1.6) | | 4 | | |
| Formula (ii.2.2) | | 8 | 8 | |
| Formula (ii.2.4) | 12 | | | 10 |
| Formula (1.3) | 10 | 12 | 7 | 16 |
| Formula (2.2) | 37 | 36 | 41 | 27 |
| Formula (11.1) | 12 | 7 | 9 | 13 |
| Formula (11.2) | 4 | 8 | 6 | 5 |
| Formula (15.1) | | | | 2 |
| Formula (23.1) | | | 4 | |
| Formula (31.2) | 8 | 5 | 10 | 4 |
| Formula (31.4) | 2 | 2 | | 5 |
| Formula (39.2) | | 3 | | |
| Formula (44.1) | 4 | 2 | 1 | 3 |
| Formula (44.2) | 4 | 3 | 5 | 2 |
| Formula (45.2) | 2 | 3 | 5 | 4 |
| Formula (45.3) | 3 | 2 | | 4 |

TABLE 12

| Evaluation Item | Result | | | |
|---|---|---|---|---|
| | Example 22 | Example 23 | Example 24 | Example 25 |
| $T_{NI}$/° C. | 95.1 | 95.2 | 99.0 | 100.0 |
| Δn | 0.106 | 0.104 | 0.102 | 0.108 |
| Δϵ | 4.7 | 4.7 | 4.6 | 5.0 |
| η/mPa · s | 14 | 13 | 13 | 15 |
| $γ_1$/mPa · s | 60 | 64 | 58 | 71 |
| Initial Voltage Holding Ratio (%) | 99.5 | 99.5 | 99.5 | 99.5 |
| Voltage Holding Ratio after Thermal Test (%) | 98.5 | 98.4 | 98.5 | 98.4 |
| Evaluation of Screen Burn-in (h) | 700 | 600 | 550 | 650 |
| Evaluation of Droplet Stains | 5 | 5 | 4 | 5 |
| Evaluation of Contamination of Manufacturing Equipment (s) | 180 | 175 | 145 | 190 |
| Evaluation of Process Adaptability (Times) | 112000 | 100000 | 99900 | 98700 |
| Evaluation of Solubility at Low Temperature (h) | 600 | 590 | 530 | 600 |

Each of the liquid crystal compositions prepared in Examples had a low viscosity and a good solubility at low temperature. The liquid crystal composition was less volatile and thus contributed to a reduction in contamination of equipment. Furthermore, a variation in the amount of the droplets of the liquid crystal composition in an ODF process was able to be reduced, which enabled stable production of liquid crystal display apparatuses for a long time. Moreover, each of the liquid crystal display apparatuses produced in Examples had an excellent thermal resistance and therefore had stable display properties maintained for a long time.

INDUSTRIAL APPLICABILITY

The liquid crystal composition of the present invention with positive dielectric anisotropy has a good solubility at low temperature, and changes in its specific resistance and voltage holding ratio due to exposure to heat or light are significantly small; hence, products produced therefrom are highly practical, and liquid crystal display devices using such a liquid crystal composition can quickly respond. In addition, the liquid crystal composition can be continuously and stably dropped in a process for manufacturing liquid crystal display devices, which contributes to a reduction in defective display resulting from the manufacturing process and therefore enables high-yield production of the liquid crystal display devices; thus, such a liquid crystal composition is highly useful.

REFERENCE SIGNS LIST

100 First substrate
102 TFT layer
103 Pixel electrode
104 Passivation film
105 First alignment film
200 Second substrate
201 Planarization film
202 Black matrix
203 Color filter
204 Transparent electrode
205 Second alignment film
301 Sealing material
302 Protrusion (columnar spacer)
303 Liquid crystal layer
304 Protrusion (columnar spacer)
401 Mask pattern
402 Resin layer

The invention claimed is:

1. A liquid crystal composition comprising a compound represented by Formula (i);

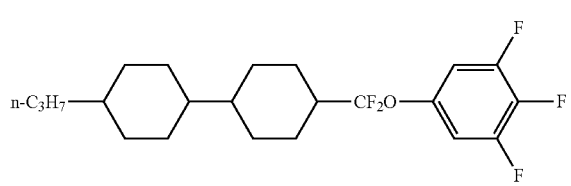

a compound represented by General Formula (ii)

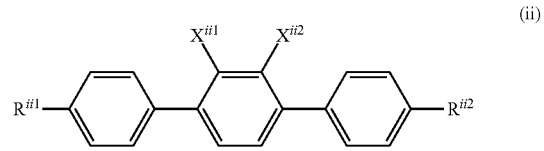

where in General Formula (ii), $R^{ii1}$ and $R^{ii2}$ each independently represent an alkyl group having 1 to 5 carbon atoms, an alkoxyl group having 1 to 5 carbon atoms, or an alkenyl group having 4 or 5 carbon atoms; and $X^{ii1}$ and $X^{ii2}$ each independently represent a hydrogen atom or a fluorine atom;

a compound represented by General Formula (II-2)

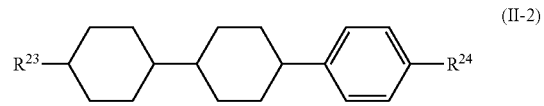

where in General Formula (II-2), $R^{23}$ represents an alkenyl group having 2 to 5 carbon atoms, and $R^{24}$ represents an alkyl group having 1 to 5 carbon atoms or an alkoxy group having 1 to 4 carbon atoms;

a compound represented by Formula (23.1); and

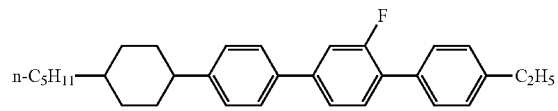

a compound represented by Formula (26.2)

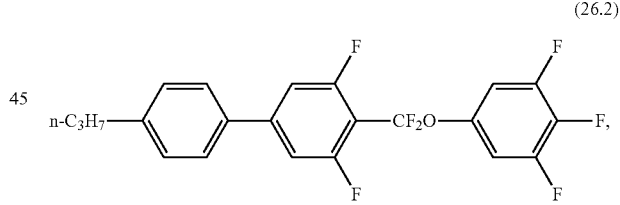

wherein the amount of the compound represented by General Formula (II-2) is in the range of 6 to 35 mass % relative to the total mass of the liquid crystal composition.

2. The liquid crystal composition according to claim 1, wherein the amount of the compound represented by Formula (i) and the amount of the compound represented by General Formula (ii) are from 1 mass % to 30 mass % and from 1 mass % to 40 mass %, respectively, relative to the total amount of the liquid crystal composition.

3. The liquid crystal composition according to claim 1, further comprising at least one compound represented by General Formula (L)

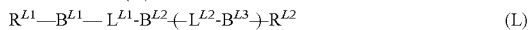

where
$R^{L1}$ and $R^{L2}$ each independently represent an alkyl group having 1 to 8 carbon atoms, and one —CH$_2$— group or at least two —$CH_2$— groups not adjoining each other in the alkyl group are each independently optionally substituted with —CH=CH—, —C≡C—, —O—, —CO—, —COO—, or —OCO—;

OL represents 0, 1, 2, or 3;

$B^{L1}$, $B^{L2}$, and $B^{L3}$ each independently represent a group selected from the group consisting of
(a) a 1,4-cyclohexylene group (of which one —$CH_2$— group or at least two —$CH_2$— groups not adjoining each other are optionally substituted with —O—) and
(b) a 1,4-phenylene group (of which one —CH= group or at least two —CH= groups not adjoining each other are optionally substituted with —N=), and
the groups (a) and (b) are each independently optionally substituted with a cyano group, a fluorine atom, or a chlorine atom;

$L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—;

in the case where OL is 2 or 3 and where $L^{L2}$ is multiple, the multiple $L^{L2}$'s are the same as or different from each other; in the case where OL is 2 or 3 and where $B^{L3}$ is multiple, the multiple $B^{L3}$'s are the same as or different from each other; and the compound represented by General Formula (L) excludes the compound represented by General Formula (ii) and the compound represented by Formula (23.1).

4. The liquid crystal composition according to claim 1, further comprising at least one compound represented by General Formula (M)

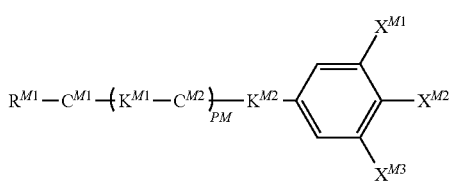

(M)

where
$R^{M1}$ resents an alkyl group having 1 to 8 carbon atoms, and one —$CH_2$— group or at least two —$CH_2$— groups not adjoining each other in the alkyl group are each independently optionally substituted with —CH=CH—, —C≡C—, —O—, —CO—, —COO—, or —OCO—;
PM represents 0, 1, 2, 3, or 4;

$C^{M1}$ and $C^{M2}$ each independently represent a group selected from the group consisting of
(d) a 1,4-cyclohexylene group (of which one —$CH_2$— group or at least two —$CH_2$— groups not adjoining each other are optionally substituted with —O— or —S—) and
(e) a 1,4-phenylene group (of which one —CH= group or at least two —CH= groups not adjoining each other are optionally substituted with —N=), and
the groups (d) and (e) are each independently optionally substituted with a cyano group, a fluorine atom, or a chlorine atom;

$K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—;

in the case where PM is 2, 3, or 4 and where $K^{M1}$ is multiple, the multiple $K^{M1}$'s are the same as or different from each other; in the case where PM is 2, 3, or 4 and where $C^{M2}$ is multiple, the multiple $C^{M2}$'s are the same as or different from each other;

$X^{M1}$ and $X^{M3}$ each independently represent a hydrogen atom, a chlorine atom, or a fluorine atom;

$X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; and the compound represented by General Formula (M) excludes the compound represented by Formula (i) and the compound represented by Formula (26.2).

5. A liquid crystal display device comprising the liquid crystal composition according to claim 1.

6. The liquid crystal display device according to claim 5, wherein the liquid crystal display device is operated in an IPS mode, an OCB mode, an ECB mode, a VA mode, a VA-IPS mode, or an FFS mode.

7. A liquid crystal display comprising the liquid crystal composition device according to claim 5.

8. The liquid crystal composition according to claim 1, further comprising a compound represented by Formula (2.5),

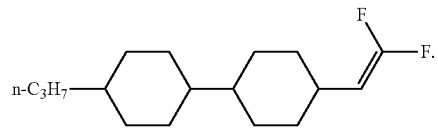

* * * * *